United States Patent [19]

Fujihara

[11] Patent Number: 5,778,371
[45] Date of Patent: Jul. 7, 1998

[54] CODE STRING PROCESSING SYSTEM AND METHOD USING INTERVALS

[75] Inventor: Mutsumi Fujihara, Yokohama, Japan

[73] Assignee: Kabushiki Kaisha Toshiba, Kawasaki, Japan

[21] Appl. No.: 526,872

[22] Filed: Sep. 12, 1995

[30] Foreign Application Priority Data

Sep. 13, 1994 [JP] Japan .................. 6-219145

[51] Int. Cl.$^6$ .................................................. G06F 17/30
[52] U.S. Cl. ................................ 707/100; 707/203
[58] Field of Search .......................... 395/600, 602, 395/622; 707/203, 100

[56] References Cited

U.S. PATENT DOCUMENTS

| | | | |
|---|---|---|---|
| 4,754,489 | 6/1988 | Bokser | 382/40 |
| 4,967,391 | 10/1990 | Hijima | 364/900 |
| 5,062,143 | 10/1991 | Schmitt | 382/36 |
| 5,121,493 | 6/1992 | Ferguson | 395/600 |
| 5,136,289 | 8/1992 | Yoshida et al. | 341/67 |
| 5,150,425 | 9/1992 | Martin et al. | 382/14 |
| 5,150,430 | 9/1992 | Chu | 382/56 |
| 5,153,591 | 10/1992 | Clark | 341/51 |
| 5,276,741 | 1/1994 | Aragon | 382/40 |
| 5,293,466 | 3/1994 | Bringmann | 395/114 |
| 5,384,568 | 1/1995 | Grinberg et al. | 341/51 |
| 5,418,948 | 5/1995 | Turtle | 395/600 |
| 5,418,951 | 5/1995 | Damashek | 395/600 |
| 5,442,350 | 8/1995 | Iyer et al. | 341/51 |
| 5,530,975 | 7/1996 | Koenig | 395/600 |
| 5,561,421 | 10/1996 | Smith et al. | 341/151 |
| 5,574,910 | 11/1996 | Bialkowski et al. | 395/601 |
| 5,600,826 | 2/1997 | Ando | 395/611 |
| 5,610,603 | 3/1997 | Plambeck | 341/51 |
| 5,614,900 | 3/1997 | Watanabe | 341/67 |

FOREIGN PATENT DOCUMENTS 0 583 559  2/1994  European Pat. Off. .

OTHER PUBLICATIONS

"A Space–economical Suffix Tree Construction Algorithm" Edward M. McCreight, Journal of the Association, vol. 23, pp. 262–272, Apr. 1976.

"Self–Adjusting Binary Search Trees" D. D. Sleator et al., Journal of the Association for Computer Machinery, vol. 32, pp. 625–686, Jul. 1985.

Kuo et al., "A two–Step String–Matching procedure" Pattern Recognition, vol. 24, pp. 711–716, Mar. 1991.

Reingold et al. "Data Structure . . . " Litle Brown Computer Systems Series pp. 255–262, Jan. 1986.

Proceedings 31st Annual Symposium on Foundations of Computer Science, vol. I, pp. 116–124, Oct. 22–24, 1990, William I. Chang, et al., "Approximate String Matching in Sublinear Expected Time".

Software Practice and Experience, vol. 21, No. 10, pp. 1027–1040, Oct. 1991, John A. Dundas III, "Implementing Dynamic Minimal–Prefix Tries".

(List continued on next page.)

*Primary Examiner*—Thomas G. Black
*Assistant Examiner*—Jean M. Corrielus
*Attorney, Agent, or Firm*—Oblon, Spivak, McClelland, Maier & Neustadt, P.C.

[57] ABSTRACT

A data retrieval system which updates data quickly. A divider determines the first substring and second substring based on the code string from which a key string is retrieved. For each substring, a generator generates the dictionary data showing the correspondence between a trailing string, which is a trailing part of data in the substring, and the start position of the trailing string within the code string. A retriever a trailing string whose leading string is a key string or a part of the key string, based on the dictionary data. A remover removes duplicate trailing strings. When a changer changes the code string, an updater updates dictionary data associated with the substring based on the contents of the change. A first maintaining device maintains the boundary interval at a maximum key length or longer, and a second maintaining device maintains the boundary interval at a specified length or less.

25 Claims, 65 Drawing Sheets

OTHER PUBLICATIONS

Pattern Recognition, vol. 24, No. 7, pp. 711–716, Jan. 1991, Shufen Kuo, et al., "A Two–Step String–Matching Procedure".

Journal of The Association for Computer Machinery, vol. 23, No. 2, pp. 262–272, Apr. 1976, E. McCreight, "A Space–Economical Suffix Tree Construction Algorithm".

Journal of The Association For Computing Machinery, vol. 32, No. 3, pp. 652–686, Jul. 1985, D. Sleator, et al., "Self–Adjusting Binary Search Trees".

| NODE ADDRESS | POINTER TO THE LEFT CHILD | POINTER TO THE RIGHT CHILD | POINTER TO THE PARENT | PARTIAL INTERVAL LENGTH |

*FIG. 75*

CHARACTER s :  a profile of a program improving process
STRING          ↑
                3 by a professional programmer
                     ↑
                    47

PATTERN p :  prof

| Position | Substring identifier |
|---|---|
| 1 | abba |
| 2 | bba |
| 3 | ba |
| 4 | abb$ |
| 5 | bb$ |
| 6 | b$ |
| 7 | $ |

FIG. 81

| ADDRESS | DATA |
|---|---|
| A | 0 |
| A + 1 | 0 |
| A + 2 | 0 |
| A + 3 | N |
| A + 4 | N |
| A + 5 | 0 |
| A + 6 | 0 |
| A + 7 | 0 |
| A + 8 | 0 |
| A + 9 | 1 |
| A + 1 0 | 1 |
| A + 1 1 | 1 |
| A + 1 2 | 1 |
| A + 1 3 | 1 |
| A + 1 4 | 1 |
| A + 1 5 | 0 |

FIG. 82

| ADDRESS | DATA | | DATA | ADDRESS |
|---|---|---|---|---|
| A | 0 | | 0 | A |
| A+ 1 | 0 | | 0 | A+ 1 |
| A+ 2 | 0 | | 0 | A+ 2 |
| A+ 3 | N | | N | A+ 3 |
| A+ 4 | N | | N | A+ 4 |
| A+ 5 | 0 | | 1 | A+ 5 |
| A+ 6 | 0 | | 1 | A+ 6 |
| A+ 7 | 0 | | 1 | A+ 7 |
| A+ 8 | 0 | | 0 | A+ 8 |
| A+ 9 | 1 | | 0 | A+ 9 |
| A+10 | 1 | | 0 | A+10 |
| A+11 | 1 | | 0 | A+11 |
| A+12 | 1 | | 1 | A+12 |
| A+13 | 1 | | 1 | A+13 |
| A+14 | 1 | | 1 | A+14 |
| A+15 | 0 | | 1 | A+15 |
| | | | 1 | A+16 |
| | | | 1 | A+17 |
| | | | 0 | A+18 |

| ADDRESS | INTERVAL | DATA VALUE |
|---|---|---|
| A | [ 1 . . 3 ] | 0 |
| A + 1 | [ 4 . . 5 ] | N |
| A + 2 | [ 6 . . 9 ] | 0 |
| A + 3 | [ 1 0 . . 1 5 ] | 1 |
| A + 4 | [ 1 6 . . 1 6 ] | 0 |

| ADDRESS | INTERVAL LENGTH | DATA VALUE |
|---------|-----------------|------------|
| A       | 3               | 0          |
| A + 1   | 2               | N          |
| A + 2   | 4               | 0          |
| A + 3   | 6               | 1          |
| A + 4   | 1               | 0          |

CODE STRING PROCESSING SYSTEM AND METHOD USING INTERVALS

BACKGROUND OF THE INVENTION

1. Field of the Invention

This invention relates to an improved data retrieval system and data retrieval method which retrieve the whole or a part of a key string from a code string such as a character string. It also relates to an improved data processing system and data processing method which process data.

2. Description of the Prior Art

Data retrieval systems and data retrieval methods have been devised heretofore to find all the occurrence positions of a specified key string (pattern) in a code string such as a character string. FIG. 75 shows the pattern p which is found in the character string s. A code string retrieval technique may be applied to dictionaries and indexes; more specifically, it is applied to the pattern matching in a text editor, text database, and voice recognition, to pattern analysis in such fields as DNA study, or to substitutional coding.

The simplest code string retrieval method is to match a key string against a code string sequentially from the beginning to the end. However, in this method, the retrieval time increases as the character string s becomes longer.

To prevent the retrieval time from being increased as the character string s becomes longer while allowing the time to increase as the number of occurrences of the pattern p increases, data specifically-structured for retrieval, which is created based on the one-dimensional character string s, is used. A position tree (Majster, M. et. al. 1980), suffix tree (McCreght, E. 1976), and directed acyclic word graph (Blumer, A. et. al. 1985) are known as a structure specifically-structured for data retrieval.

These data structures are advantageous in that (1) a very large storage area is not necessary; the storage area is approximately proportional to the length of the code string s and (2) a very long retrieval time is not necessary; the time is approximately proportional to the length of the key string (pattern p) and the number of occurrences.

Basically, these data structures are based on a Trie (digital search tree). As shown in FIG. 76, a Trie is a tree data structure consisting of a root, a plurality of nodes, and ends, and a sequence of labels attached to each edge between each two nodes from the root to an end node (leaf) constitute the character string wi. In this data structure, a leaf corresponds to the character string wi (a full character string). In addition, a character string generated by the labels on the path from the root to a node x is considered to be a prefix (a leading substring) of a character string generated by the labels from the root to a leaf.

Data structures that have been used in data retrieval, such as a position tree, suffix tree, or directed acyclic word graph, are based on the Trie described above.

A position tree, one of data structures, is a Trie which uses substring identifiers, each starting at each sequential position of the code string s, as character strings. A substring identifier is defined as the shortest unique character string starting at each sequential position. FIG. 77 is an example of a table (dictionary) containing positions and substring identifiers for the code string "abbabb$". In this figure, the symbol $ is a dummy code appended at the end of the code string to identify the position. FIG. 78 is an example of a position tree representing the dictionary for the code string "abbabb$".

A suffix tree is a Trie which uses a suffix (a trailing substring) of the code string s as the character string wi. FIG. 79 shows an example of a suffix tree. A suffix tree is the simplest form of a Trie. That is, a suffix tree is a tree structure T in which the labels, each attached to a path from the root to a leaf (end node), generate a suffix of the code string s. In a suffix tree, a leaf corresponds to the end of a suffix (end of s). T consists of all combinations of paths from the root to a leaf, and includes all the generated suffixes. A path from the root to a leaf via the node x corresponds to a suffix of the code string s with a character string generated from the root to the node x as a prefix.

A directed acyclic word graph is a graph created by merging particular paths of a suffix tree. FIG. 80 shows an example of a directed acyclic word graph.

However, when the code string s is updated in a traditional data structure, the time required for updating retrieval data increases as the code string s becomes longer. In a suffix tree, for example, a Trie reflects all the suffixes of the code string s. Therefore, if only a part of the code string s is changed, all the suffixes before the changed character are affected and so the whole Trie is affected. This is more prominent as the changed character is closer to the end of the code string s.

For example, if the last character "c" of the code string s is deleted in FIG. 79, three edges (c) are deleted and the labels on two edges (abc) are changed. Thus, a traditional data retrieval system and a data retrieval method, which take long in updating data, is not practical in an application where strings are updated often.

Another known method is to divide a code string into a plurality of substrings and, for each of them, a Trie is created individually. However, there are two problems with this method. One problem is that, if a portion of the code string corresponding to the key string is divided and if the first half belongs to one Trie and the last half to another, it is impossible to search for that portion with the key string.

Another problem is that, for a variable-length substring, data processing such as editing or retrieval cannot be done efficiently. For example, a substring changes and variable in length when edited. So, to process a substring, it is always necessary to match a substring with a particular position within the code string.

A substring is difficult to process not only in data retrieval but also in many other data processing fields such as data compression or character string editing. Editing of a character string (sentence) is an example of data processing of substrings.

When processing data strings on a computer, it is necessary to match a data value in a data string against the position within the data string where the data value is stored. More specifically, it is necessary, during character string editing, to get a code that is in a particular position in a character string; for example, to retrieve the 100-th character from a character string. On the other hand, the position of a particular code may vary during editing. For example, adding 10 characters at the beginning of a character string increases the position of a subsequent character within the character string by 10 (characters).

The position of a data item in a data string is not always discrete; it is not always "n-th position" as in the above character string; in many cases, an interval represented by a real number in the floating-point format is used to specify a range of one data value. For example, the value of a signal from a circuit is represented by L (low), H (high), and F (floating, undefined). When processing these values, for example, in a simulation in the time-series mode, it is convenient to treat the duration of a signal value as a real value and, on a computer, to treat it as a floating-point value.

In this type of application, editing is performed as for a character string. It is also necessary to quickly respond to inquiries such as: what is a data value at a particular point of time, how long a value at a particular point lasts, at which point of time a data value begins, and whether or not a data value changes between two points and how often.

The following explains how difficult it is to efficiently process a substring with the use of a simple example. In this example, suppose that a code string contains characters whose values are 0, 1, or N and that, in most cases, the same code value occurs continuously. This type of string often occurs on a graphics display. The following is an example of this type of code:

TABLE 1

| Position | Data |
|----------|------|
| 1 | 0 |
| 2 | 0 |
| 3 | 0 |
| 4 | N |
| 5 | N |
| 6 | 0 |
| 7 | 0 |
| 8 | 0 |
| 9 | 0 |
| 10 | 1 |
| 11 | 1 |
| 12 | 1 |
| 13 | 1 |
| 14 | 1 |
| 15 | 1 |
| 16 | 0 |

In this example, 0 is stored in the interval [1...3], N in the interval [4...5], 0 in the interval [6...9], 1 in the interval [10...15], and 0 in the interval [16...16]. In this example, it Is thought that a code string is divided into a sequence of code strings of the same value, that is, into intervals.

To process this data on a computer, the straightforward method is to store code values sequentially at consecutive addresses in storage (first method). FIG. 81 shows how the code string in Table 1 is represented in the first method. In the first method, the position of each code value is proportional to the difference between the address of storage at which the code value is stored and the start address of storage where the code string is stored. This makes it possible to identify the address of a particular code value by performing usual calculation (add, subtract, multiply, and divide).

That is, if the start address of storage where the code string is stored is A, then the address of the code value is calculated as follows:

Address=Position+A−1    [Formula 1]

However, this method has the following problems:

(1) Data occupies as many locations as there are code values, degrading the memory efficiency. In particular, when there are many codes of the same value, the memory is wasted.

(2) Because data is stored by plural codes, it takes long to determine a range of the consecutive codes of the same value. That is, to identify a range of consecutive codes of the same value, it is necessary to read code values, one at a time, and to count the number of code values.

(3) A change in the length of a substring as a result of insertion or removal causes the addresses of all the data following the insertion or removal point to be increased or decreased. This is a time-consuming process. For example, FIG. 82 shows an example in which an interval of code value 1 [6...8] is inserted immediately after the code value N at position 5 (address A+4). This insertion involves a sequence of operations; that is, data at addresses A+5 to A+15 must be moved to addresses A+8 to A+18.

(4) Because a storage area large enough to contain the number of code values (that is, the number of positions), each consisting of a specified number of bits (code unit), is required, a limited storage area limits the amount of information each code unit can contain. If each code unit is allowed to represent the maximum amount of information, a huge amount of storage is required. This results in less positions and more coarse position increments (less precise). Conversely, smaller position increments increase the number of positions, requiring a huge amount of storage. In this case, only discrete lengths (positions) such as integers can be represented in practice.

Another method is to store pairs, each consisting of a code value and a range of a substring where that code consecutively occurs, in a consecutive storage area in the order in which the substrings appear (second method). FIG. 83 shows the code string in Table 1 stored in the second method.

In the second method, the amount of memory depends on the number of consecutive code value intervals. That is, it depends, not on the number of positions, but on the number of intervals, increasing the memory efficiency. A continuous range of code values can be identified by data. In addition, the broader variations of length precision (length type= discrete or continuous) is allowed. For example, floating-point numbers may be processed easily.

Again, in this method, when the length of a substring (interval) or the number of substrings is changed, it is necessary to re-write all the substring data that follow the changed position. In addition, to identify the code value of a particular position, it is necessary to search the corresponding range for the position of the value, for example, using the binary search method.

A binary search tree is conveniently used in the binary search method. In this method, a substring at the center of a code string is used as the root node. Each node is assigned a substring range data as well as the code value of the substring. Substring data may be represented by the start point and the end point of the range or only by the start point of the range with the end point obtaining from the start point of the next substring. FIG. 84 shows an example of a sub-tree corresponding to the data in Table 1. In this figure, to each node the start point of the corresponding substring (in the circle) and the code value of the substring (below the circle) are assigned.

In a sub-tree consisting of nodes that are at the end, one of them (for example, the node at the left) corresponds to the substring preceding the above-described node and the right sub-tree corresponds to the substring that follows the above-described node. Again, in this case, when the position of a substring s changed, it is necessary to change all the data following the change point.

It is also possible to store pairs, each consisting of a code value and the length of a substring where that code consecutively occurs, in a consecutive storage area in the order in which substrings appear (third method). FIG. 85 is an example of data stored in the conventional third method. An advantage of this method is that, when a substring is expanded or reduced, only the length of the interval of the expanded or reduced substring need be changed. A disadvantage of this method is that, when obtaining the code at a particular position, the lengths of the intervals from the start or the end to the corresponding position must be added up. In addition, the binary search method cannot be used because information about a particular interval gives us only the information about the length of the interval.

A linear list may be used instead of using a consecutive area; this makes it possible to connect non-consecutive areas through pointers (fourth method). FIG. 86 shows a data structure represented in the fourth method.

The fourth method eliminates the need for transferring data in memory when adding, deleting, dividing, or merging one or more intervals. However, to locate a particular position, this method still requires us to add up the lengths of intervals.

This invention seeks to solve the problems of the prior art described above. It is an object of this invention to provide a data retrieval system and a data retrieval method which update data speedily. It is another object of this invention to provide a data retrieval system and a data retrieval method which allow us to retrieve data from a simply-structured data or with a simple procedure. It is another object of this invention to provide a data retrieval system and a data retrieval method which retrieve data speedily.

It is a further object of this invention to provide a data processing system and a data processing method which process data efficiently. This data processing system and data processing method are particularly suitable for implementing the above described data retrieval system and data retrieval method. More specifically, it is another object of this invention to provide a data processing system and a data processing method which allow us to update data simply. It is another object of this invention to provide a data processing system and a data processing method which use memory efficiently.

SUMMARY OF THE INVENTION

To achieve the above object, an invention according to claim 1 is a data retrieval system comprising: dividing means for making determination of a plurality of first substrings, each bounded by a first boundary and each longer than or equal to the maximum key length, and second substrings, each bounded by a second boundary and each extending across a first boundary with at least the immediate front of the immediate front of the maximum key length on both sides of the first boundary, from a code string from which a key string is to be retrieved; generating means for generating dictionary data representing the correspondence between a trailing string which is a trailing part of the substring and the start position of the trailing string within the code string for each of the substring; retrieving means for retrieving a trailing string having the whole or part of the key string as a leading string based on the dictionary data; changing means for changing the code string; updating means for updating the dictionary data of the substring associated with the change based on the contents of the change; and first maintaining means for maintaining the interval of each of the boundary at the immediate front of the maximum key length or longer.

The invention of claim 37 realizes the invention of the claim 1 from a methodological standpoint and is a data retrieval method comprising: a dividing process for making determination of a plurality of first substrings, each bounded by a first boundary and each longer than or equal to the maximum key length, and second substrings, each bounded by a second boundary and each extending across a first boundary with at least the immediate front of the maximum key length on both sides of the first boundary, from a code string from which a key string is to be retrieved; a string is to be retrieved; a generating process for generating dictionary data representing the correspondence between a trailing string which is a trailing part of the substring and the start position of the trailing string within said code string for each of said substring; a retrieving process for retrieving a trailing string having the whole or part of the key string as a leading string based on said dictionary data; a changing process for changing said code string; an updating process for updating the dictionary data of said substring associated with said change based on the contents of the change; and a first maintaining process for maintaining the interval of each of said boundary at the immediate front of the maximum key length or longer.

A data retrieval system according to claims 1 and 37 keeps an interval between the first boundary and the second boundary a length equal to or larger than the immediate front of the maximum key length, preventing any part within a code string equal to or shorter than the maximum key length from being divided by both the first boundary and second boundary. This means that the whole or a part of a key string included in the code string is always included in at least one of dictionaries, so that it is found during retrieval based on the dictionary data.

A data retrieval system according to claims 1 and 37 divides data, in which a key string is to be retrieved, into substrings and stores them as dictionary data. Thus, even when the code string is changed, there is no need to change the whole data; only the dictionary data of a substring associated with the change need be updated. This reduces the update time. This update time is proportional to the length of a substring affected by the change, not to the length of the whole code string. So, a data retrieval system according to claims 1 and 37 is suitable when data is updated frequently.

An invention according to claim 2 is a data retrieval system as claimed in claim 1, wherein the dividing means makes the determination by setting the first boundary and the second boundary alternately in the code string and by setting the number of codes between each two boundaries to a number equal to or greater than the immediate front of the maximum key length.

The invention of claim 38 realizes the invention of the claim 2 from a methodological standpoint and is a data retrieval method as claimed in claim 37, wherein said dividing process makes said determination by setting said first boundary and said second boundary alternately in said code string and by setting the number of codes between each two boundaries to a number equal to or greater than the immediate front of the maximum key length.

According to the invention as claimed in claims 2 and 38, the first and second substrings can be determined simply by setting the first and second boundaries alternately.

An invention according to claim 3 is a data retrieval system as claimed in claim 1, wherein the dictionary data is represented by a suffix tree, this tree being a data structure having a plurality of nodes from the root to end nodes, each non-end node being connected, via an edge, to one or more nodes on the end side, each edge being attached a label, each trailing string of a substring being associated with a specific end node, each trailing string of the substring being formed by sequentially connecting the labels on a path from the root to each end node.

The invention of claim 39 realizes the invention of the claim 3 from a methodological standpoint and is a data retrieval method as claimed in claim 37, wherein said dictionary data is represented by a suffix tree, this tree being a data structure having a plurality of nodes from the root to end nodes, each non-end node being connected, via an edge, to one or more nodes on the end side, each edge being attached a label, each trailing string of a substring being associated with a specific end node, each trailing string of the substring being formed by sequentially connecting the labels on a path from the root to each end node.

According to the invention as claimed in claims 3 and 39, dictionary data can be built in a tree-structure data format called a suffix tree. Traversing this tree based on the code of a key string enables a trailing string, having the whole or part of a key string as the leading string, to be retrieved speedily. In addition, dictionary data requires less space a table.

An invention according to claim 4 is a data retrieval system as claimed in claim 3, wherein each label is one unit code in the code string.

According to the invention as claimed in claim 4, a label is always one unit code in the code string. Therefore, as compared with a label whose length is variable, the processing procedure is simpler.

An invention according to claim 5 is a data retrieval system as claimed in claim 3, wherein the retrieving means performs retrieval by traversing a path of the tree based on each code of the key string to find a node at which the key string matches the longest path and by identifying the position for the trailing string corresponding to each end node on the end side of this node.

The invention of claim 40 realizes the invention of the claim 5 from a methodological standpoint and is a data retrieval method as claimed in claim 39, wherein said retrieving process performs retrieval by traversing a path of said tree based on each code of said key string to find a node at which the key string matches the longest path and by identifying the position for the trailing string corresponding to each end node on the end side of this node.

According to the invention as claimed in claims 5 and 40, the retrieving means traverses a path until the longest match path, which is the longest path matching the key string in the tree, is reached. This means that the retrieving means retrieves not only the position of a trailing string including the whole key string but also the position of a trailing string including part of the key string. Therefore, even when the retrieving means cannot find the whole key string, it identifies a trailing string consisting of the maximum number of matching codes, giving the user a trailing string most closely associated with the key string.

An invention according to claim 6 is a data retrieval system as claimed in claim 3, wherein a pointer pointing to the end of a substring is set only in the end node of the trailing string which is the substring and, for a trailing string which is the substring and for each of other trailing strings, a second edge to the end node of a trailing string, which is shorter than the trailing string by one code, is set.

The invention of claim 41 realizes the invention of the claim 6 from a methodological standpoint and is a data retrieval method as claimed in claim 39, wherein a pointer pointing to the end of a substring is set only in the end node of the trailing string which is the substring and, for a trailing string which is the substring and for each of other trailing strings, a second edge to the end node of a trailing string, which is shorter than the trailing string by one code, is set.

According to an invention as claimed in claims 6 and 41, the number of second edges from an end node without a pointer to an end node with a pointer equals the difference between the positions of two trailing strings corresponding to the two nodes. Therefore, the position from the beginning of a trailing string can be determined according to this difference, eliminating the need to go up the tree for each trailing string.

When the code string is changed and the position of a substring is changed, only one pointer need be changed and, so, the processing speed is higher than when as many pointers as the number of end nodes must be changed. This is especially advantageous when a plurality of dictionary data units are implemented by a tree and the data structure in the tree becomes complex.

An invention according to claim 7 is a data retrieval system as claimed in claim 6, wherein the second edge is attached a label which is an extra code of one of two trailing strings corresponding to two end nodes connected by the edge.

According to the invention as claimed in claim 7, an extra code of one trailing string which is longer than the other is used as a label. This structure allows the contents of a substring to be restored by connecting labels while going up from the end node with a pointer to the root through the second edge.

An invention according to claim 8 is a data retrieval system as claimed in claim 1 or 3, wherein the retrieving means outputs the number of codes matching the key string for a trailing string obtained as a result of retrieval.

According to the invention as claimed in claim 8, the retrieving means outputs the number of codes of a trailing string matching those of the key string, making it easier to determine the extent of matching.

An invention according to claim 9 is a data retrieval system as claimed in claim 1 or 3, wherein, when a trailing string obtained as retrieval includes the whole key string, the retrieving means issues a message indicating the fact.

According to the invention as claimed in claim 9, when a trailing string contains the whole key string, the retrieving means outputs a message indicating the fact, making the retrieval result easy to use.

An invention according to claim 10 is a data retrieval system as claimed in claim 1 or 3, further comprising removing means for removing duplications of the trailing string.

The invention of claim 42 realizes the invention of the claim 10 from a methodological standpoint and is a data retrieval method as claimed in claim 37 or 3 9, further comprising a removing process for removing duplicate positions of said trailing string.

According to the invention as claimed in claims 10 and 42, the removing means eliminates duplicate positions of trailing strings that are found, preventing the retrieval result from being confused because of duplicate positions.

An invention according to claim 11 is a data retrieval system as claimed in claim 1 or 3, wherein the updating means adds data on a trailing string to be added as a result of a change to the dictionary data and, after that, deletes data on a trailing string to be deleted as a result of a change from the dictionary data.

According to the invention as claimed in claim 11, the updating means adds and then deletes data during update. This invention allows some data pieces to be made available, if they can still be used, even after the update, making the update time less than when data is first deleted and then added.

An invention according to claim 12 is a data retrieval system as claimed in claim 1 or 3, wherein the updating means checks, at update time, whether or not a trailing string to be added is already in the dictionary and, only when the trailing string is not in the dictionary, adds the trailing string.

According to the invention as claimed in claim 12, the updating means checks whether or not data on a trailing string to be added to the dictionary is already in the dictionary, and adds data only when it is not in the dictionary. This invention eliminates the need to re-generate the whole dictionary data, reducing the update time. An invention according to claim 7, if used, further increases the efficiency.

An invention according to claim 13 is a data retrieval system as claimed in claim 1 or 3, wherein the first maintaining means erases one of two boundaries when the boundary interval is less than the immediate front of the maximum key length so that the combined substring, generated as a result of erasure, is shorter in length.

The invention of claim 43 realizes the invention of the claim 13 from a methodological standpoint and is a data retrieval method as claimed in claim 37 or 39, wherein said first maintaining process erases one of two boundaries when the boundary interval is less than the immediate front of the maximum key length so that the combined substring, generated as a result of erasure, is shorter in length.

According to the invention as claimed in claims 13 and 43, when the boundary interval is less than the maximum key length, the first maintaining means 12 erases one of two boundaries so that the combined substring, generated as a result of erasure, is shorter in length. This prevents the update time from being increased even when the size of the combined substrings is increased.

An invention according to claim 14 is a data retrieval system as claimed in claim 1 or 3, further comprising second maintaining means for maintaining the length of the substring shorter than a specified length.

According to the invention as claimed in claim 14, the second maintaining means maintains the boundary interval at a length equal to or less than a specified length, preventing the dictionary data size and the update time from increasing.

An invention according to claim 15 is a data retrieval system as claimed in claim 1 or 3, further comprising restoring means for restoring a substring according to the dictionary data.

According to the invention as claimed in claim 15, the restoring means restores a substring based on dictionary data, eliminating the need to save the substring on which the tree is based and thereby requiring less storage. Because the restoration of a substring does not depend on the length of the original code, processing efficiency is further increased. An invention according to claim 7, if used, further increases the efficiency.

An invention according to claim 16 is a data retrieval system as claimed in claim 1 or 3, wherein dictionary data of a plurality of substrings is generated as a single tree.

The invention of claim 44 realizes the invention of the claim 16 from a methodological standpoint and is a data retrieval method as claimed in claim 37 or 39, wherein dictionary data of a plurality of substrings is generated as a single tree.

According to the invention as claimed in claims 16 and 44, dictionary data of each of a plurality of substrings is generated as a single tree. Therefore, the number of required trees is less than that required when an independent tree is created for each dictionary data unit and therefore less memory is required. This is effective especially for a code string containing a plurality of identical or similar components.

An invention according to claim 17 is a data retrieval system as claimed in claim 1 or 3, further comprising key dividing means for dividing the key string into a plurality of sub-key strings, wherein the retrieving means retrieves a trailing string having the whole or a part of the sub-key string as a leading string.

According to the invention as claimed in claim 17, the key dividing means divides the key string into a plurality of sub-key strings. And, the retrieving means retrieves a trailing string which contains the whole or part of a sub-key string as a leading string. In this case, since each sub-key string can be found unless divided by one or more boundaries, the maximum key length is the maximum length of a sub-key string. This reduces the maximum key length, making dictionary data compact. Conversely, when the maximum key length is set to a fixed value, it is possible to retrieve data using a key string longer than the maximum key string by making each sub-key length equal to or less than the maximum key length.

An invention according to claim 18 is a data processing system comprising binary tree generating means for generating a binary tree representing a range of each interval based on the intervals in a code string consisting of one or more intervals, the binary tree having nodes each corresponding to an interval, the nodes being connected from the root to the ends in a tree-like structure, the end side of each node being connected to a preceding node corresponding to the interval preceding the node or to a following node corresponding to the node following the node, each node being assigned a partial interval length which is the sum of the interval length of the node itself and the interval lengths of one or more nodes on the end side of the node.

The invention of claim 45 realizes the invention of the claim 18 from a methodological standpoint and is a data processing method comprising a binary tree generating process for generating a binary tree representing a range of each interval based on the intervals in a code string consisting of one or more intervals, said binary tree having nodes each corresponding to an interval, the nodes being connected from the root to the ends in a tree-like structure, the end side of each node being connected to a preceding node corresponding to the interval preceding the node or to a following node corresponding to the node following the node, each node being assigned a partial interval length which is the sum of the interval length of the node itself and the interval lengths of one or more nodes on the end side of the node.

According to the invention as claimed in claims 18 and 45, the position of a node within the code string can be calculated, during retrieval or some other processing, based on the interval length of the preceding (following) node. The net interval length of a node can be calculated by subtracting the total of the interval lengths of the preceding and following nodes from the partial interval length of the node. Therefore, the code at a specific position within a code can be identified easily by comparing the specified position with the position and the interval length of each node.

And, the positional relation among nodes can be represented by the relation among nodes, the position of each node being calculated by the partial interval length of other nodes. This means that a change in part of an interval affects only the changed node and one or more nodes on the path from that node to the root, thus simplifying the change procedure.

According to the invention as claimed in claims 18 and 45, since a node is allocated to each interval, the system requires as many data blocks as intervals and so eliminates the need to use as many memory units as there are codes, thereby increasing memory usage efficiency. In particular, a binary tree in which data storage areas for the nodes are connected by pointers does not require a large consecutive area and therefore uses memory efficiently. The ability to use a precision most suitable for each interval allows the user to use any type of interval data such as floating-point data.

An invention according to claim 19 is a data processing system as claimed in claim 18, further comprising interval retrieving means for identifying an interval where a specified position indicating a position within the code string is included, wherein this interval retrieving means sequentially moves a current node, pointed to by a specified pointer, from the root to the end side; calculates the range of the current node based on the length of the preceding node and/or the following node directly connected to the end side of the current node; compares a calculated range with the specified position; moves the current node to the preceding node when the specified position precedes the calculated range; moves the current node to the following node when the specified position follows the calculated range; and identifies that the specified position is included in the current node when the specified position is included in the calculated range.

The invention of claim 46 realizes the invention of the claim 19 from a methodological standpoint and is a data processing method as claimed in claim 45, further comprising an interval retrieving process for identifying an interval where a specified position indicating a position within said code string is included, wherein this interval retrieving process sequentially moves a current node, pointed to by a specified pointer, from said root to said end side; calculates the range of the current node based on the length of said preceding node directly connected to the end side of the current node or a lower-level node which is the said following node; compares a calculated range with said specified position; moves the current node to the preceding node when the specified position precedes the calculated range; moves the current node to the following node when the specified position follows the calculated range; and identifies that the specified position is included in the current node when the specified position included in the calculated range.

According to the invention as claimed in claims 19 and 46, the interval retrieving means identifies an interval in which a specified position is included by moving the current node sequentially from the root to lower-level nodes, one level at a time, to compare the range of the current node with the specified position.

The invention of claim 19 an d 46 can be symmetrically applied by calculates the range of the current node based on the length of the following node.

An invention according to claim 20 is a data processing system as claimed in claim 18, further comprising an identifying means for identifying an interval corresponding to a specified node which is any given node in said binary tree, wherein the identifying means moves the current node, pointed to by a pointer, from said specified node toward the parent node, which is a higher-level node, of said current node, one node level at a time, until said root is reached, adds up the interval length of the node and the partial interval length of the preceding node or the following node of the node each time the current node is moved, depending upon whether a child node which is said current node before movement is said preceding node or said following node, and identifies an interval corresponding to said specified node by calculating one or both of a left interval length, which is the total interval length of the nodes preceding said specified node in L-C-R order or a right interval length, which is the total interval length of the nodes following said specified node in L-C-R order.

The invention of claim 47 realizes the invention of the claim 20 from a methodological standpoint and is a data processing method as claimed in claim 45, further comprising an identifying process for identifying an interval corresponding to a specified node which is any given node in said binary tree, wherein the identifying process moves the current node, pointed to by a pointer, from said specified node toward the parent node, which is a higher-level node, of said current node, one node level at a time, until said root is reached, adds up the interval length of the node and the partial interval length of the preceding node or the following node of the node each time the current node is moved, depending upon whether a child node which is said current node before movement is said preceding node or said following node, and identifies an interval corresponding to said specified node by calculating one or both of a left interval length, which is the total interval length of the nodes preceding said specified node in L-C-R order or a right interval length, which is the total interval length of the nodes following said specified node in L-C-R order.

According to the invention as claimed in claims 20 and 47, the (net) interval length of a node and the partial interval length of the preceding node or the following node of the node is added up as the current node is moved from the specified node to the root node, one node at a time. This process determines the position of the specified node through the interval lengths of the nodes that are right or left to the specified node in L-C-R order. According to the invention as claimed in claims 20 and 47, this simple procedure provided allows the position of the specified node to be identified, making is possible to perform various types of processing.

An invention according to claim 21 is a data processing system as claimed in claim 18, further comprising identifying means for identifying an interval corresponding to a specified node which is any given node in said binary tree, wherein the identifying means moves said specified node to said root by means of splaying.

According to the invention as claimed in claim 21, when the specified node becomes the root and when the left end of the interval for the whole binary tree is 0, the interval of the specified node is easily identified; that is, beginning position is the position following (+1) the partial interval length of the left child of the specified node and the terminating position is the position determined by subtracting partial interval length of the right child of the specified node from the partial interval length of the specified node.

An invention according to claim 22 is a data processing system as claimed in claim 18, further comprising binary tree updating means for updating the binary tree, when the interval is changed, according to the contents of the change.

The invention of claim 48 realizes the invention of the claim 22 from a methodological standpoint and is a data processing method as claimed in claim 45, 46, or 47, further comprising a binary tree updating process for updating said binary tree, when said interval is changed, according to the contents of the change.

According to the invention as claimed in claims 22 and 48, the binary tree updating means updates a binary tree when an interval is changed, eliminating the need to re-generates the binary tree.

An invention according to claim 23 is a data processing system as claimed in claim 22, wherein the binary tree updating means comprising: interval length changing means for changing the interval length; deleting means for deleting the node corresponding to a deleted interval from the binary tree when the interval is deleted; and adding means for adding a node corresponding to an added interval when an interval is added.

The invention of claim 49 realizes the invention of the claim 23 from a methodological standpoint and is a data processing met hod as claimed in claim 48, wherein said binary tree updating process comprising: an interval length changing process for changing said interval length; a deleting process for deleting said node corresponding to a deleted interval from said binary tree when said interval is deleted; and an adding process for adding a node corresponding to an added interval when an interval is added.

According to the invention as claimed in claims 23 and 49, the interval length changing means, the deleting means, or the adding means updates a binary tree when an interval length is changed, an interval is deleted, or an interval is added. Combining these means allows complex processing to be performed; for example, the intervals in a code string may be exchanged.

An invention according to claim 24 is a data processing system as claimed in claim 23, wherein the interval length changing means changes the partial interval length of each node sequentially from the node of the interval, whose length is to be changed, to the root by a changed length.

According to the invention as claimed in claim 24, even when the length of an interval is changed, only the nodes from that node to the root need be changed. Unlike a conventional system, the data processing system eliminates the need to move all the nodes corresponding to the intervals following the changed node, enhancing data processing efficiency.

An invention according to claim 25 is a data processing system as claimed in claim 23, wherein said interval length changing means moves said node of said interval, whose length is to be changed, to said root by means of splaying, and increases or decreases said partial interval length of the node, which is the root, by a changed length.

According to the invention as claimed in claim 25, processing is simplified because there is no need to change the partial interval lengths except that for the root.

An invention according to claim 26 is a data processing system as claimed in claim 23, wherein the adding means adds the node corresponding to the interval, which is to be added, to the binary tree, adjusts the connection sequence of the nodes, and adjusts the interval length of each node.

According to the invention as claimed in claim 26, the adding means adjusts the connection sequence and interval lengths of nodes to maintain the integrity of a binary tree.

An invention according to claim 27 is a data processing system as claimed in claim 26, wherein the adding means uses the sum of the partial interval length of the added node and the partial interval length of the lower-level node of the node as the partial interval length of the added node and, for the nodes on the path from the parent node to which the added node is connected directly as a lower-level node to the root, adds the interval length of the added node to the partial interval length of each of the nodes.

According to the invention as claimed in claim 27, the interval lengths are adjusted simply by adding the length of the added interval to each node on the path from the parent of the added node to the root.

An invention according to claim 28 is a data processing system as claimed in claim 23, wherein said adding means moves the node immediately preceding and following a position, at which a node is to be added, to said root by means of splaying one at a time, adds said node corresponding to an interval, which is to be added, at a position immediately following said immediately-preceding node or at a position immediately before said immediately-following node, and adds the interval length of the added node to the partial interval length of said immediately-preceding or immediately-following node or said added node, as necessary.

According to the invention as claimed in claim 28, processing is simplified because partial interval lengths need be changed (increased) only for a small number of nodes including the root node.

An invention according to claim 29 is a data processing system as claimed in claim 23, wherein said adding means adds said node corresponding to said interval, which is to be added, to said binary tree with the interval length of the node being 0, moves the added node to the root of said binary tree by means of splaying, and increases the partial interval length of the node, moved to the root, by the interval length of the added interval.

According to the invention as claimed in claim 29, processing is performed speedily because the partial interval length of a node need be increased only once using the desired addition algorithm.

An invention according to claim 30 is a data processing system as claimed in claim 23, wherein the deleting means deletes from the binary tree the node of the interval to be deleted, adjusts the connection among the nodes, and adjusts the interval length of each node.

According to the invention as claimed in claim 30, the deleting means adjusts the node connection sequence and the interval lengths to maintain the integrity, such as the sequence of the remaining intervals, of the binary tree.

An invention according to claim 31 is a data processing system as claimed in claim 23, wherein said deleting means moves said node corresponding to said interval, which is to be deleted, to the root by means of splaying, moves the node immediately preceding or following the node, which is to be deleted, to the root by means of splaying, decreases the partial interval length of said immediately-preceding or immediately-following node, which is the root, by the interval length of said node to be deleted, and deletes said node to be deleted.

According to the invention as claimed in claim 31, processing is performed speedily because only the node of the root need be adjusted during deletion.

An invention according to claim 32 is a data processing system as claimed in claim 22, further comprising structure adjusting means for adjusting the structure of the binary tree by changing the connection sequence of the nodes.

The invention of claim 50 realizes the invention of the claim 32 from a methodological standpoint and is a data processing method as claimed in claim 48, further comprising a structure adjusting process for adjusting the structure of said binary tree by changing the connection sequence of said nodes.

According to the invention as claimed in claims 32 and 50, the structure adjustment prevents only a particular part of the binary tree from being increased, making a plurality of paths, each from the root to a node, approximately equal in length. In this way, it prevents the data processing time from being increased just because the associated path is too long, thereby making various types of data processing, such as retrieval or update, more efficient.

An invention according to claim 33 is a data processing system as claimed in claim 32, wherein rotation, double rotation (zig-zig) and double rotation (zig-zag) are used as a structure adjustment procedure for changing the structure while maintaining the sequence of the nodes of the binary tree.

According to the invention as claimed in claim 33, the structure adjustment is performed according to the status of the binary tree, because a plurality of processing types are combined to change the structure of a specified range of the binary tree.

An invention according to claim 34 is a data processing system as claimed in claim 32, wherein said structure adjusting means adjusts said binary tree by means of splaying through which a target node, which is any of said nodes, is moved to said root.

According to the invention as claimed in claim 34, a target node is moved to the root by means of splaying and, at the same time, the length of a path from a node, which is on the path from the target node to the original root, is reduced in most cases. Because of this, various types of processing for the binary tree is performed speedily.

An invention according to claim 35 is a data processing system as claimed in claim 19, wherein the code string is text containing a plurality of lines, the interval is a line included in the text, and the binary tree generating means generates a first binary tree representing the sequence of lines with nodes corresponding to one or more lines in the text and a second binary tree representing the sequence of codes in each line with nodes each corresponding to one or more characters on the line.

According to the invention as claimed in claim 35, one type of binary tree representing the sequence of lines and an other type of tree representing the content of each line are created separately. Therefore, when either the sequence of lines or the content of a line is changed, there is no need for changing the other type of binary tree. This ensures efficient code string processing.

An invention according to claim 36 is a data processing system as claimed in claim 19, wherein the code string is text containing a plurality of lines of a fixed length, and the binary tree generating means sets a blank character in a position where no character is present and generates the binary tree by representing each substring of the text as a single node with a character or a blank character occurring consecutively as a label and with the number of consecutive characters as the interval length.

According to the invention as claimed in claim 36, data can be represented as a single simply-structured binary tree. In addition, according to the invention as claimed in claim 36, representing consecutive characters or blanks with a single node increases both processing efficiency and memory efficiency.

Other and further objects, functions, and advantages of the present invention will be more fully understood by the following detailed description.

BRIEF DESCRIPTION OF THE DRAWINGS

FIG. 50 is a conceptual diagram showing the data format for each node in the sixth embodiment of this invention;

FIG. 70 (b) is a diagram showing one type of rebalancing (single rotation) when condition 2 is not satisfied in the sixth embodiment of this invention;

FIG. 70 (c) is a diagram showing one type of rebalancing (double rotation) when condition 2 is not satisfied in the sixth embodiment of this invention;

FIG. 75 shows an example of a pattern in a character string used in a conventional code string retrieval method;

FIG. 81 shows an example of data used in a conventional first method;

FIG. 82 shows an example of data used in a conventional first method (insert);

SYMBOLS

Figure 1:
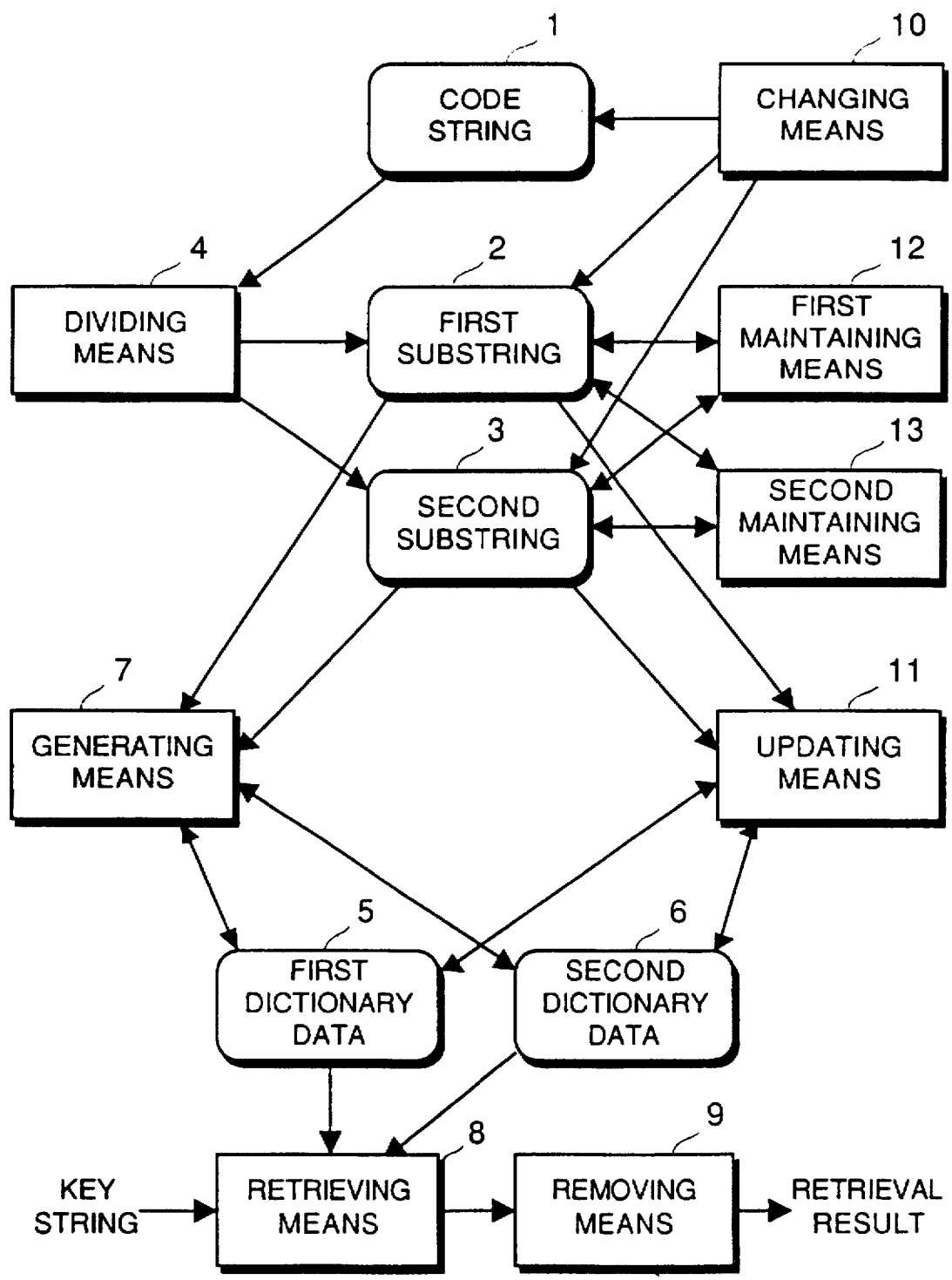
FIG. 1 is a functional block diagram showing the configuration of the first embodiment of this invention.

1: Code string
2: First substring
3: Second substring
4: Dividing means
5: First dictionary data
6: Second dictionary data
7: Generating means
8: Retrieving means
9: Removing means
10: Changing means
11: Updating means
12: First maintaining means
13: Second maintaining means
31: Binary tree
32: Binary tree generating means
33: Interval retrieving means
34: Binary tree updating means
41: Interval length changing means
42: Adding means
43: Deleting means
45: Structure adjusting means

DETAILED DESCRIPTION

Referring to the attached drawings, there is shown a preferred embodiment (hereafter called embodiment) of the this invention. Notice that the embodiment described below is implemented on a computer and that each function of the embodiment is implemented by a procedure (program) controlling this computer.

Each "means" mentioned in this specification refers to a conceptual equivalent of each function of this embodiment; that is, there is not always a one-to-one correspondence between means and particular pieces of hardware or software routines. One piece of hardware sometimes comprises different means. For example, a computer serves as a means when executing an instruction, but serves as another means when executing another instruction. In addition, one means may be implemented by one instruction in some cases, but by a plurality of instructions in some other cases.

Therefore, this specification describes an embodiment with the use of virtual circuit blocks (means) each having its own function of the embodiment. Note that an embodiment implemented by a computer is only an example; all or part of this invention may be packaged, if possible, on an electronic circuit such as a custom chip (custom-made integrated circuit).

The computer used in the embodiment usually consists of the CPU (central processing unit) and main storage composed of RAM (random-access memory). A computer of any size, for example, a microcomputer, personal computer, small computer, workstation, or mainframe computer may be used.

Typically, the computer has input devices such as a keyboard and a mouse, external storage units such as a hard disk, output devices such as a CRT display or a printer, and other required input/output control circuits.

The computer may be built in any configuration, and one or more components may be added, changed or removed as far as the configuration does not depart from the characteristics of this invention. For example, the embodiment may be built on a computer network to which a plurality of computers are connected. Any type of CPU may be used, a plurality of CPUs may be used at the same time, or a single CPU may be used in the time-sharing manner to process a plurality of processes concurrently. Other types of input device (pointing devices such as a touch panel, light pen, and track ball, image input devices such as a digitizer, image reader, and video camera, voice recognition devices, or various types of sensors) may be used. Other external storage devices (floppy disk device, RAM card reader, magnetic tape device, optical disk device, magneto-optical (MO) disk device, bubble memory device, and flash memory card) may be used. Other output devices (liquid crystal display, plasma display device, video projector, LED display device, voice generator, and voice synthesizer) may be used In a typical software configuration of this computer, a program executing each function of this embodiment runs as an application program under the operating system (OS). Typically, the machine language generated by compiling a program coded in a high-level language or assembler is used. However, the software configuration of this computer is free, and may be changed as far as this invention is implemented. For example, the OS need not always be used, and any programming language may be used. An interpreter (serially interpretive execution) such as BASIC may be used to code a program.

The program may be stored on any storage device. It may be in ROM (Read-Only Memory) or it may be on an external storage device such as a hard disk; in the latter case, the program is loaded (read) into main memory when the computer or the process is started. In addition, the program may be divided into a plurality of modules which are stored on an external storage device. In this case, only the modules necessary for processing are read into main memory. Each program module may be stored on a storage device most suitable for it.

The sequence of steps of a procedure used in this embodiment may be changed, a plurality of steps may be executed concurrently, or the steps may be executed in a different sequence each time the program is executed, as far as the steps do not depart from the characteristics of this invention. The ability to change the sequence of execution is implemented by the menu-driven interface which allows the user to select processing he wants to execute.

The "input" mentioned in this specification implies not only the input of data but also other types of processing closely related with data input. They include the echo-back, modification, and editing of entered data. And, the "output" mentioned in this specification implies not only the output of data but also other types of processing closely related with data output. They include the entry of ranges to be output or instruction of screen scrolling. Also, input and output may be integrated into an interactive input/output operation and, through this integrated operation, the user may select, specify or identify processing to be performed.

Data (information) or data storage means mentioned in this specification may exist on the computer in any form. For example, data, which is described in this specification to reside on a hard disk, may be in main storage, an external storage unit, CPU register, or cache memory. In addition, data may be held in any form. For example, data may be stored in a file or in memory or a disk to allow direct access by means of physical addresses. The code of a character string may be represented in characters or words. Data may be stored for any period of time; it may be volatile after a specified time. Data not to be changed, for example dictionary data, may be stored in ROM.

References in this specification to a specific item do not imply that only that item is used. That is, in this invention, general items needed for the operation of this invention, such as pointers, counters, flags, parameters, and buffers are used as necessary.

Unless otherwise specified, information necessary for each portion of this embodiment is obtained from other portions holding the information. For example, information may be obtained by accessing variables or memory holding necessary information. Information may be erased or deleted, not only by deleting the information from a storage area, but also by setting a flag indicating the erasure of the information.

1. FIRST EMBODIMENT

It is an object of the first embodiment to provide a data retrieval system and a data processing method which update data speedily. It is another object of the first embodiment to provide a data retrieval system and a data retrieval method which process data speedily. It is still another object of the first embodiment to provide a data retrieval system and data retrieval method which process data using a simple procedure.

[1-1. Configuration of the First Embodiment]

FIG. 1 is a functional block diagram showing the configuration of the first embodiment.

The data retrieval system in the first embodiment has the dividing means 4 which determines a plurality of the first substrings 2, each bounded by the first boundary and each longer than the maximum key length, and the second substrings 3, each bounded by the second boundary and each of which includes all the substring of maximum key length crossing the first boundary.

The data retrieval system in the first embodiment has the generating means 7 which generates dictionary data 5 and 6 indicating the correspondence between the trailing string in each substring and the starting position of that trailing string within the code string. The data retrieval system in the first embodiment also has the retrieving means 8 which retrieves trailing strings, within each substring, containing all or part of the key string as the leading string and their starting positions, and the removing means 9 which finds and removes a duplication in the starting positions of trailing substrings.

In addition, the data retrieval system in the first embodiment has the changing means 10 which changes the code string, and the updating means 11 which updates dictionary data associated with changed data. The data retrieval system in the first embodiment also has the first maintaining means 12 which maintains the boundary interval at the maximum key length or longer and the second maintaining means 13 which maintains the boundary interval at a specified length or less.

[1-2. Operation and Effects of the First Embodiment]

The first embodiment with the configuration described above operates as follows:

[1-2-1. Code String Division Process]

The code string used in the first embodiment is a character string, one character being represented by one code value. First, the dividing means 4 divides the code string into the first substrings 2, each bounded by the first boundary and each longer than the maximum key length (hereafter called "k"). In addition, the dividing means 4 divides the code string 1 into second substrings 3, each extending across the first boundary and each being k or longer apart from the first boundary on each side.

Figure 2:
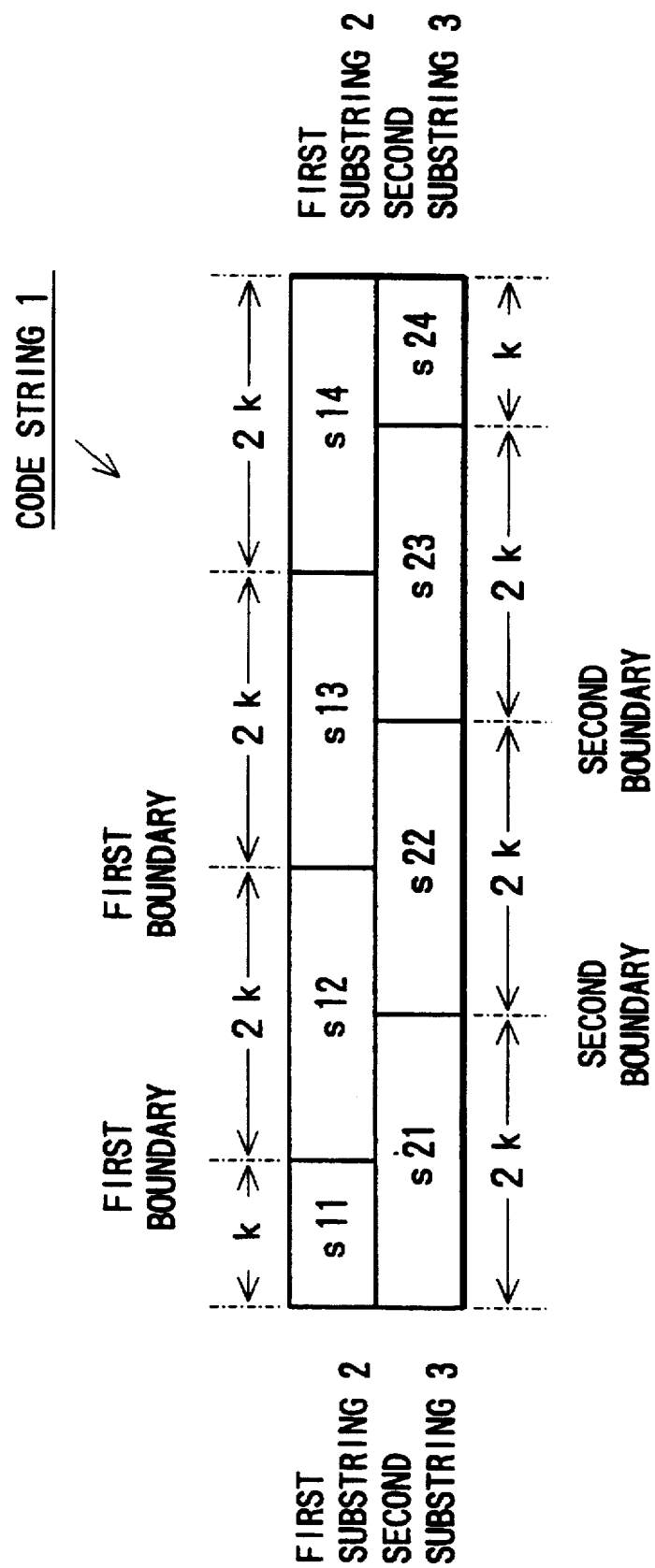
FIG. 2 shows an example of substrings in the first embodiment of this invention.

This is done, for example, by setting the first boundary and the second boundary alternately in the code string 1 and by setting the boundary interval (number of characters) between each two boundaries (first and second) to k or longer. FIG. 2 shows an example of a code string which is divided into the first substrings sli (sll to s14) and into the second substrings s2i (s21 to s24).

[1-2-2. Dictionary Data Generation Process]

The generating means 7 generates dictionary data 5 and 6 for each substring 2 and substring 3. This data indicates all the trailing strings in each substring and the start position of that trailing strings. In this embodiment, the substring itself is thought of as one of trailing strings.

Dictionary data 5 and 6 in the first embodiment is a suffix tree (hereafter called "tree"). A tree is a data structure from the root to end nodes with a plurality of nodes in between. Each non-end node is an edge connected to one or more nodes which are connected directly or indirectly to an end node. Each edge is assigned a label, and each end node corresponds to each trailing string of a substring. Connecting the labels of the paths, from the root to an end node, comprises a trailing string.

Figure 3:
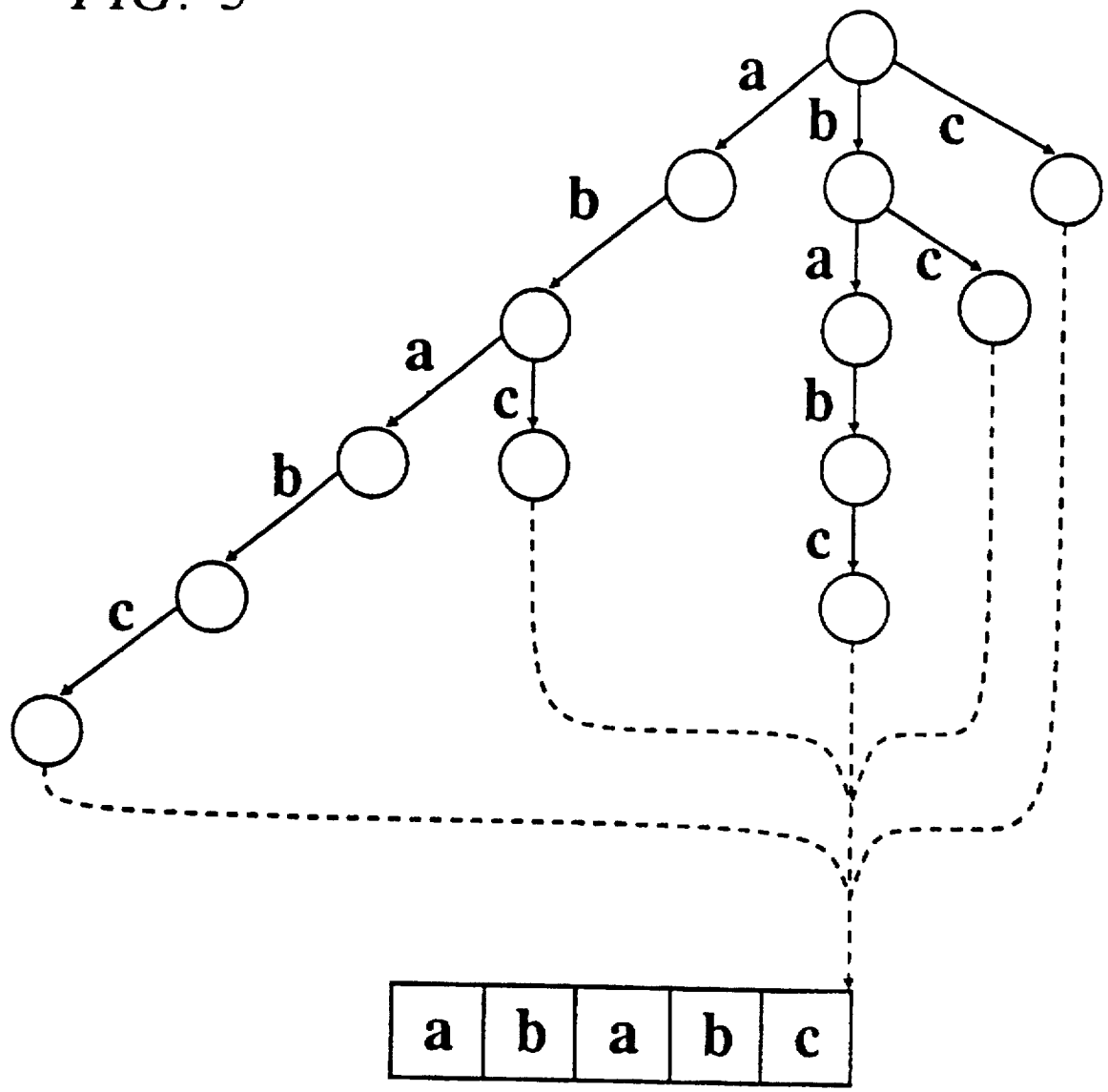
FIG. 3 shows an suffix tree in the first embodiment of this invention.

FIG. 3 is an example of a tree representing dictionary data of the substring "ababc". This tree serves as dictionary data representing the correspondence between trailing strings and their positions.

| | |
|---|---|
| ababc: | 0 |
| abc: | 2 |
| babc: | 1 |
| bc: | 3 |
| c: | 4 |

In this tree, positions 0 to 4 are represented implicitly. That is, each end node has a pointer indicating that the end position of the trailing string for the end node is the end of the substring, and the position is determined by subtracting the number of characters of each trailing string from the length of a substring. This means that, because a trailing string ends at the end of the substring, each trailing string is uniquely identified once the start position is determined. For example, the number of the trailing string "abc" is 3 and it ends at the end of the substring "ababc" and, so, the starting position is determined to be 2.

In the above description, only the trailing strings, each starting at each position, are treated. However because a trailing string containing all or part of the key string as the lending string (preceding part) is retrieved in the first embodiment, this tree serves as dictionary data indicating the correspondence between the following substrings and their positions.

| | |
|---|---|
| a: | 0 |
| a: | 2 |
| a: | 5 |
| ab: | 0 |
| ab: | 2 |
| ab: | 5 |
| aba: | 0 |
| abab: | 0 |

-continued

| | |
|---|---|
| ababc: | 0 |
| abc: | 2 |
| abca: | 2 |
| abcab: | 2 |
| b: | 1 |
| b: | 3 |
| b: | 6 |
| ba: | 1 |
| bab: | 1 |
| babc: | 1 |
| bc: | 3 |
| bca: | 3 |
| bcab: | 3 |
| c: | 4 |
| ca: | 4 |
| cab: | 4 |

In the first embodiment, the processing procedure is simplified because each label represents one character which is the unit of the code string.

Figure 4:
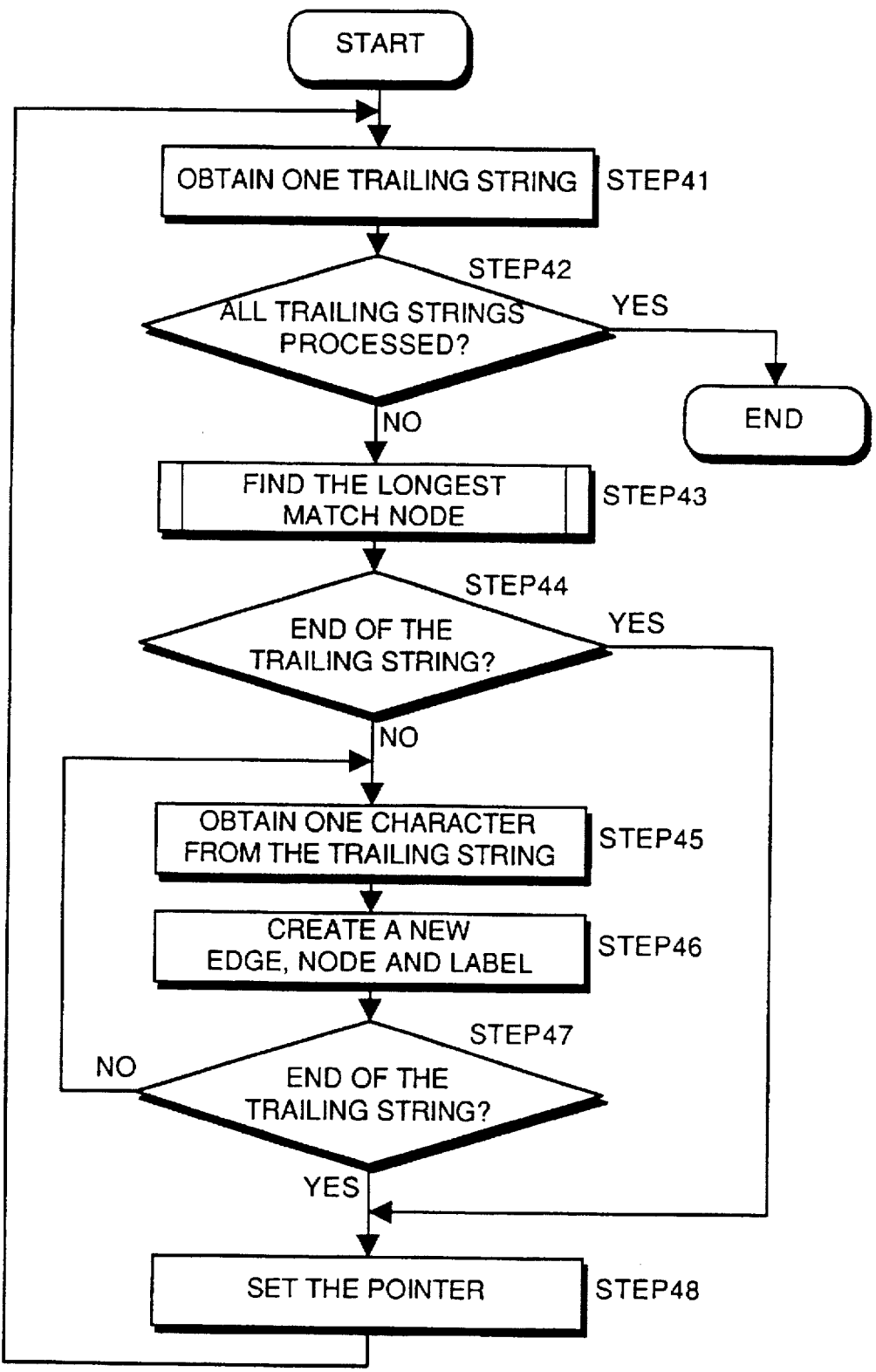
FIG. 4 is a flowchart showing the procedure for generating a suffix tree in the first embodiment of this invention.

FIG. 4 is a flowchart showing the procedure to create a tree from substrings. In this procedure, trailing substrings are retrieved, one at at time, from the substring (step 41), and the following processing is repeated for all possible trailing strings (step 41).

First, the procedure uses a trailing string as the key string to find the longest match node of the trailing string (step 43). The longest match node is a node at which the last match of the key code string, consisting of one or more labels beginning at the root, occurs. The procedure for finding it is described below. If the key string does not end when the longest match node is found (step 44), it is determined that the trailing string is not any of the already-stored trailing strings.

Then, the following unmatched character is obtained, one at a time, from the trailing string (step 45), a new edge is created at the node being processed at that time (hereafter called a current node), a new node is created at the end of the path, and the obtained one character is set in the node (step 46). Note that the current node when the longest match node is found is the longest match node itself.

When this process is repeated until the last character of the trailing string is processed (step 47), a sequence of edges, consisting of all the characters of the trailing string as its labels, is created. Then, the end pointer pointing to the end of the substring is set in the current node at this time (step 48).

When the key string ends before the longest match node is reached in step 44, a path is already created for the trailing string that is used as the key string and, so, an end pointer is set in this node assuming that the longest match node is the end node. The starting position of each substring may be set in each end node.

Figure 5:
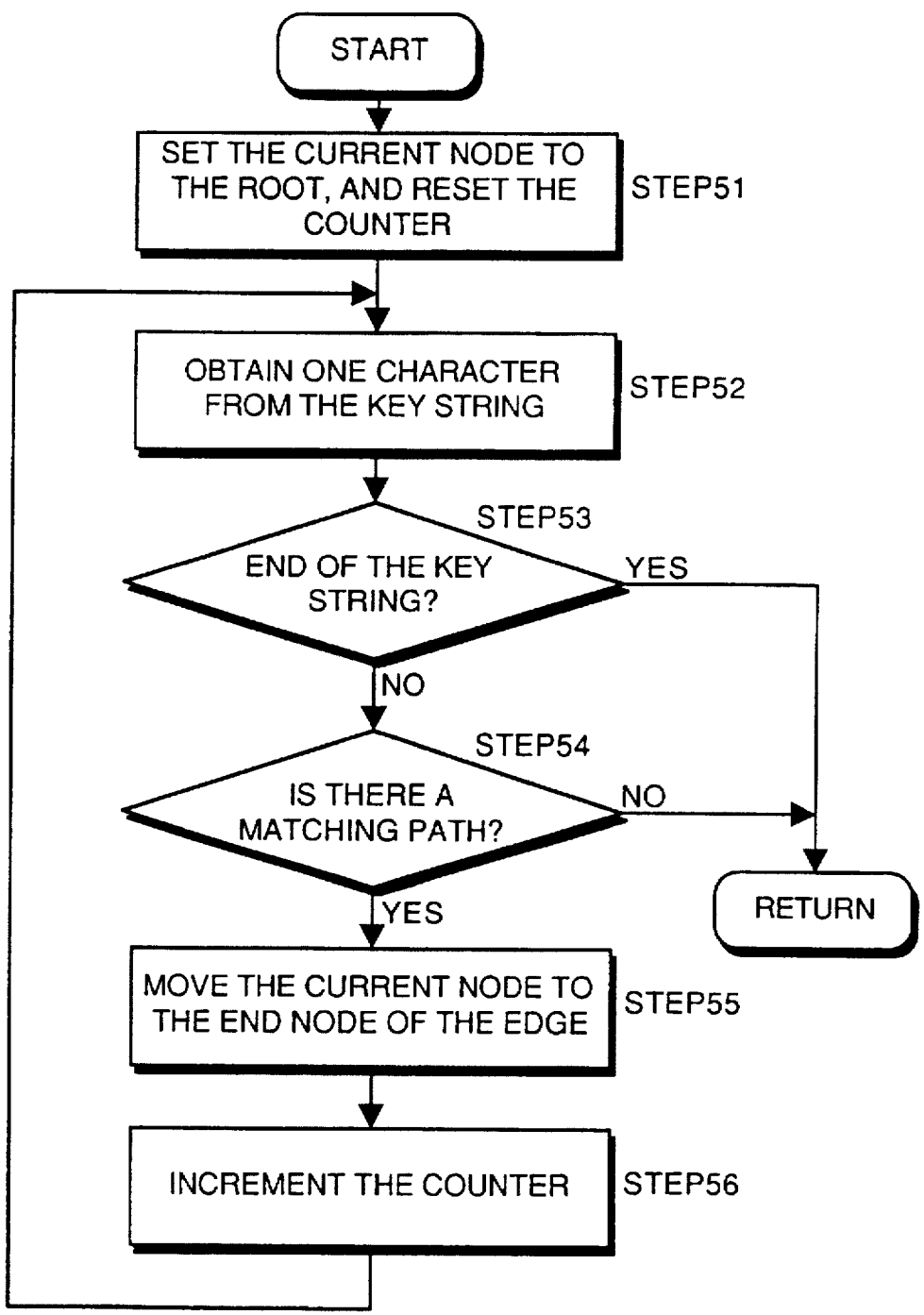
FIG. 5 is a flowchart showing the procedure for finding a longest match node in the first embodiment of this invention.

FIG. 5 shows the procedure for finding the longest match node in step 43. In this procedure, the current node is set to the root, and the counter is reset (step 51). Characters are obtained from the key string, beginning at the start of the key string and one character at a time (step 52), until the key string ends (step 53). As long as there is a matching edge for the obtained character (step 54), the current node is moved to the end of the edge (step 55), and the counter is incremented (step 56). The process of traversing a label corresponding to a character is repeated in this manner, and the current node when the procedure ends in step 53 or 54 is determined to be the longest match node. At this time, the counter contains the number of codes that match the key string.

[1-2-3. Data Retrieval Process and Deletion Process]

Figure 6:
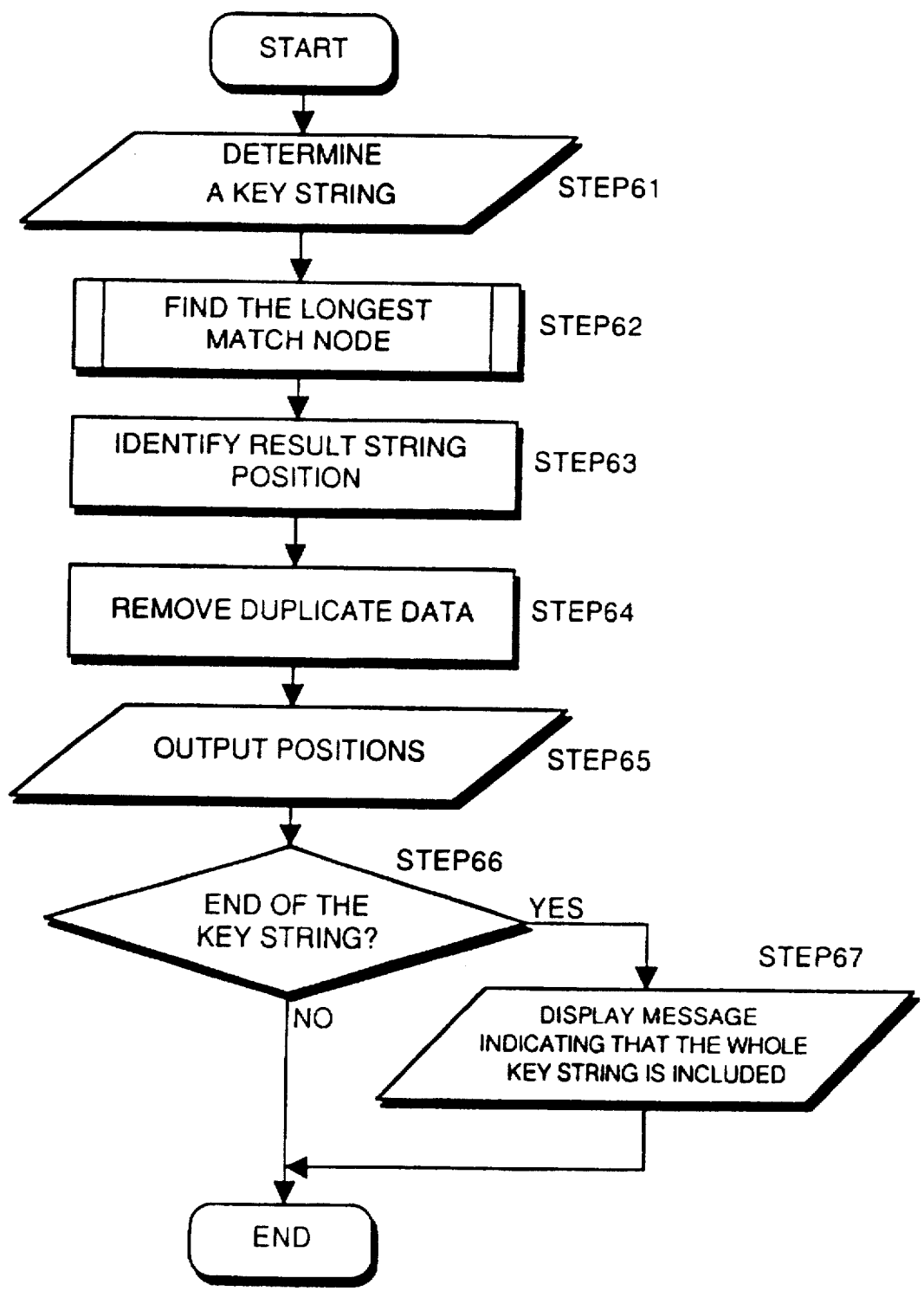
FIG. 6 is a flowchart showing the procedure for retrieving data in the first embodiment of this invention.

FIG. 6 shows the procedure for retrieving data. First, a key string, k or shorter in length, is determined (step 61). The length of the key string is limited to k or shorter in this case. However, since a key string is much shorter than a code string in most cases, there is little disadvantage of this limitation.

The retrieving means 8 finds the longest match node of the key string from the dictionary data 5 and 6 according to the procedure shown in FIG. 5 (step 62). The number of trailing strings obtained as the result of retrieval (hereafter called result strings) equals the number of pointers set up on the end nodes (sub-trees) of the longest match node that was found.

Then, the position of each result string is identified (step 63). The position of each result string can be calculated using the length of the substring and the number of characters of each result string. The number of characters of each result string equals the number of edges from the root to the end node of the result string; therefore, it can be calculated by traversing from the end node to the root or the longest match node to count the number of edges.

The removing means 9 removes the duplicate positions (step 64) and outputs the positions (step 65). Because retrieval is performed for both the first and the second dictionary data, that is, dictionary data 5 and 6, those strings that do not extend across the first and the second boundaries are found doubly. The removing means 9 removes this duplicate entries as described above, preventing confusion.

In the first embodiment, the retrieval time depends, not on the code string length, but approximately on the number of occurrences. This means that retrieving a key string from a long code string does not take long.

In addition, in the first embodiment, the retrieving means 8 retrieves not only the position of a trailing string containing the whole key string, but also the position of a trailing string containing part of the key string. So, even if the whole key string is not found, the retrieving means 8 returns result strings closely related with the key string. In particular, in the first embodiment, the retrieving means 8 traverses the tree edges according to the codes of the key string to identify a trailing string which contains part of the key string and which has the maximum number of matching codes, providing the result string most close to the key string. It also outputs result strings and the number of codes that match the key string, making it possible to determine how the result string is close to the key string.

When the end of the key string is already reached at the time the retrieving means 8 ends finding result strings (step 66), the trailing string contains the whole key string. In this case, the retrieving means 8 outputs a message indicating that a whole string match as well as, or instead of, the number of matching codes (step 67).

[1-2-4. Code String Change Process and Dictionary Data Update Process

Figure 7:
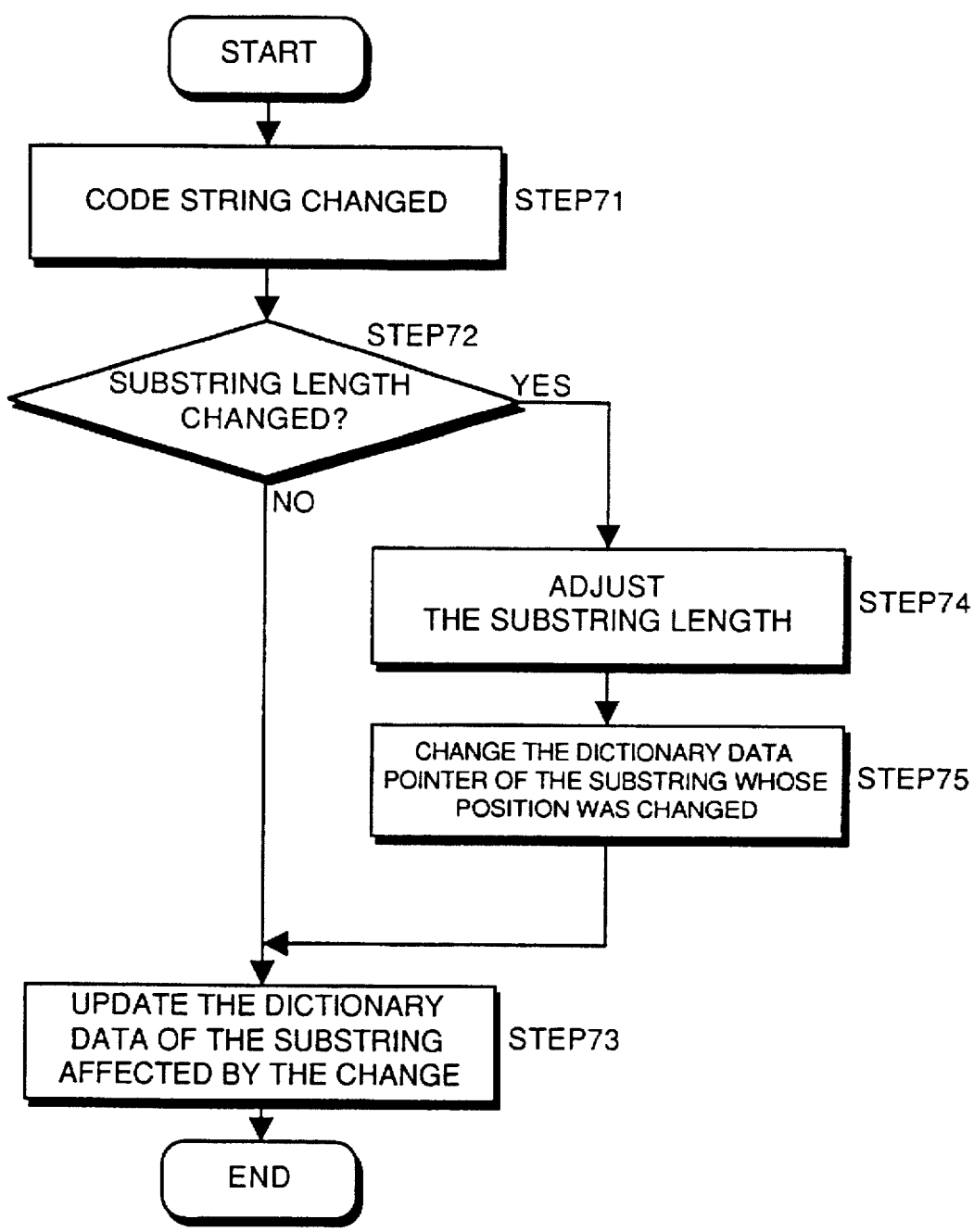
FIG. 7 is a flowchart showing the procedure for changing a code string used in the first embodiment of this invention.

FIG. 7 is a flowchart showing the procedure for changing a code string. The changing means 10 in FIG. 1 changes a code string, more specifically, a substring to be changed (step 71). Then, it determines whether or not the length of the changed substring has been changed (step 72). If the length has not been changed, the updating means 11 updates the dictionary data 5 and 6 of the substring that was updated.

When updating them, the updating means 11 adds one or more trailing strings, generated as a result of updating, to the tree and then removes trailing strings containing part of all of a substring to be changed. Updating data in this order allows part of the tree structure, which is not affected by the change, to be used unchanged, reducing the update time.

When removing part of a substring affected by the change, related nodes and edges are removed while going up the tree from the end node of a trailing string to be removed to the root. This removal ends when there a node having an edge or a pointer to a trailing string except that is connected to the removed node or pointer is encountered.

Data may be added to the tree according to the procedure shown in FIG. 4. Note that, in procedure shown in FIG. 4, a check is made to see if data about a trailing string to be added is already in dictionary data 5 and 6 (tree) at change time, and only data about a trailing string not yet added is added. Therefore, as compared with a method in which dictionary data 5 and 6 is re-generated, the update time is reduced.

[1-2-5. Maintaining the Boundary Interval and Substring Length ]

When the length of a substring is changed (step 72), the length of the substring is adjusted before updating dictionary data (step 73). During this adjustment, the first maintaining means 12 maintains the boundary interval at k or longer, no part of the code string of length k or shorter is divided both by the first boundary and the second boundary at the same time.

Figure 8:
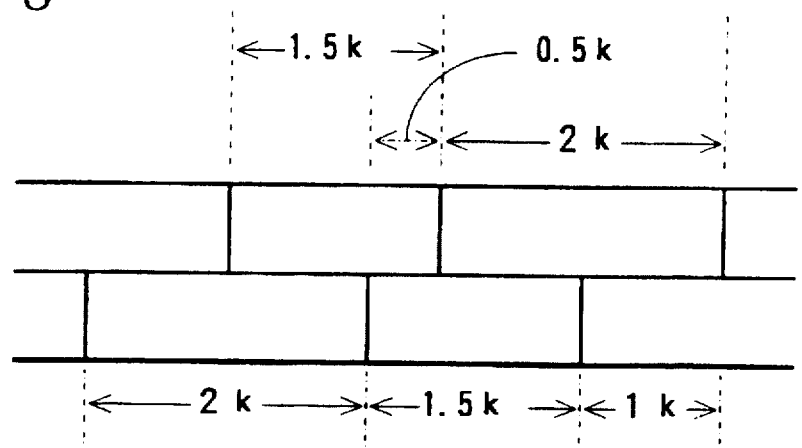
FIG. 8 shows an example of a substring in the first embodiment of this invention.
Figure 9:
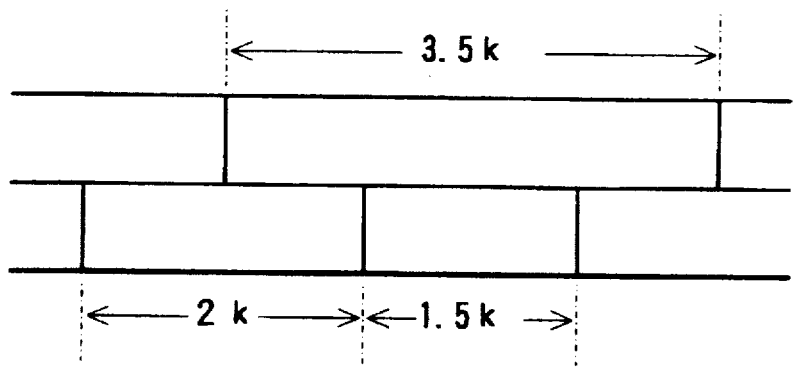
FIG. 9 shows an example of a substring in the first embodiment of this invention.
Figure 10:
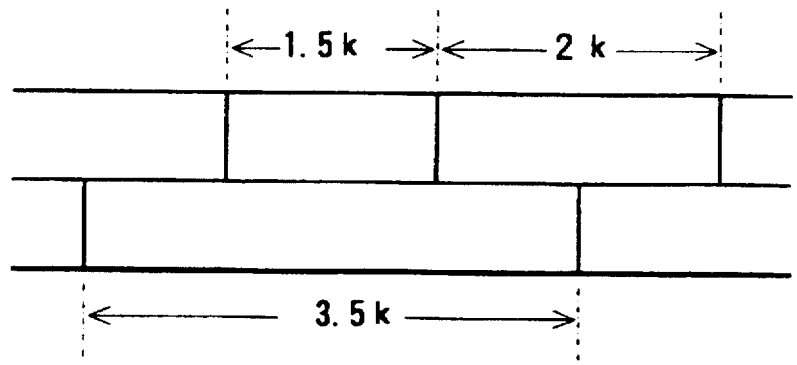
FIG. 10 shows an example of a substring in the first embodiment of this invention.

More specifically, the first maintaining means 12 maintains the boundary interval at k or longer as follows. When the boundary interval is less than k (FIG. 8), the first maintaining means 12 erases one of two boundaries associated with the interval (FIG. 9, FIG. 10). In this case, the first maintaining means 12 erases one of two boundaries so that the combined substring, generated as a result of erasure, is shorter in length. This prevents the update time from being increased even when the size of the combined substrings is increased.

The second maintaining means 13 maintains the length of a substring (interval) at a value less than a specified length. This also prevents the update time from being increased even when the size of dictionary data 5 and 6 is increased as a result of a change in the code string. The following shows an example of how the length of an interval is maintained. In this example, the length of a substring is maintained at a value less than six times of k.

Figure 11:
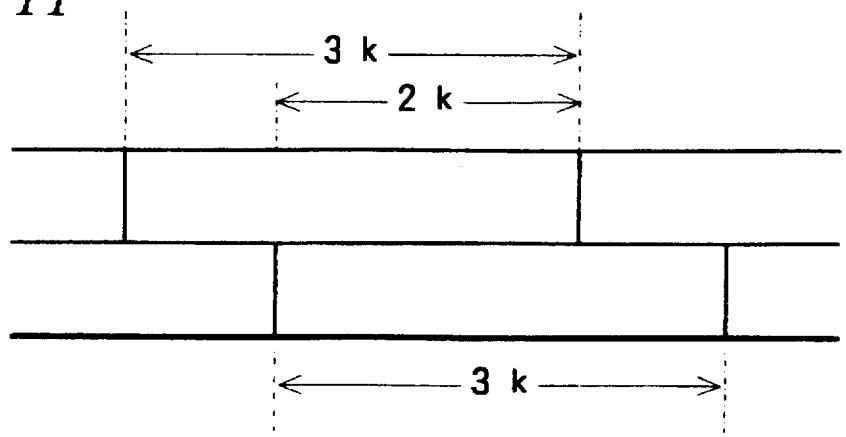
FIG. 11 shows an example of a substring in the first embodiment of this invention.
Figure 12:
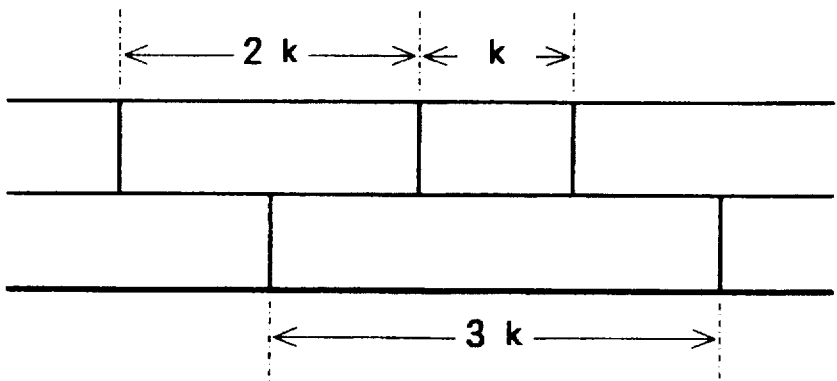
FIG. 12 shows an example of a substring in the first embodiment of this invention.
Figure 13:
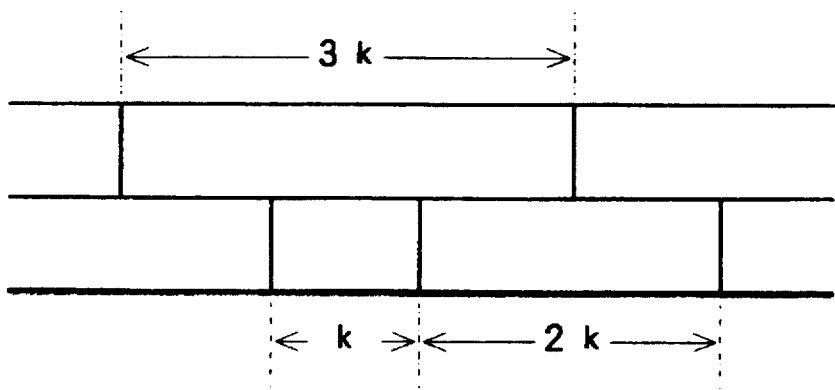
FIG. 13 shows an example of a substring in the first embodiment of this invention.

When an interval between the first boundary and the second boundary is 2k or longer (FIG. 11), the second maintaining means 13 creates the first substring or the second substring at a position that is at least k apart from both boundaries of the interval (FIG. 12, FIG. 13).

Figure 14:
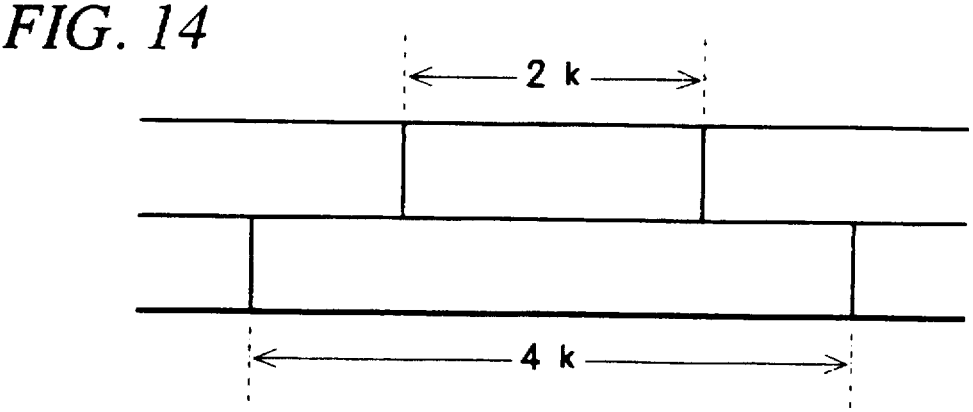
FIG. 14 shows an example of a substring in the first embodiment of this invention.
Figure 15:
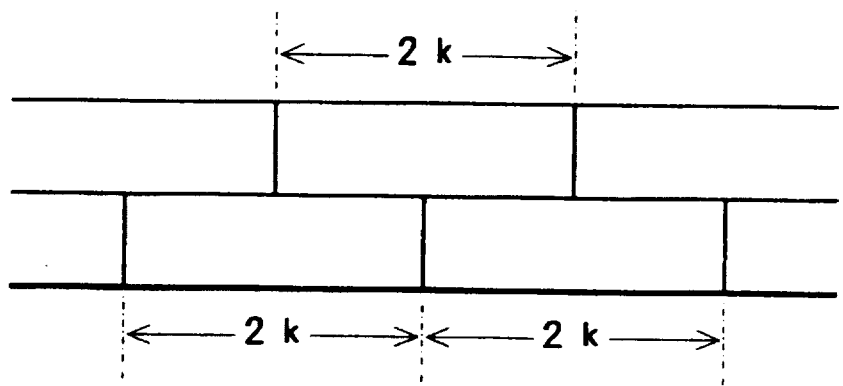
FIG. 15 shows an example of a substring in the first embodiment of this invention.

In addition, when the interval between the adjoining first boundaries is 2k or longer and when there is no second boundary in between (FIG. 14), the second maintaining means 13 sets the second boundary at a position k or longer apart from the adjoining first boundary (at the middle of the boundaries) (FIG. 15). This processing is applicable when the first boundary and the second boundary are reversed.

When the length of a substring is changed, the position in the code string pointed to by the pointer, contained in dictionary data 5 and 6 (tree), is changed.

As described above, when a code string is changed, only dictionary data 5 and 6 about the substrings affected by the change need be updated. Thus, the update time can be reduced. The update time depends on the lengths of the affected substring, not on the length of the original code string. This makes it possible to provide a data retrieval system that can be used even when updating is performed frequently. The actual retrieval time depends on the embodiment.

2. SECOND EMBODIMENT

In the first embodiment, pointers are set in all the end nodes. However, a pointer pointing to the end of a substring need be set only for the end node of the trailing string which is the substring. And, for a trailing string which is the substring and each of other trailing strings, a second edge from the end node of a trailing string, to another trailing string which is shorter than the trailing string by one code, may be used (second embodiment).

Figure 16:
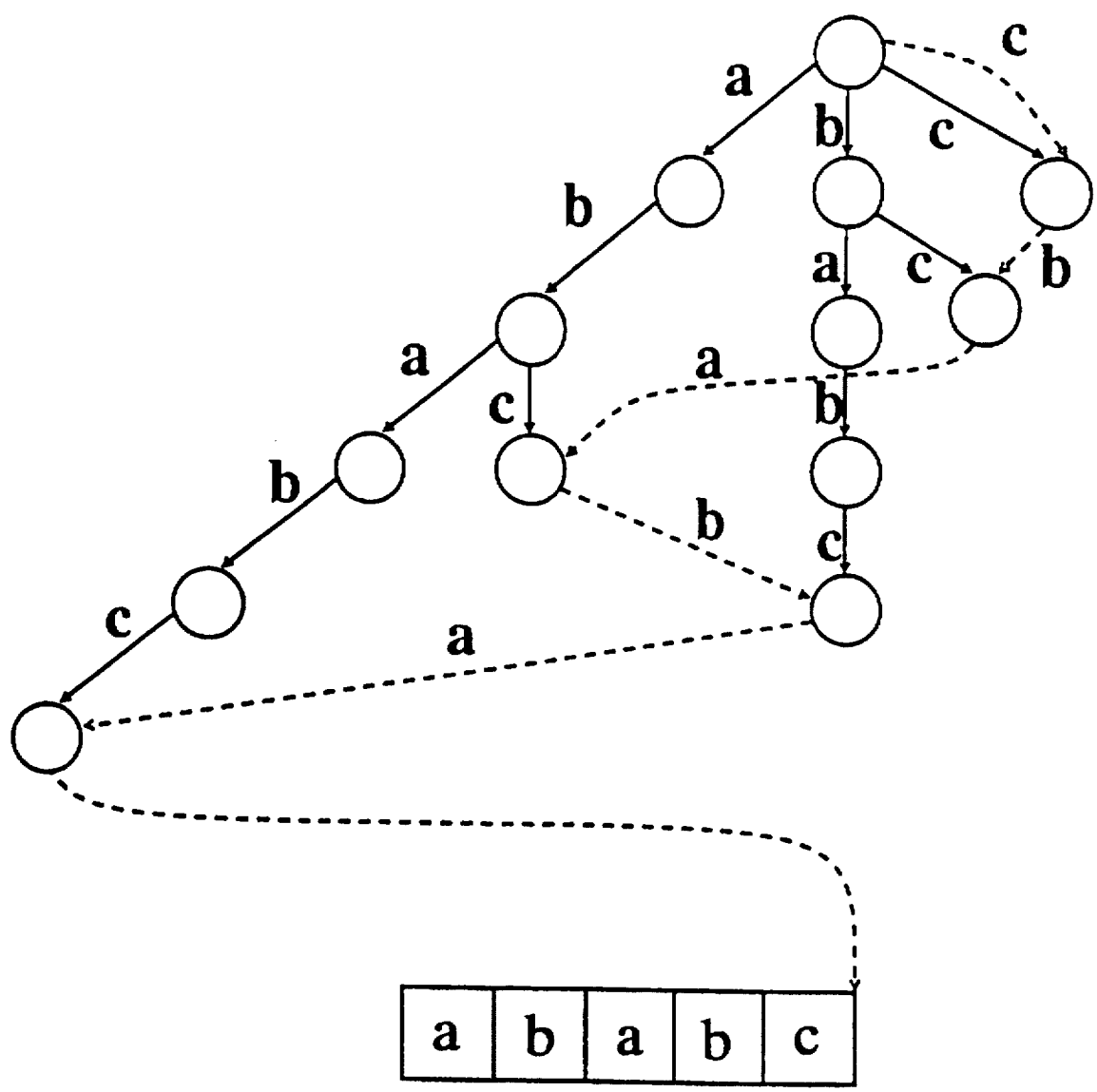
FIG. 16 shows an example of a suffix tree in the second embodiment of this invention.

FIG. 16 shows an example of the second embodiment, with the dotted line indicating the second edge.

The number of second edges from an end node without a pointer to an end node with a pointer equals the difference between the positions of two trailing strings corresponding to the two nodes. Therefore, the position from the beginning of a trailing string can be determined according to this difference, eliminating the need to traverse the tree for each trailing string.

When the position of a substring is changed, only one pointer need be changed and, so, the processing speed is higher than that of the first embodiment where as many pointers as the number of end nodes must be changed. This is especially advantageous when a plurality of dictionary data units are implemented by a tree and the data structure in the tree becomes complex.

In the second embodiment, data about a code string is represented as follows: character sequence data is represented by the structure of the tree, character position data is represented by pointers, and those pointers are integrated. This enables character sequence data and character position data to be separate, allowing an algorithm most suitable for each data to be used. In addition, the ability to share a tree by a plurality of substrings as well as the ability to move a substring within the code string efficiently speeds up various functions such as editing.

The second edge connects two trailing string nodes, one of which is longer than the other by one code. This code may be used as a label in the second edge (FIG. 16). This structure allows the contents of a substring to be restored by connecting labels while going up from the end node with a pointer through the second edge. This eliminates the need for the substring on which the tree is based, requiring less memory. The time required to restore the substring does not depend on the length of the original code string.

A substring may also be restored by traversing the edge to the end node in the backward direction to the root to reverse the label order.

3. THIRD EMBODIMENT

Figure 17:
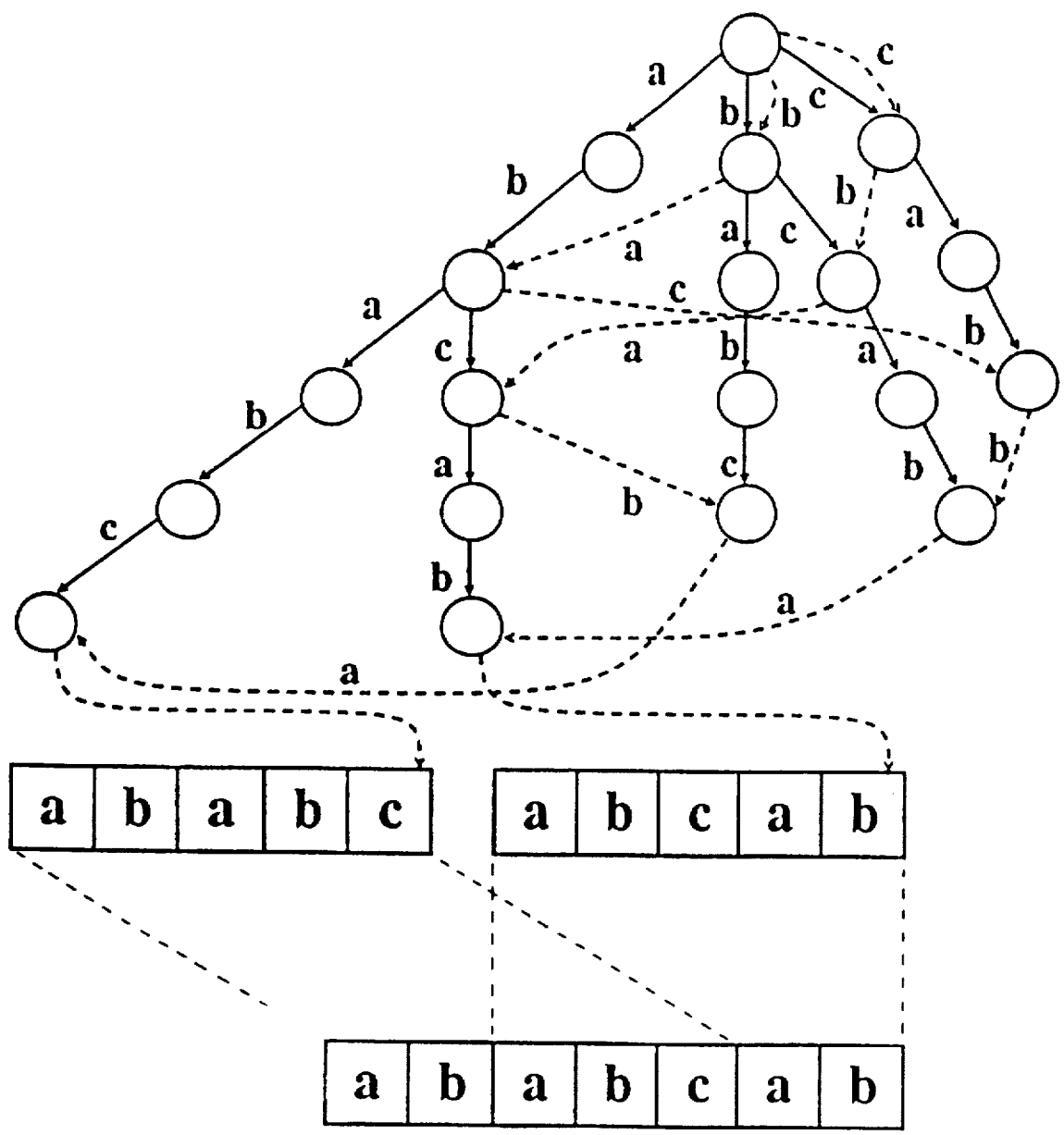
FIG. 17 shows an example of a suffix tree in the third embodiment of this invention.

Dictionary data of each of a plurality of substrings may be created as a single tree (third embodiment ). FIG. 17 shows an example of this tree. This tree serves two functions: dictionary data for the leading string "ababc" and the trailing string "abcab" of the code string "ababcab". Each pointer points to the end of each substring.

In the third embodiment, the number of required trees is less than that required when an independent tree is created for each dictionary data unit and therefore less memory is required. The third embodiment is effective especially for a code string containing a plurality of identical or similar components. In the third embodiment, the tree size depends on the maximum length of a substring and the number of substrings, the retrieval time depends on the product of the maximum length of a substring and the occurrence position, and the update time depends on the product of the maximum length of a substring and the number of substrings to be changed.

If a single tree contains many trailing strings as the code length becomes long and/or has many substrings, it is expected that the amount of processing involved in updating the tree and the increase ratio of processing amount will be reduced.

4. FOURTH EMBODIMENT

Figure 18:
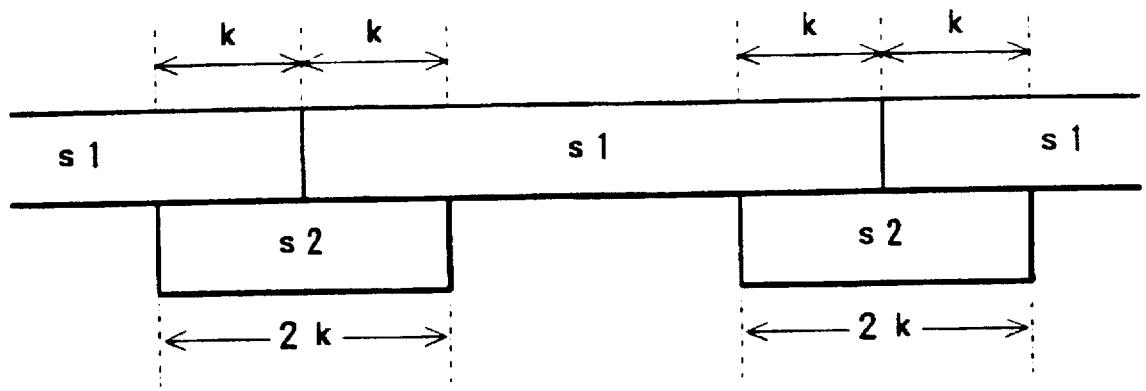
FIG. 18 shows an example of a substring in the fourth embodiment of this invention.

The second substrings need not be consecutive; each of them need only extend across the first boundary and, in addition, be k or longer apart from each side of the first boundary (fourth embodiment). FIG. 18 shows an example of a substring used in the fourth embodiment. In the fourth embodiment like this, any part within the length of k is never divided by the first boundary and the second boundary at the same time. So, when the key string corresponds to this part, this part is always detected in the first substring or the second substring.

Figure 19:
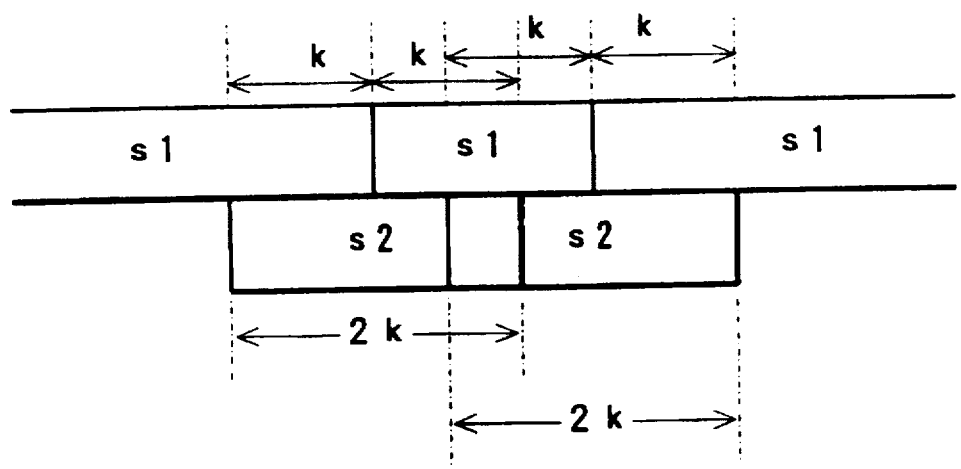
FIG. 19 shows an example of a substring in the fourth embodiment of this invention.

Second substrings may be overlapped (FIG. 19). Therefore, by omitting the check and removal processing for duplications, the processing speed is increased. Although there may be more duplicate retrieval results in this case, the removal of three duplications can be done according to the procedure used for the removal of two duplications.

5. FIFTH EMBODIMENT

Figure 20:
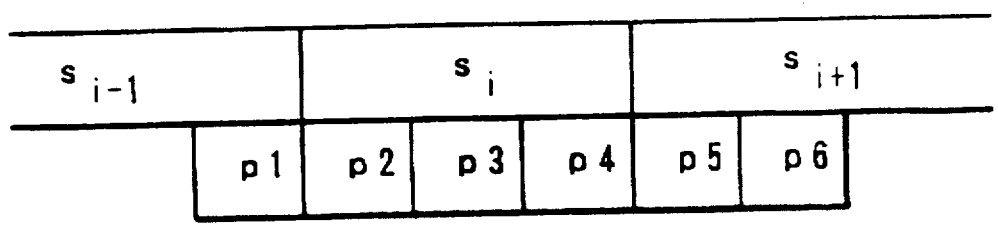
FIG. 20 shows an example of a substring in the fifth embodiment of this invention.

According to this invention, the retrieving means 8 can retrieve data by finding a trailing string containing all or some sub-keys p's which are created by dividing the key string into a plurality of sub-keys (FIG. 20). In this case, since each sub-key string can be found unless divided by one or more boundaries, k is the maximum length of a sub-key string. This reduces k, making dictionary data compact. Conversely, when k is set to a fixed value, it is possible to retrieve data using a key string longer than k by making each sub-key length equal to or less than k.

In the fifth embodiment, a check is made to see if the whole key string occurs in a position within the code string where a plurality of data units, each of which is retrieved by each sub-key, occur consecutively. When the whole key string occurs, only that position is output. This check can be used effectively, for example, by determining whether or not the least-frequent sub-key is preceded or followed by a sequence of more frequent sub-keys that occur consecutively.

6. SIXTH EMBODIMENT

[6-1. Configuration of the Sixth Embodiment]

Figure 21:
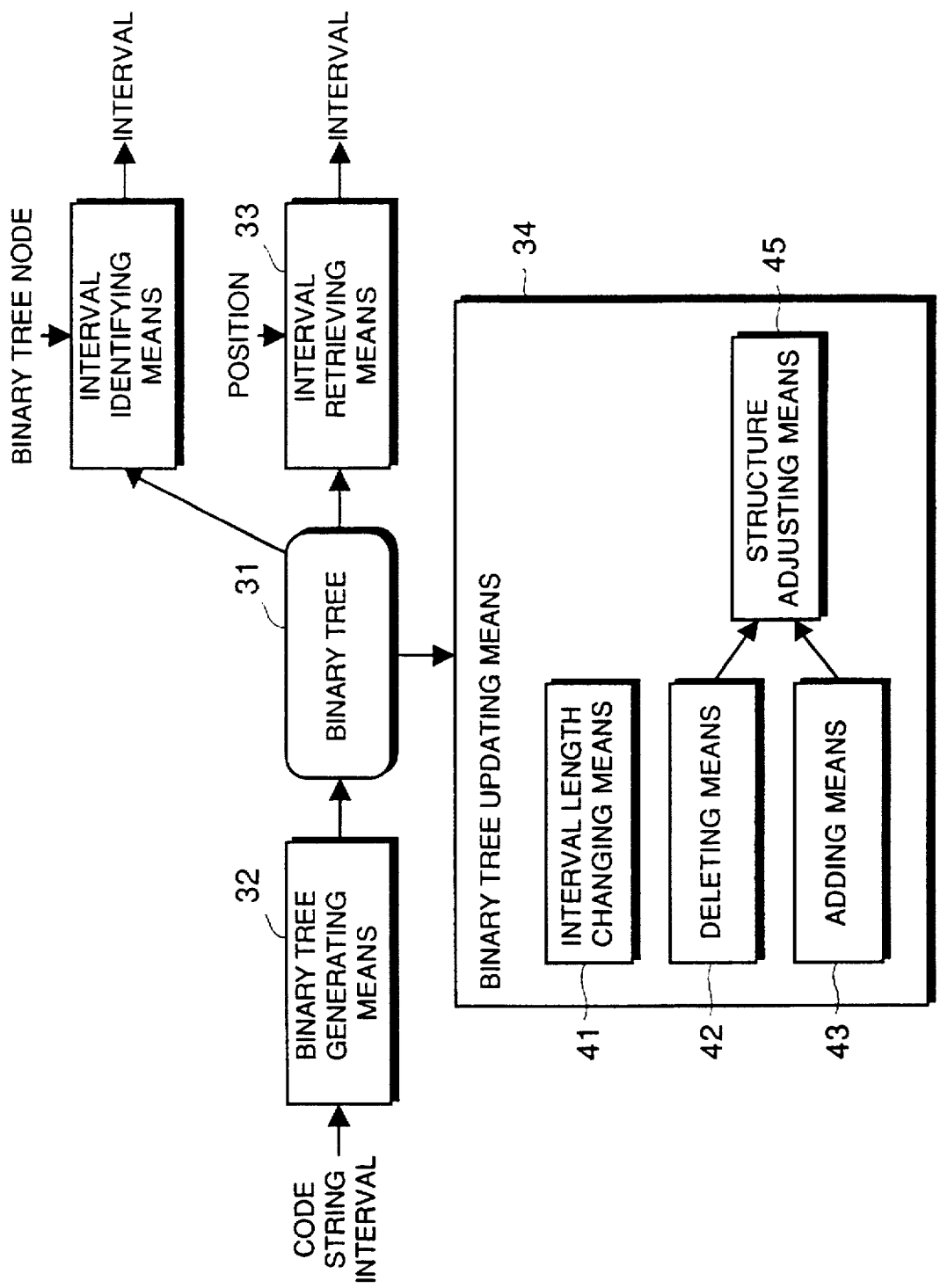
FIG. 21 is a block diagram showing the configuration of the data processing system in the sixth embodiment of this invention.

FIG. 21 is a block diagram showing the configuration of the sixth embodiment.

It is an object of the sixth embodiment to provide a data processing system and a data processing method which process data efficiently. This data processing system and a data processing method are particularly suitable for implementing the data retrieval system and the data retrieval method described above. That is, the data processing system and the data processing method in the sixth embodiment use a substring, which is used in the data retrieval system and the data retrieval method in the first to the fifth embodiments, as an interval to further increase efficiency of various types of processing including data retrieval.

Since the contents of a substring can be restored within a dictionary tree of a data retrieval system and a data retrieval method (as claimed in claim 7), the data processing system and the data processing method in this embodiment use, not the code string 1, but the first and second substrings 2 and 3.

More specifically, it is an object of the sixth embodiment to provide a data processing system and a data processing method whose data change procedure is simple. It is another object of the sixth embodiment to provide a data processing system and a data processing method which use memory more efficiently.

As shown in FIG. 21, the data processing system in the sixth embodiment has the binary tree generating means 32 for generating the binary tree 31 representing the range of each interval based on the intervals in a code string, the interval retrieving means 33 for retrieving an interval corresponding to the specified position according to the binary tree 31, and the binary tree updating means 34 for updating the binary tree 31 according to the contents of a change when an interval is changed.

The binary tree updating means 34, in turn, has the interval length changing means 41 for changing an interval length, the deleting means 42 for deleting a node corresponding to a deleted interval, and the adding means 43 for adding a node corresponding to an added interval. In addition, the data processing system in the sixth embodiment has the structure adjusting means 45 for adjusting the structure of a binary tree by changing the connection sequence of the nodes.

[6-2. Operation and Effects of the Sixth Embodiment]

The sixth embodiment which has the above configuration performs the following operation: that is, it allows the user to store a code string containing a plurality of intervals, to obtain a code value at a specific position within a code string, and to edit a code string as he or she wants.

[6-2-1. Binary Tree Generation Process]

First, the binary tree generating means 32 generates the binary tree 31 representing the range of each interval according to the intervals in the code string. The binary tree may also be generated, with the use of the adding means 43, by adding a node each time an interval is entered. A code string and the intervals may be entered, for example, via the keyboard. The binary tree 31 is a tree-like data structure consisting of nodes, each corresponding to an interval, connected from the root to the ends. On the end side of each node, the preceding node, which corresponds to the preceding interval of the node and/or the following node, which corresponds to the following interval of the node, is connected. And, in each node, the sum of the interval length of the node itself and the total interval length of the nodes on the end side of the node (sub-tree), is set. This sum is called a partial interval length.

Figure 22:
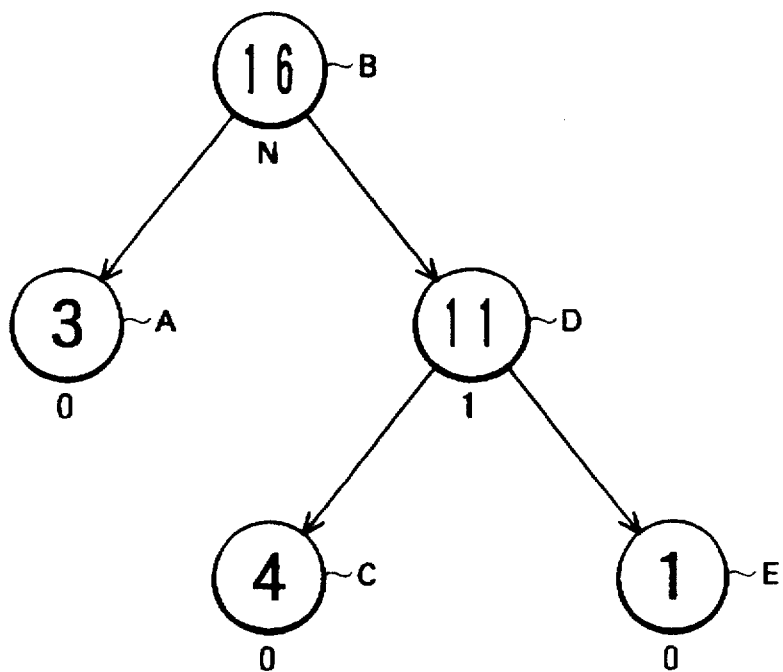
FIG. 22 shows an example of a binary tree in the sixth embodiment of this invention.
Figure 23:
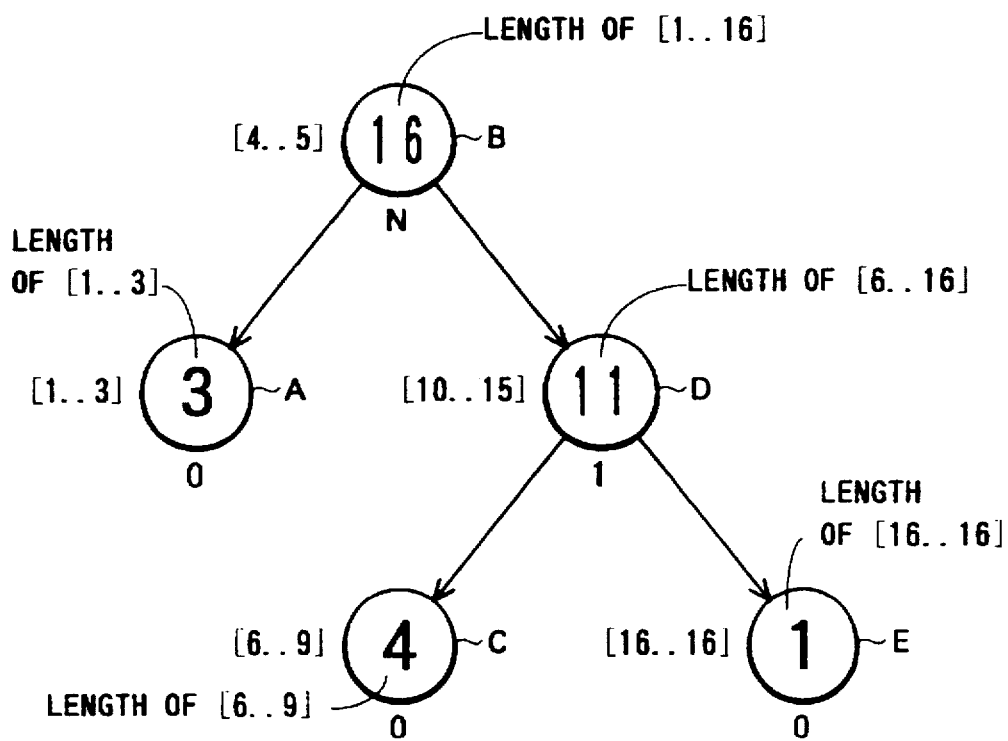
FIG. 23 explains the binary tree in the sixth embodiment of this invention.

FIG. 22 shows an example of the binary tree 31 used in the sixth embodiment, and FIG. 23 explains the binary tree 31 in FIG. 22. As these figures show, the binary tree 31 in the sixth embodiment is a tree, consisting of nodes A, B, C, D, and E corresponding to the intervals [1. . . 3], [4. . . 5], [6. . . 9], [10. . . 15], and [16. . . 16] respectively, connected with node B as the root. To the end side of node B, node A corresponding to the interval [1. . . 3] which precedes node B and nodes D, C, and E corresponding to the intervals which follow node B are connected. In addition, on the end side of node D, node C corresponding to the interval which precedes node D and node E corresponding to the interval which follows node D are connected.

In each of nodes A, B, C, D and E, the partial interval lengths 3, 16, 4, 11, and 1, each representing the sum of the length of the node itself and the total of the lengths of the nodes on the end side of that node are set. For example, in node D, the sum (11) of the length (6) of the interval [10. . . 15] corresponding to node D and the total of the lengths (4 and 1) of the intervals [6. . . 9] and [16. . . 16] is set.

The data processing system in the sixth embodiment, which has one node for each interval as described above, requires as many data blocks as intervals and so eliminates the need to use as many memory units as there are codes (positions), thereby increasing memory usage efficiency. In particular, a binary tree in which data storage areas for the nodes are connected by pointers does not require a large consecutive area and therefore uses memory efficiently. The ability to use a precision most suitable for each interval allows the user to use any type of interval data such as floating-point data.

In this data processing system, the position of the interval of a node can be calculated, during retrieval or some other processing, based on the interval length of the preceding (following) node. The net interval length of a node can be calculated by subtracting the total of the interval lengths of the preceding and following nodes, contained in the sub-tree connected to the node, from the partial interval length of the node. The interval length of the preceding (following) node can be obtained from the partial interval length of the left (right) child. Therefore, the code at a specific position within a code string can be identified easily by comparing the specified position with the position and the interval length of each node.

Thus, the interval position of a node can be calculated by the total of the interval lengths of the preceding (following) nodes. And, the positional relation among nodes can be represented by the relation among nodes, the position of each node being calculated by the partial interval length of other nodes. This means that a change in part of an interval affects only the changed node and one or more nodes on the path from that node to the root, thus simplifying the change procedure. More specifically, even when the length of an interval is changed, the required data processing time is approximately proportional to the logarithm of the number of intervals.

[6-2-2. Interval Retrieval Process]

Figure 24:
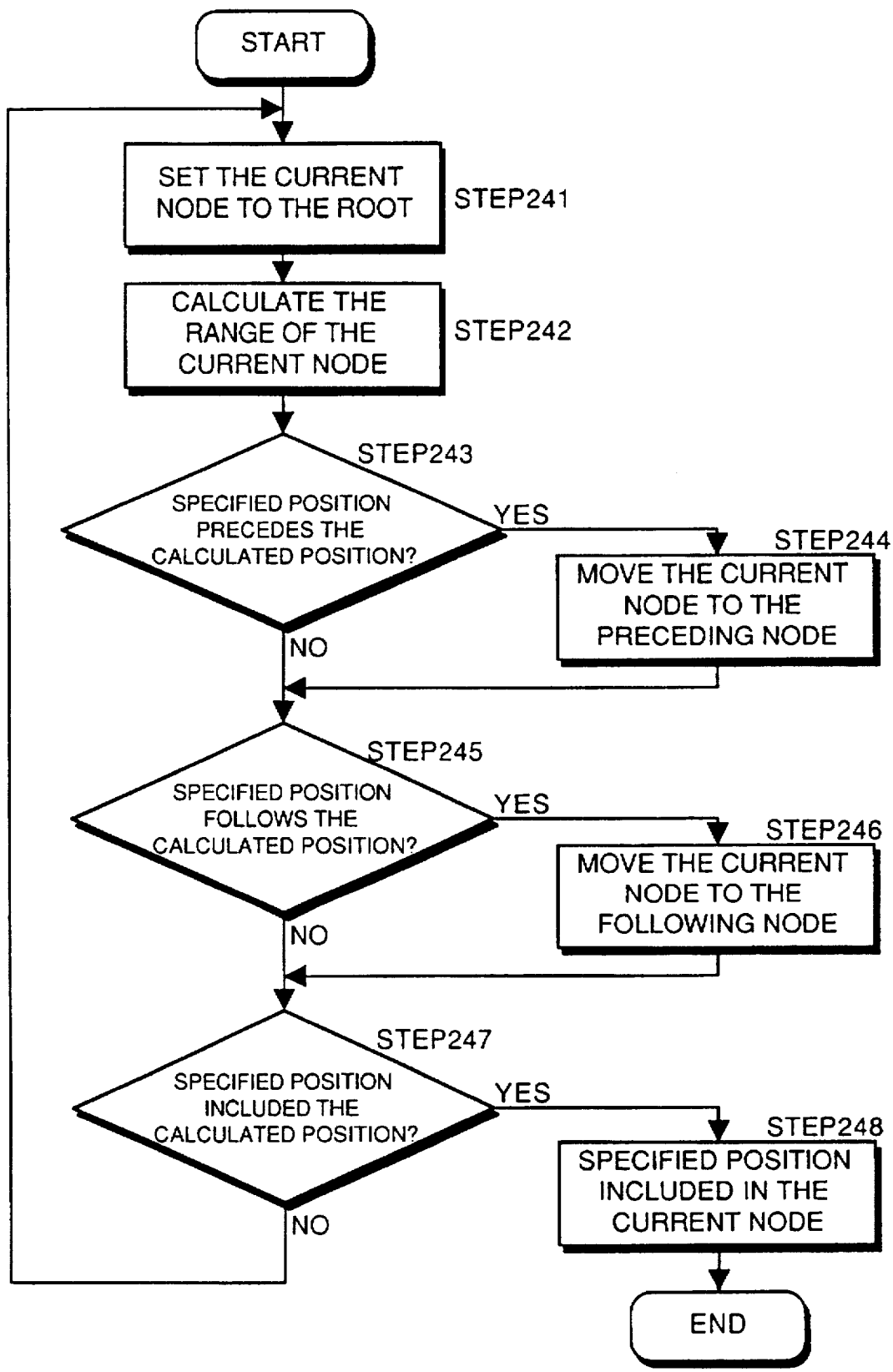
FIG. 24 is a flowchart showing the procedure for retrieving data in the sixth embodiment of this invention.

FIG. 24 is a flowchart showing the retrieval procedure used by the data processing system in the sixth embodiment. To identify the interval to which a specific position within the code string belongs during retrieval or some other processing, the interval retrieving means 33 performs the following procedure while moving the current node pointed to by the pointer from the root (step 241) to lower-level nodes, one level at a time.

The interval retrieving means 33 calculates the range of the current node based on the interval lengths of the current node and the lower-level nodes (step 242), and compares the calculated range with the specified position. If the specified position precedes the calculated range (step 243), the interval retrieving means 33 moves the current node to the preceding node (step 244); if the specified position follows the calculated range (step 245), the interval retrieving means 33 moves the current node to the following node (step 246); if the specified position is included in the calculated range (step 247), the specified range is included in the current node (step 248).

This procedure is executed as follows. Suppose that the variable P contains the specified position and that the variable n contains a pointer pointing to the current node (hereafter, the current node is represented by n).

While this process, the substantial specified position in the whole tree is not changed. However, when the current node moves down, the representation of the specified position is updated based on the relative position of the current node.

If n has a preceding node (hereafter called a "left child") and if:

$P \leq$ Partial interval length of the left child of $n$      [Formula 2]

(When an interval is represented in a floating-point number and when the left end of each interval is included but the right end is not included, that is, when the string is in the format [a, b), [b, c), . . . (a, b, and c are real numbers), If $P <$ Partial interval length of the left child of $n$      [Formula 3]

(Hereafter, this format is called a floating-point format.)
)

then, the interval retrieving means 33 changes n to the left child of n.

If n has a following node (hereafter called a "right child") and if:

$P >$ (partial interval length of n−partial interval length of the right child of n)      [Formula 4]

(In the case of the floating-point format:

$P \geq$ (partial interval length of n−partial interval length of the right child of n)      [Formula 5]

)

then, the interval retrieving means 33 changes P to:

$P$−(partial interval length of n−partial interval length of the right child of n)      [Formula 6]

and changes n to the right child of n.
When this process is terminated and if:

(Partial interval length of the left child of $n$)$<P$      [Formula 7]

(In the case of the floating-point format:

(Partial interval length of the left child of $n$)$\leq P$      [Formula 8]

)
and if:

$P \leq$ (partial interval length of $n$−partial interval length of the right child of $n$)      [Formula 9]

(In the case of the floating-point format:

$P <$ (partial interval length of $n$−partial interval length of the right child of $n$)      [Formula 10]

then, n is a node corresponding to the interval containing the specified position. This means that the interval of the current node includes the specified position if the specified position follows the interval preceding the current node and if the specified position is within the net interval length of the current node.

If n has no left child and if:

$P \leq 0$      [Formula 11]

(In the case of the floating-point format:

$P < 0$      [Formula 12]

)
or, if n has no right child and if:

$P > n$ [Formula 13]

(In the case of the floating-point format:

$P \geq n$      [Formula 14]

then, the interval containing the specified position is not yet stored. This means that the specified position is not included in any interval if it is before the first node or after the last node. This can be said regardless of the presence of the right or left child, when n is the root node.

By the way, the interval represented by the retrieved node n is [specified position–(P—partial interval length of the left child of n)+Δ(minimum positional unit). . . specified position+(partial interval length of n–partial interval length of the right child of n–P)]. (In the case of the floating-point format, the interval represented by the node n is [specified position–(P—partial interval length of the left child of n), specified position+(partial interval length of n–partial interval length of the right child of n–P)]).

Figure 25:
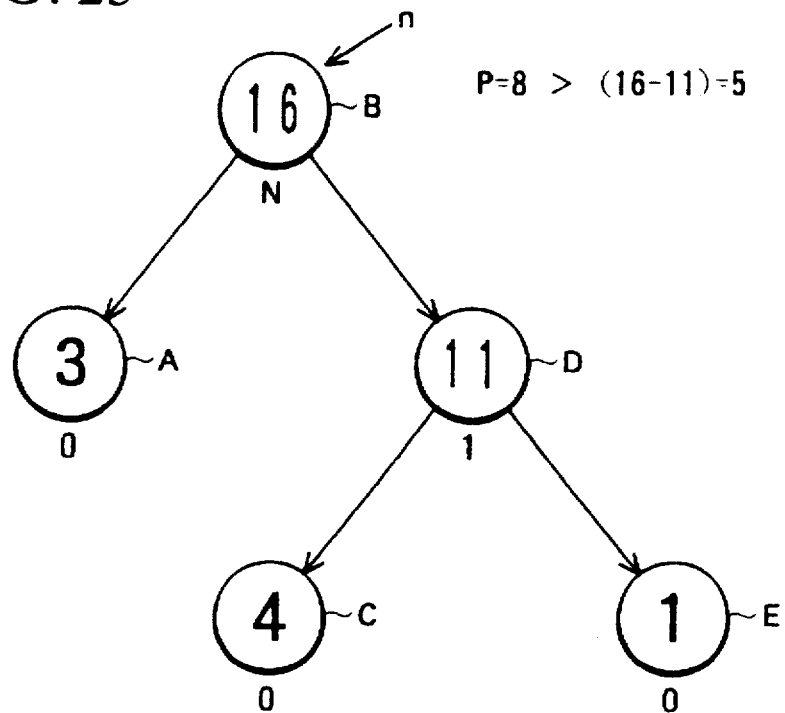
FIG. 25 shows an example of a binary tree in the sixth embodiment of this invention (retrieval)
Figure 26:
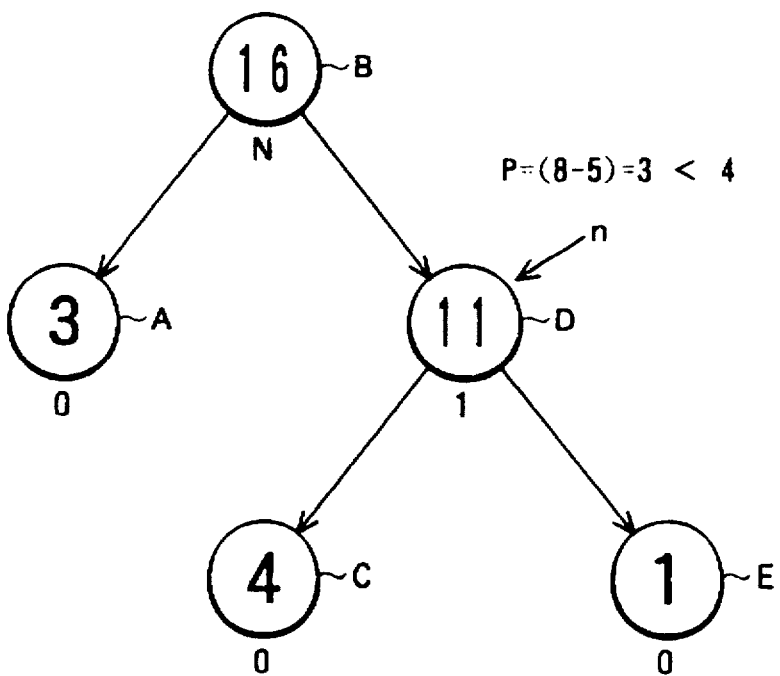
FIG. 26 shows an example of a binary tree in the sixth embodiment of this invention (retrieval)
Figure 27:
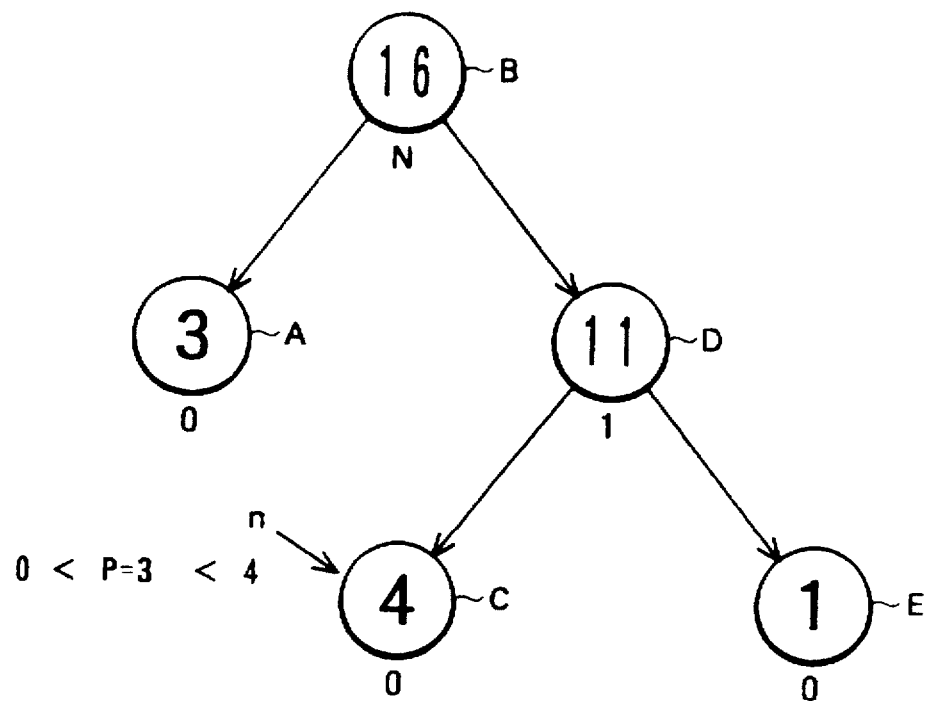
FIG. 27 shows an example of a binary tree in the sixth embodiment of this invention (retrieval)

For example, in the binary tree in FIG. 22, the node corresponding to the interval containing the specified position 8 is identified by following the nodes as shown in FIGS. 25, 26, and 27. In the identified node, n represents [8–(3–0)+1 . . . 8+(4–0–3)]=[6. . . 9] (FIG. 27).

As described above, in the data processing system in the sixth embodiment, the interval retrieving means 33 compares the specified position with the range of the current node while moving the current node downward, one level at a time, from the root. This simple procedure identifies an interval containing the specified position, facilitating various types of processing such as retrieval.

[6-2-3. Node Interval Identification Process]

In this embodiment, it is also possible to identify an interval corresponding to a node th a t is specified. The procedure explained below identifies the position of an interval. A right interval or a left interval (total interval) means that the specified interval is on the right or on the left of the root interval.

Figure 28:
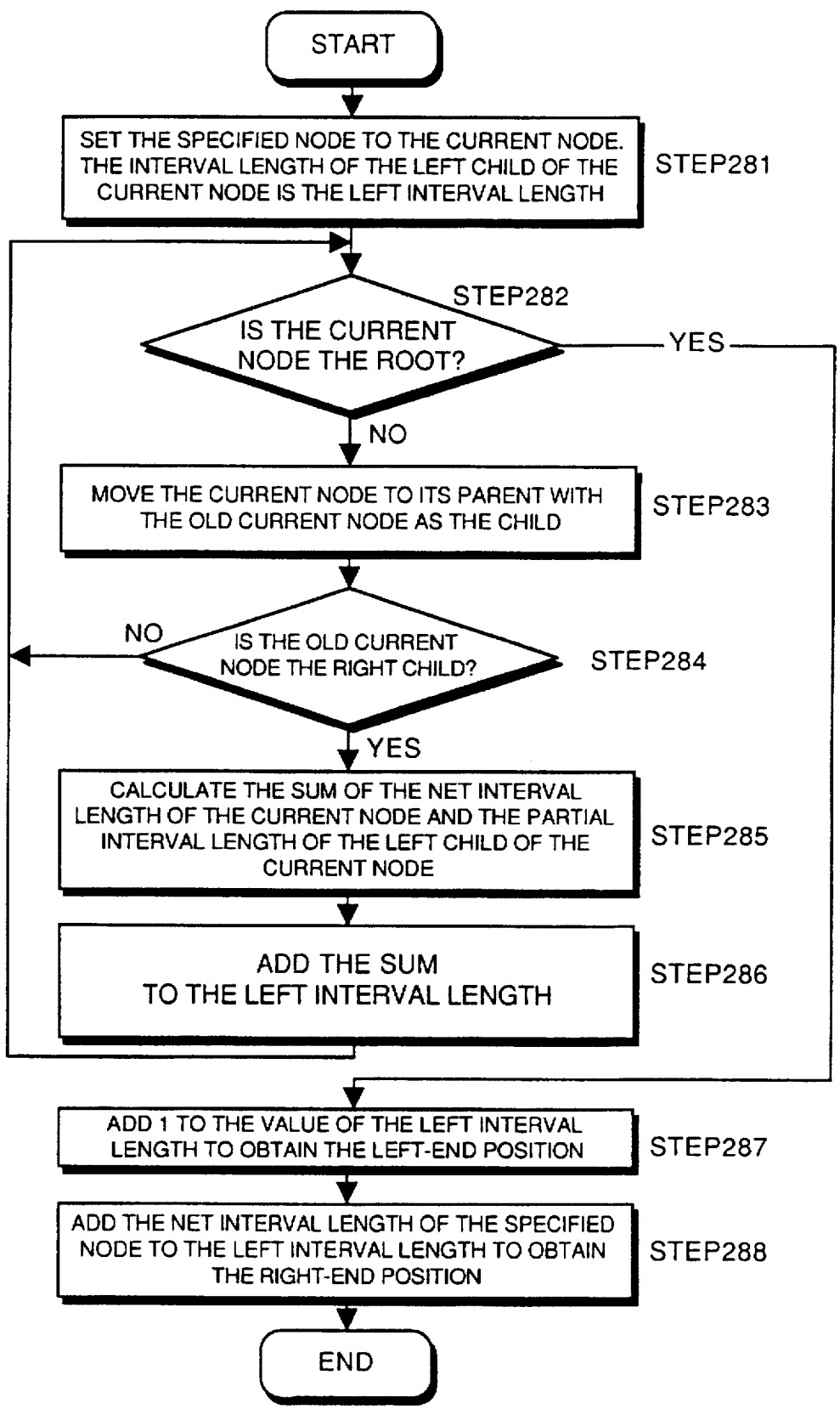
FIG. 28 is an example of flowchart showing a procedure for identifying an interval corresponding to a specified node in the sixth embodiment of this invention.

To identify a node interval, the current node is moved sequentially from the specified node to its parent node until the root is reached. A s the current n ode is moved, either the left interval length which is the total of the lengths of the nodes preceding the specified n ode or the right interval length which is the total of the lengths of the nodes following the specified node is obtained (claims 20, 47). FIG. 28 is a flowchart showing an example of a procedure for identifying the interval corresponding to the specified node.

In this procedure, the partial interval length of the left child of the current node that is specified is first set to the left interval length (step 281). Remember that the left interval (length) is the total interval (length) preceding the specified node.

Then, the following steps are repeated until the current node becomes the root (step 282). That is, the current node is moved to the parent with the old current node as the child node (step 283). At this time, when the child node, which was the old current node, is the right child of the current node (step 284), the sum of the net interval length of the current node and the partial interval length of the left child of the current node is calculated (step 286) and the sum is added to the left interval length (step 286).

Note that the partial interval length of a node represents the total (interval length) of the net interval length of the nodes included in the subtree rooted at the node. The sum of the net interval length of the current node and the partial interval length of the left child of the current node is calculated by subtracting the partial interval lengths of the right child (the old current node) from the partial interval length of the current node.

When the current node becomes the root (step 282), the left end of the specified node is immediately left to the left interval; that is, it is calculated by adding 1 to the left interval length (step 287). If an interval is represented in a floating-point number, the value of the left interval length is the left end of the interval. The right end of the specified node is obtained by adding the net interval length of the specified node to the left interval length (step 288).

The right interval of the specified node (total of the intervals following the interval corresponding to the specified node) begins at the position following (adding 1 to) the right-end value of the specified node, and ends at the end of the whole interval represented by the binary tree. This end is represented by the value of the partial interval length of the root.

Figure 29:
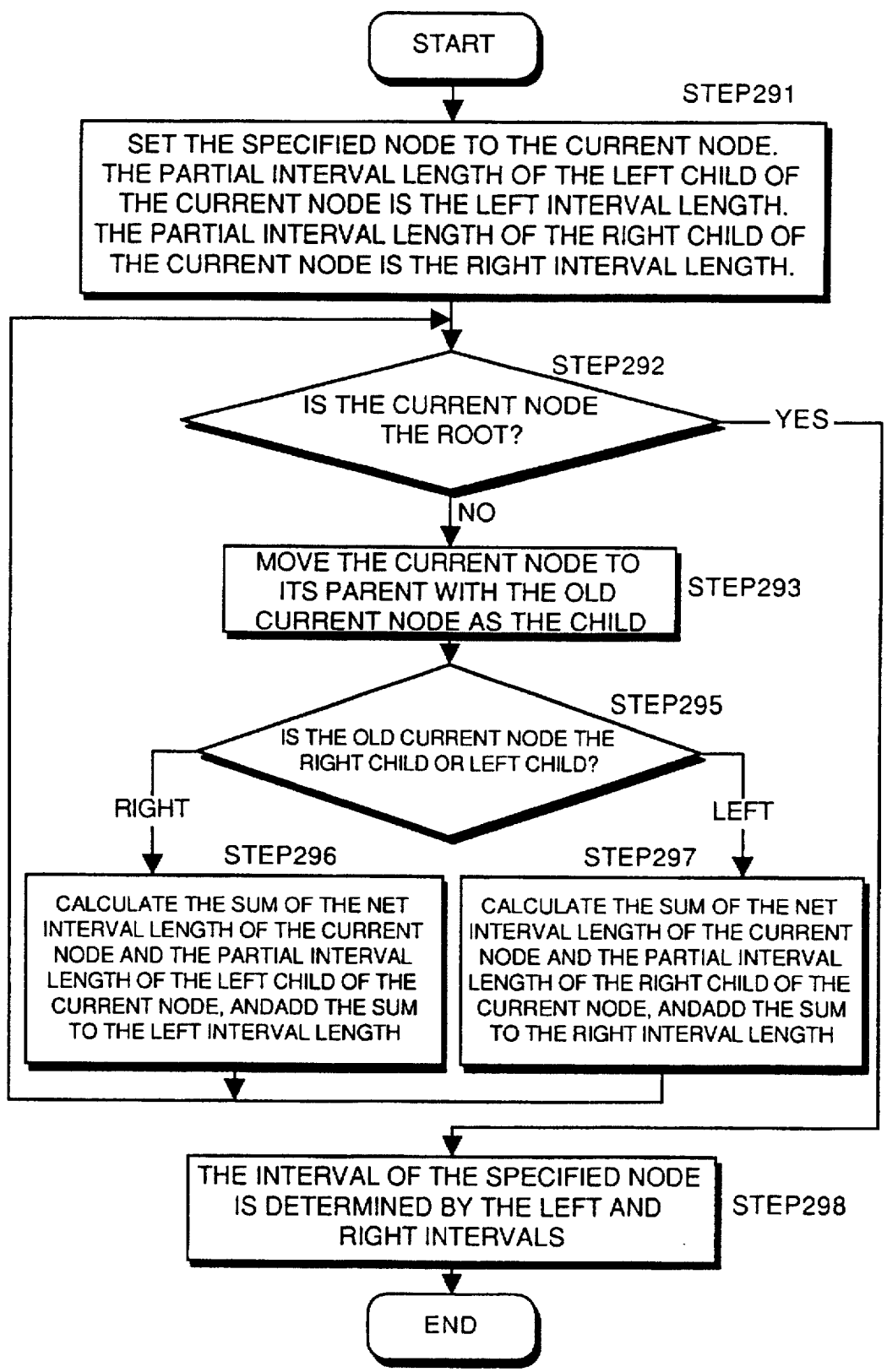
FIG. 29 is another example of flowchart showing a procedure for identifying an interval corresponding to a specified node in the sixth embodiment of this invention.

FIG. 29 is an another example of a flowchart of a procedure for identifying an interval corresponding to the specified node. In the procedure shown in FIG. 28, the left interval that is on the left of the specified node interval is determined, and the right side of the specified node interval is calculated based on the left interval length. In the procedure shown in FIG. 29, the lengths of both the right interval and the left interval are obtained, and the interval of the specified node is determined as an interval between these two intervals.

In this procedure, the specified node is first set to the current node, with the partial interval length of the left child of the current node being the left interval length and with the partial interval length of the right child of the current node being the right interval length (step 291). Then, the following steps are repeated until the current node becomes the root node (step 292).

The current node is moved to its parent with the old current node as the child node (step 293). And, when the old current node is the right child (step 295), the sum of the net interval length of the new current node and the partial interval length of the left child of the new current node is added to the left interval length (step 296); when the old current node is the left child (step 295), the sum of the net interval length of the new current node and the partial interval length of the right child of the new current node is added to the right interval length (step 297). The sum of the net interval length of the current node and the partial interval length of the left (right) child of the current node is calculated by subtracting the partial interval lengths of the right (left) child from the partial interval length of the current node.

When the current node becomes the root (step 292), the interval of the specified node is identified as the interval between the left interval and the right interval (step 298). The right end of the specified node may be calculated by subtracting the right interval length from the partial interval length of the root.

In the sixth embodiment, the total interval length of a preceding (following) nodes is sequentially added up as the current node moves from the specified node to the root node, as described above. This process determines the position of the specified node through the interval lengths of nodes those are right or left to the specified node. This simple procedure provided in the sixth embodiment allows the position of the specified node to be identified, making it possible to perform various types of processing (claims 20, 47).

Figure 30:
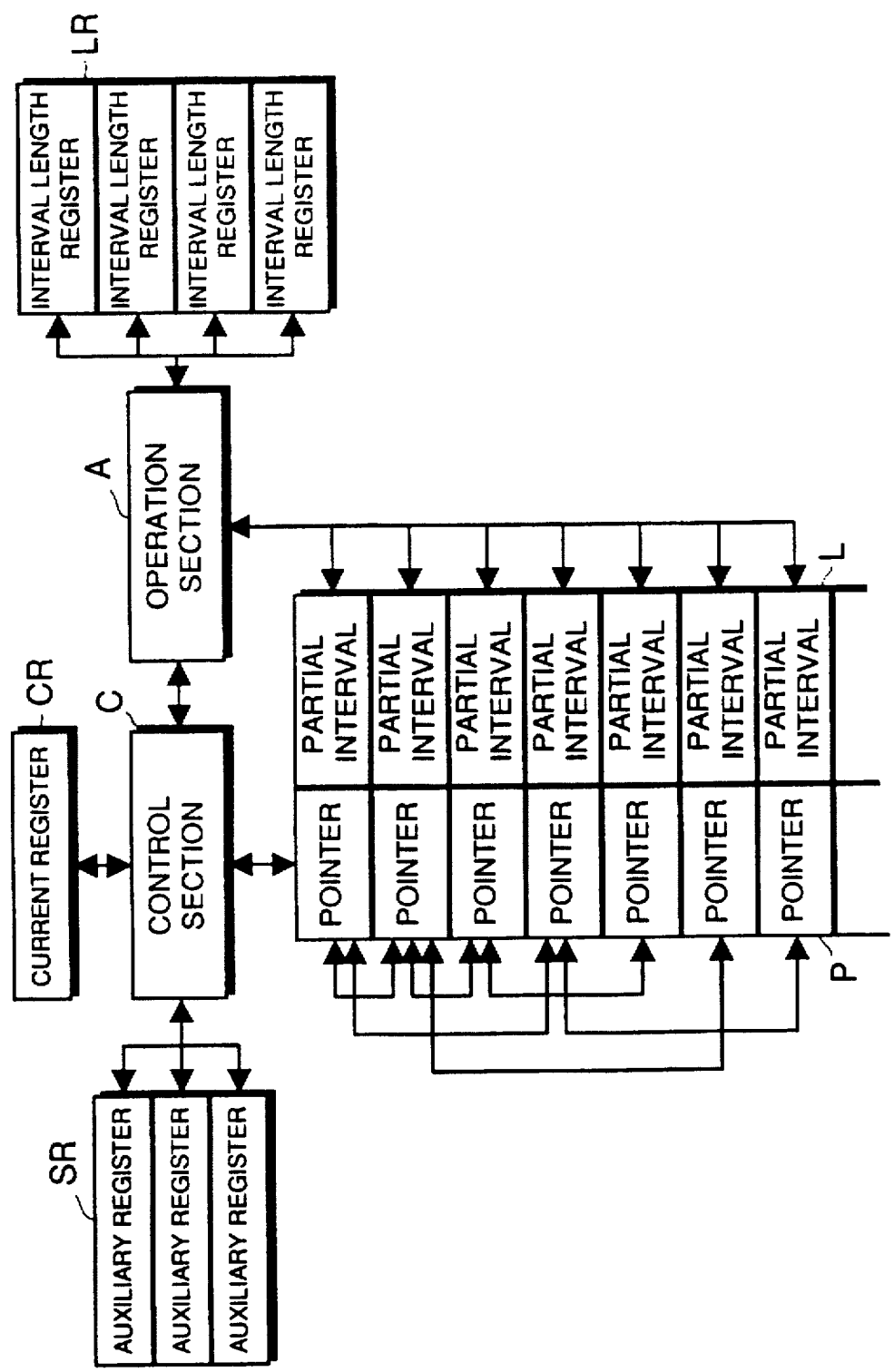
FIG. 30 is a functional block diagram showing an example of hardware configuration suitable for retrieval in the sixth embodiment of this invention.

FIG. 30 is a functional block diagram showing an example of hardware configuration for use in the retrieval described above. That is, there are as many information areas as the nodes, each area consisting of the pointer storage area P and the partial interval length storage area L. These areas are contained in a fixed-length array. The nodes are linked by two-way pointers allowing pointer storage areas to be referenced bi-directionally.

To perform retrieval, the control section C accesses pointers to reference each node, and the operation section A accesses the partial interval length of each node to calculate interval lengths. The pointer or the storage address of the current node is stored in the current register CR. Information on the nodes, such as information on an old node after the current node is moved, is stored in the auxiliary register SR. The interval length register LR is used as necessary to calculate partial interval lengths.

Hardware having this configuration may be used in various types of processing described below.

[6-2-4. Binary Tree Update Process]

When an interval is changed, the binary tree updating means 34 updates the binary tree 31 according to the contents of the change. Because, in the sixth embodiment, the binary tree 31 is changed in this manner when an interval is changed, there is no need to re-generate the binary tree 31.

In the sixth embodiment, when the length of an interval in the code string is changed, the interval length changing means 41 changes the corresponding interval length in the binary tree 31. When an interval is deleted from the code string, the deleting means 42 deletes the node corresponding to the deleted interval from the binary tree 31. When an interval is added to the code string, the adding means 43 adds the node corresponding to the added interval to the binary tree 31.

In the sixth embodiment, the interval length changing means, the deleting means, or the adding means updates the binary tree 31 when an interval length is changed, an interval is deleted, or an interval is added. Combining these means allows complex processing to be performed; for example, the intervals in a code string may be exchanged.

[6-2-4-1. Interval Length Change Process]

When the length of an interval is changed, the partial interval length of each node, from that node to the root, is changed by the changed value.

Figure 31:
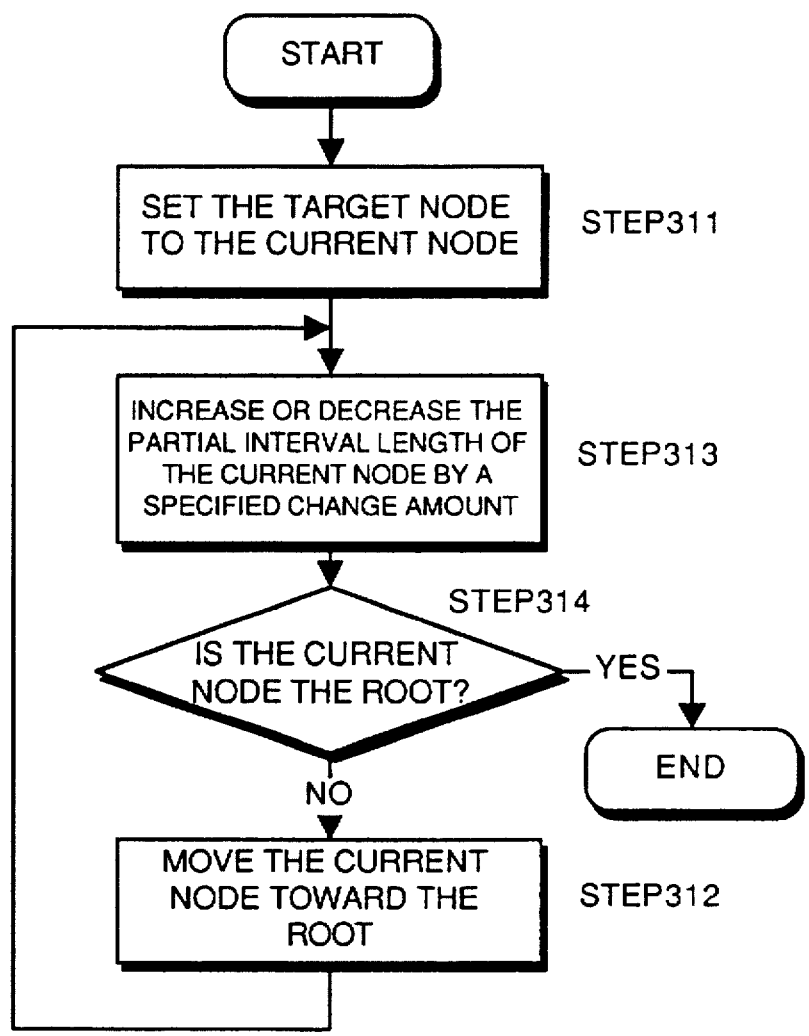
FIG. 31 is a flowchart showing a procedure for changing an interval length in the sixth embodiment of this invention.

FIG. 31 is a flowchart showing the procedure for changing an interval length. As shown in this figure, the target node is first set to the current node (step 311). Then, the current node is moved toward the root (step 312) until it becomes the root (step 314) while increasing or decreasing the partial interval length of each current node by a specified change amount.

That is, even when the length of an interval is changed in the sixth embodiment, only the nodes from that node to the root need be changed. Unlike a conventional system, the data processing system in the sixth embodiment eliminates the need to move all the nodes corresponding to the intervals following the changed node, enhancing data processing efficiency.

Figure 32:
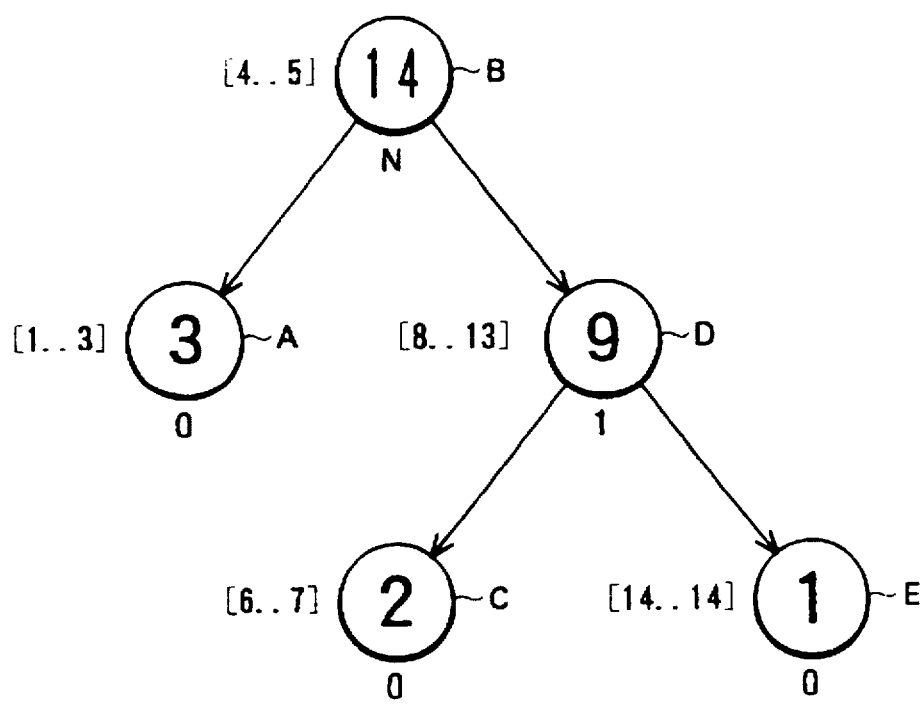
FIG. 32 shows an example of a binary tree in the sixth embodiment of this invention (change interval length)
Figure 33:
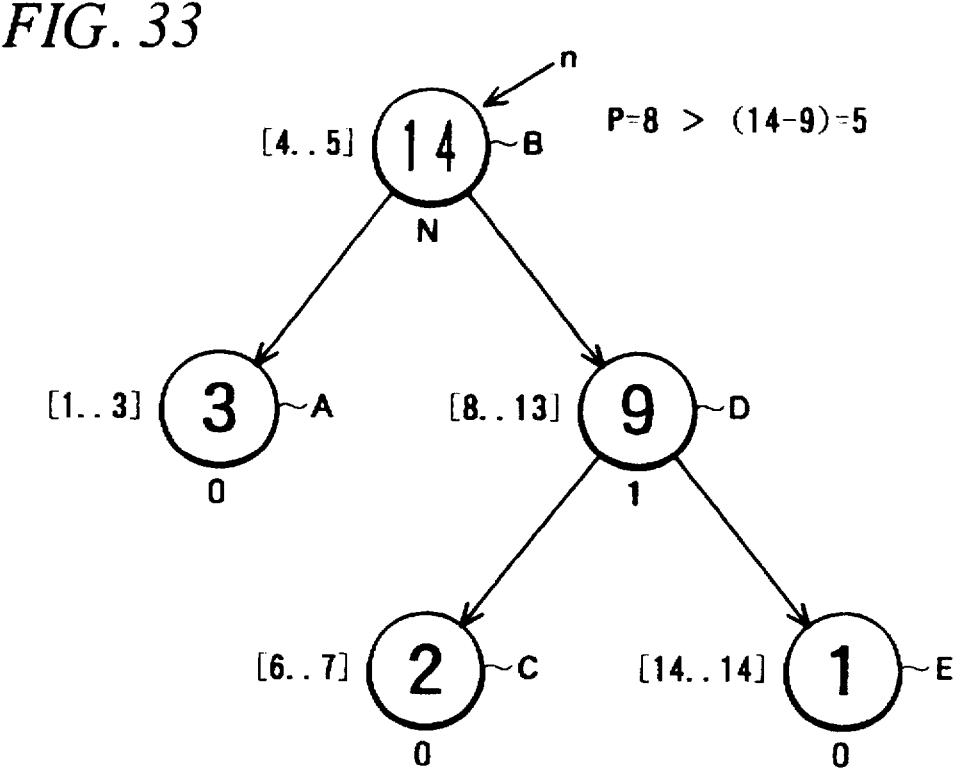
FIG. 33 shows an example of a binary tree in the sixth embodiment of this invention (change interval length)
Figure 34:
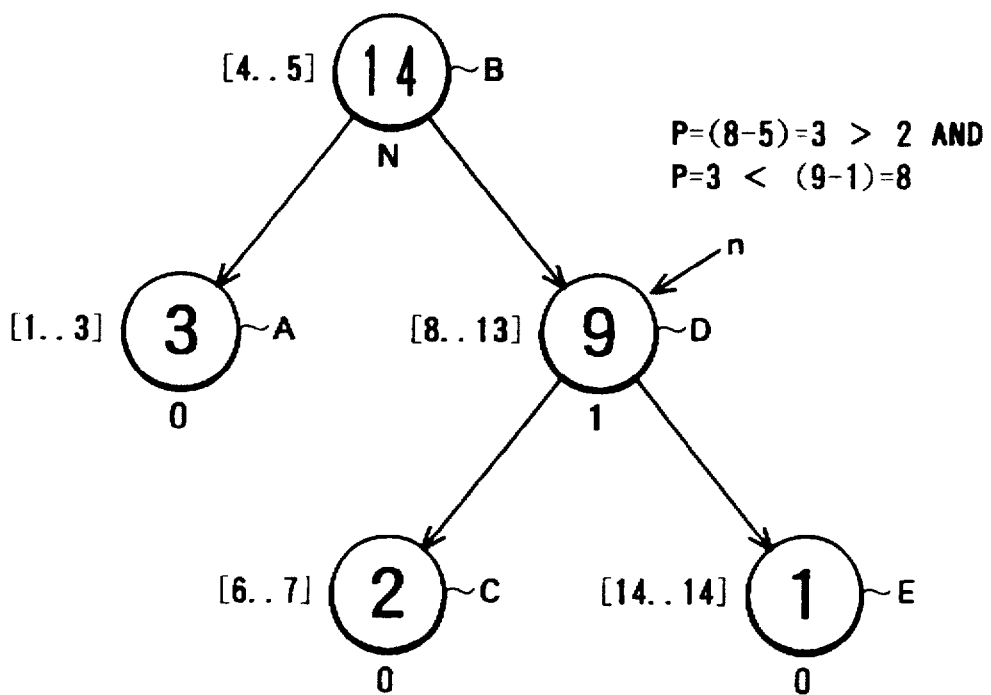
FIG. 34 shows an example of a binary tree in the sixth embodiment of this invention (change interval length)

For example, when the interval with the length of 4 ([6. . . 9]) is changed to an interval with the length of 2 ([6. . . 7]) in the example shown in FIG. 22, the partial interval lengths of nodes B, C, and D are reduced by 2 accordingly as shown in FIG. 32. After that, if an attempt is made to retrieve a node corresponding to the interval containing position 8 (FIGS. 33 and 34), the result is node D, not node C. The interval represented by node D is [8–(3–2)+1 . . . 8+(9–1–3)]=[8. . . 13].

Figure 35:
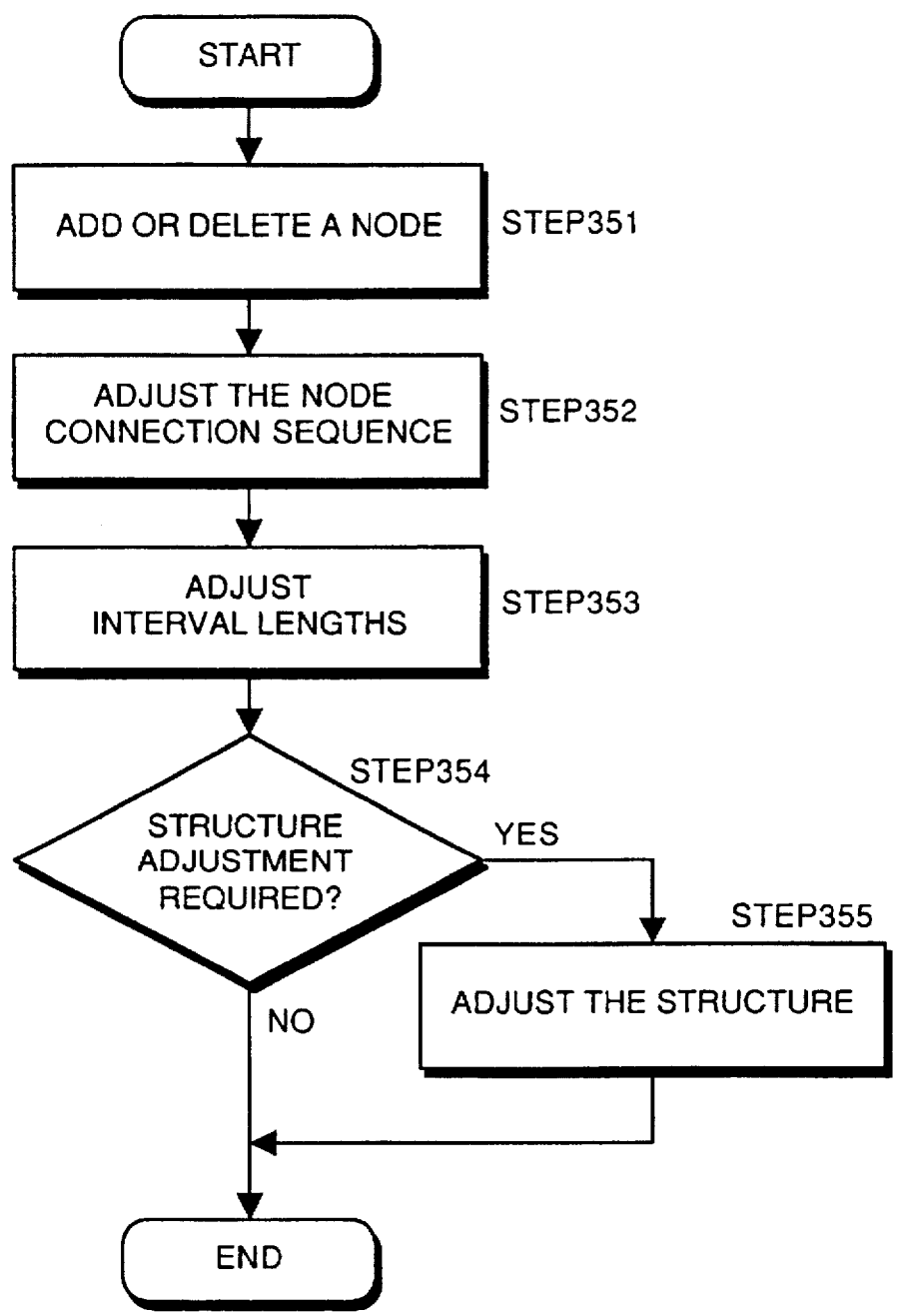
FIG. 35 is a flowchart showing a procedure for adding and deleting a node in the sixth embodiment of this invention.

The following sections explain the procedure for adding and deleting an interval. FIG. 35 is a flowchart showing the procedure for adding and deleting an interval in the sixth embodiment.

[6-2-4-2. Interval Addition Process]

When adding an interval, the adding means 43 adds to the binary tree 31 a node for an interval to be added (step 351), adjusts the node connection sequence (step 352), and adjusts the interval length of each node (step 353). In the sixth embodiment, the adding means 43 adjusts the interval lengths to maintain the integrity of the binary tree 31.

Figure 36:
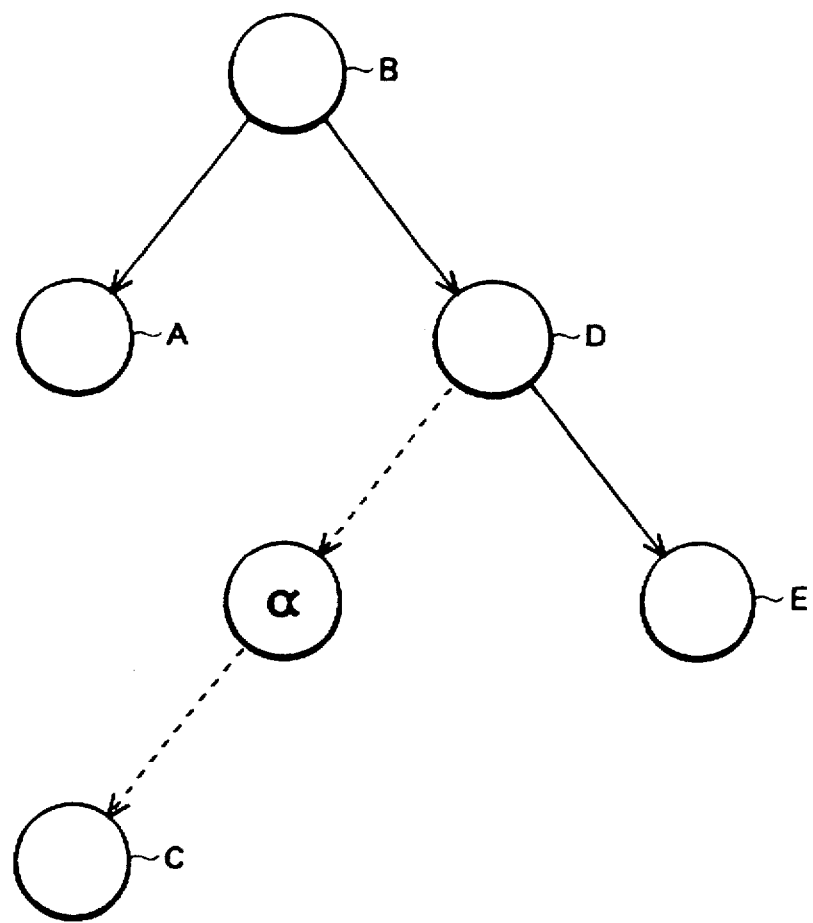
FIG. 36 shows an example of a binary tree in the sixth embodiment of this invention (add interval)
Figure 37:
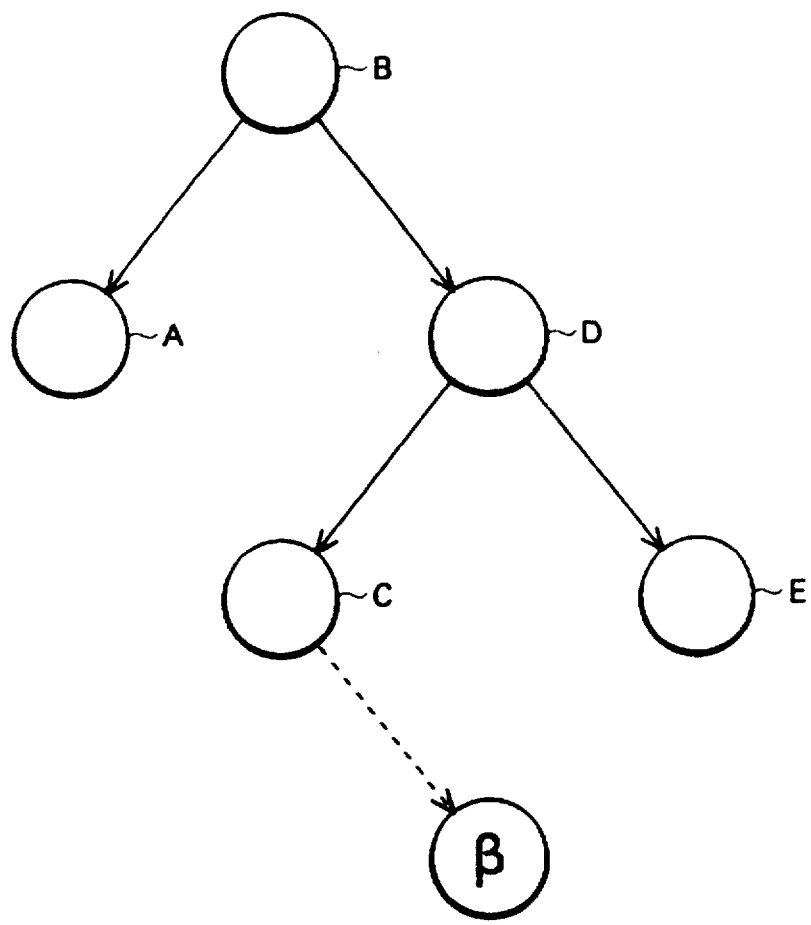
FIG. 37 shows an example of a binary tree in the sixth embodiment of this invention (add interval)
Figure 38:
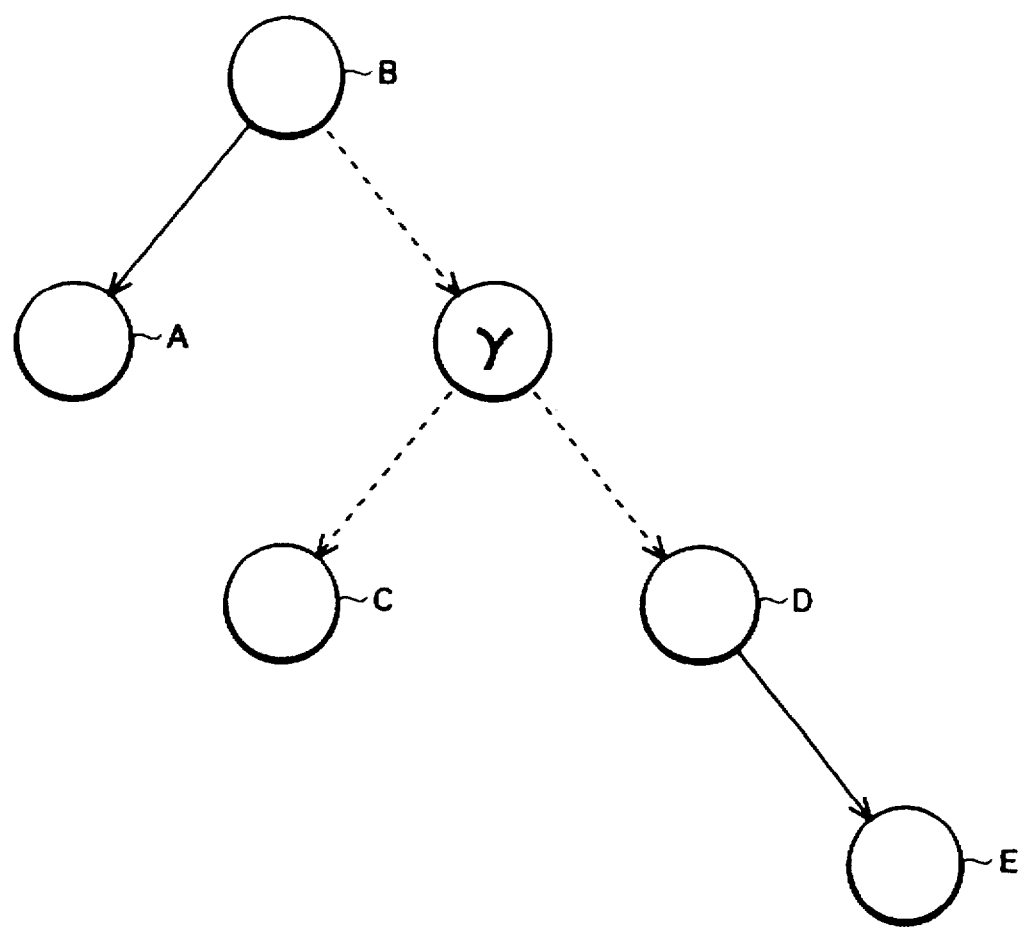
FIG. 38 shows an example of a binary tree in the sixth embodiment of this invention (add interval)

Any known method for adding a node may be used compatibly. For example, in FIG. 22, when an interval [10. . . 12] with the length of 3 is added before the interval [10. . . 15] with the intervals [10. . . 15] and [16. . . 16] being moved to the intervals [13. . . 18] and [19. . . 19], respectively, the new node is added in one of three ways shown in FIGS. 36, 37, and 38.

To adjust the interval length, the adding means 43 finds the sum of the partial interval lengths of the children (0 if there is no child) and the length of the interval to be added, and uses the result as the partial interval length of the node. And, to each node on the path from the parent of the new node to the root, the adding means 43 adds the length of the new interval.

Figure 39:
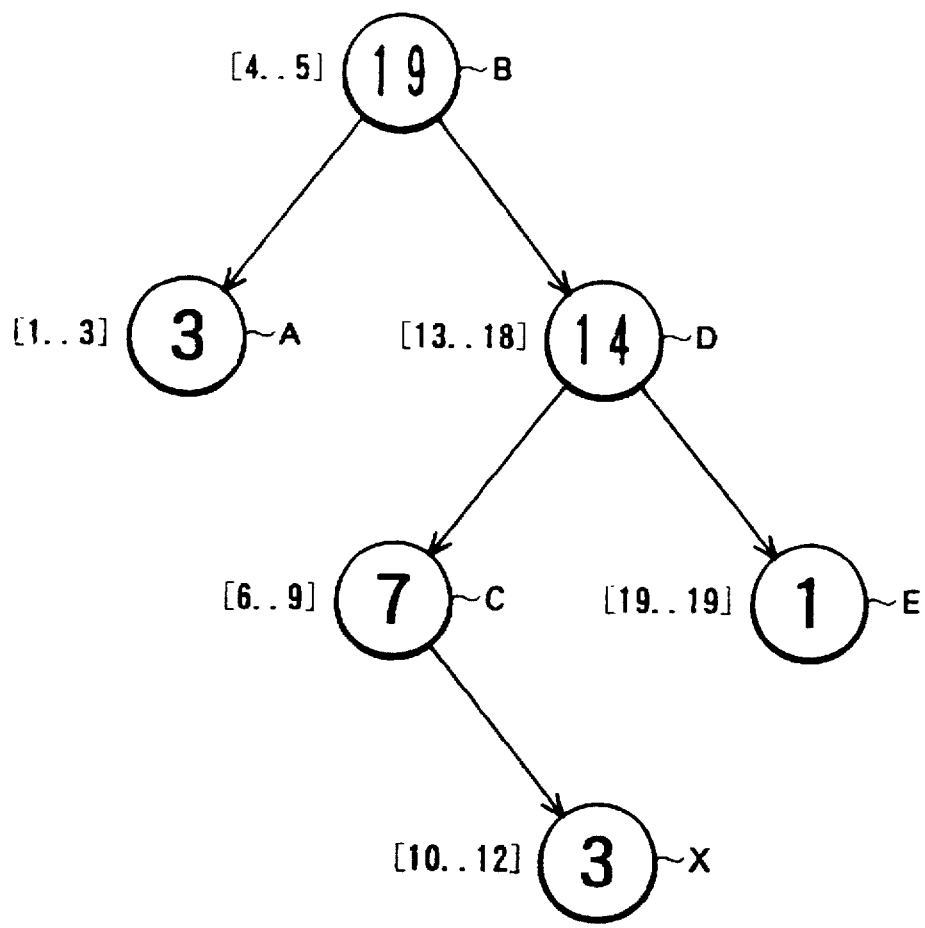
FIG. 39 shows an example of a binary tree in the sixth embodiment of this invention (add interval)

In the sixth embodiment, the interval lengths are adjusted simply by adding the length of the new interval to each node on the path from the parent of the added node to the root. FIG. 39 shows the binary tree 31 to which a node has been added at the position β shown in FIG. 37.

6-2-4-3. Interval Deletion Process

When deleting an interval, the deleting means 42 deletes from the binary tree 31 the node corresponding to the interval to be deleted, adjusts the connection among the nodes, and, as necessary (step 354), adjusts the partial interval lengths (FIG. 35/step 353). In the sixth embodiment, the deleting means 42 adjusts the node connection sequence and the interval lengths to maintain the integrity, such as the sequence of the remaining intervals, of the binary tree 31.

Figure 40:
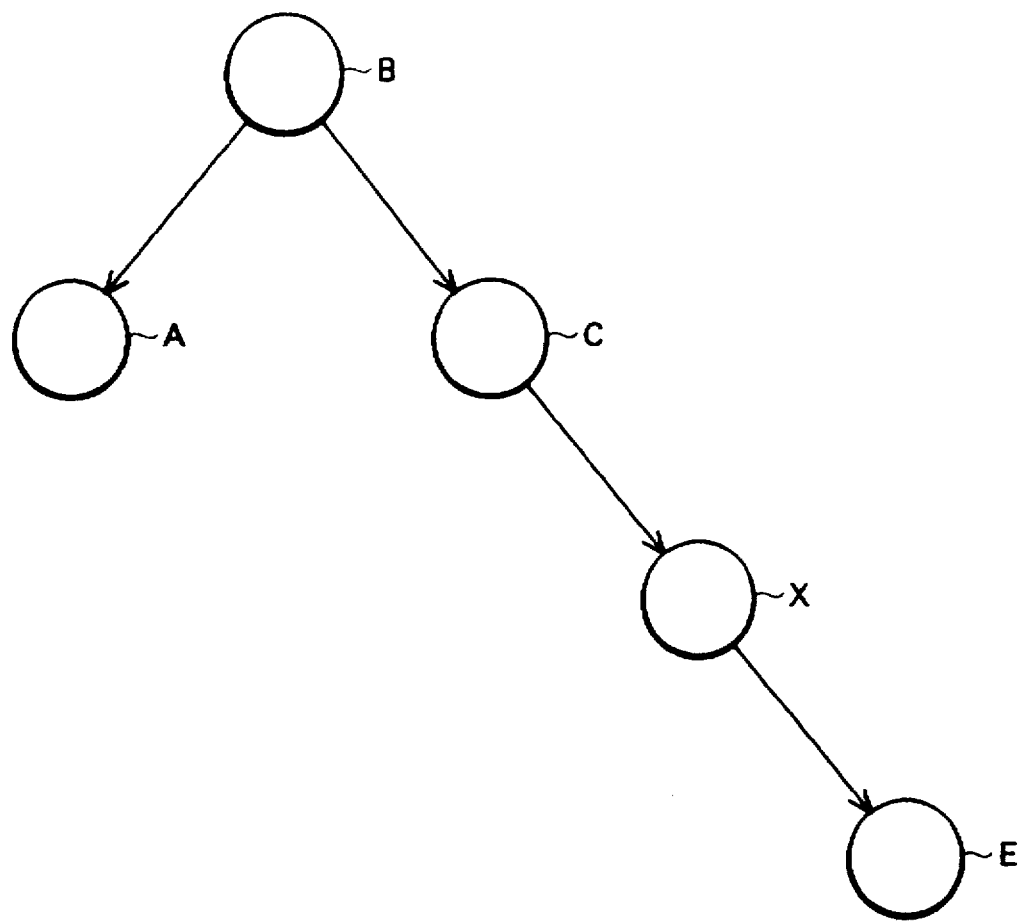
FIG. 40 shows an example of a binary tree in the sixth embodiment of this invention (delete interval)
Figure 41:
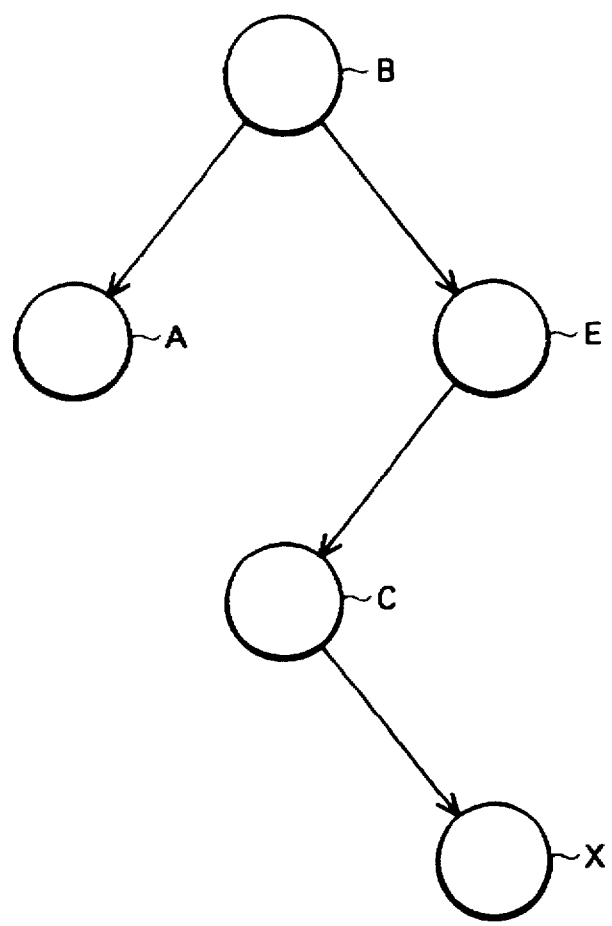
FIG. 41 shows an example of a binary tree in the sixth embodiment of this invention (delete interval)

Any known method for deletion and adjustment may be used compatibly. For example, when node D is deleted from the binary tree 31 in FIG. 39, the structure after deletion may be the one shown in FIG. 40 or the one shown in FIG. 41. The following discussion focuses on the case that the only nodes whose parent nodes are changed after deletion are the child nodes of the deleted node. In other cases, the binary tree 31 is changed as necessary during structure adjustment, described below, before or after node deletion.

First, for each node on the path from the parent of the deleted node to the root (only B in FIG. 40), the partial interval length is reduced by (partial interval length of the deleted node)–(partial interval length of the node (left child) preceding the deleted node)–(partial interval length of the node (right child) following the deleted node) which is the net interval length of the deleted node.

Then, for each node on the path beginning at the node which is the parent node of a previous child of the deleted node and was not the parent node of the deleted node (for example, X) and ending at the other child (whose parent is the previous parent of the deleted node) (for example, C), the partial interval length of the former child (for example, E) is added to the partial interval length.

Figure 42:
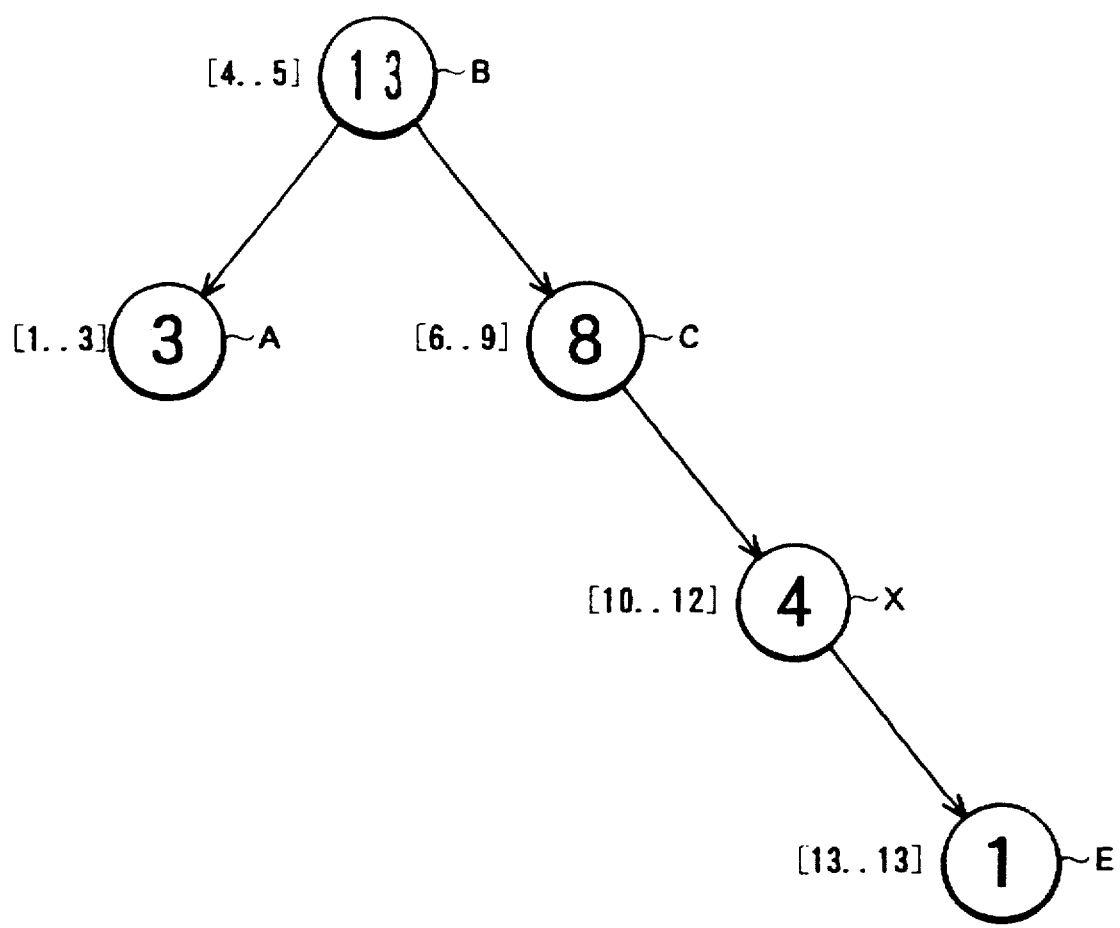
FIG. 42 shows an example of a binary tree in the sixth embodiment of this invention (delete interval)

FIG. 42 shows the binary tree 31 from which a node has been deleted.

6-2-4-4. Structure Adjustment Process

When adding or deleting an interval, the structure adjusting means 45 changes the connection sequence of nodes to maintain the balance of the number of nodes in the binary tree 31 (step 355)

This structure adjustment method prevents a particular part of the binary tree 31 from being increased, making a plurality of paths, each from the root to a node, approximately equal in length. In this way, it prevents the data processing time from being increased just because the associated path is too long, thereby making various types of data processing, such as retrieval or update, more efficient. Another structure adjustment method eliminates variations in processing times of retrieval, addition, and deletion for a binary tree.

Structure adjustment is necessary for node deletion, addition, or reference. A plurality of structure adjustment methods are known. Any of them may be used. Partial interval lengths should be adjusted as the tree structure is changed according to the structure adjustment method to be used. The length of a path from the root to a node is usually made proportional to the logarithm of the total number of nodes through structure adjustment. For this reason, the time required for processing, such as retrieval, interval length adjustment, and structure adjustment, is approximately proportional to the logarithm of the total number of intervals.

Rotation, double rotation (zig-zig), or double rotation (zig-zag), which maintains the node sequence and the structure of a specified range of the binary tree 31, is used in the structure adjustment procedure as an operation unit. The actual structure adjustment procedure is composed of these units.

Figure 43:
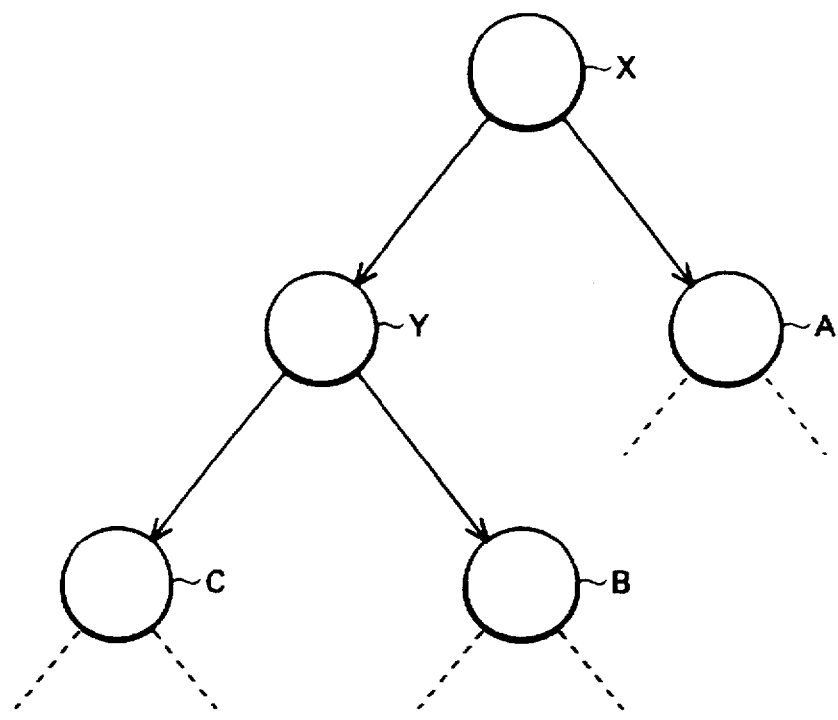
FIG. 43 shows an example of a binary tree in the sixth embodiment of this invention (adjust structure)
Figure 44:
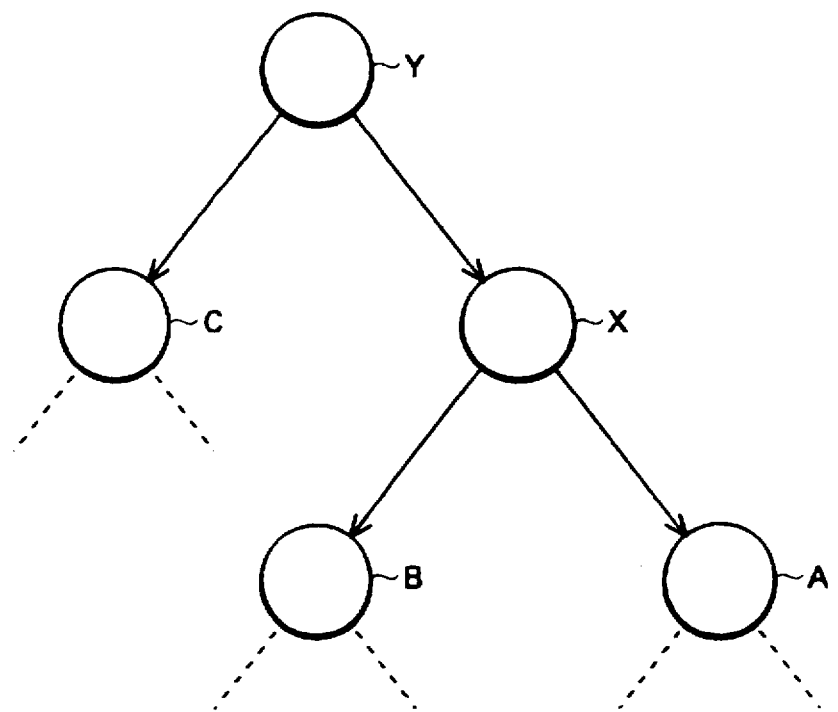
FIG. 44 shows an example of a binary tree in the sixth embodiment of this invention (adjust structure)
Figure 45:
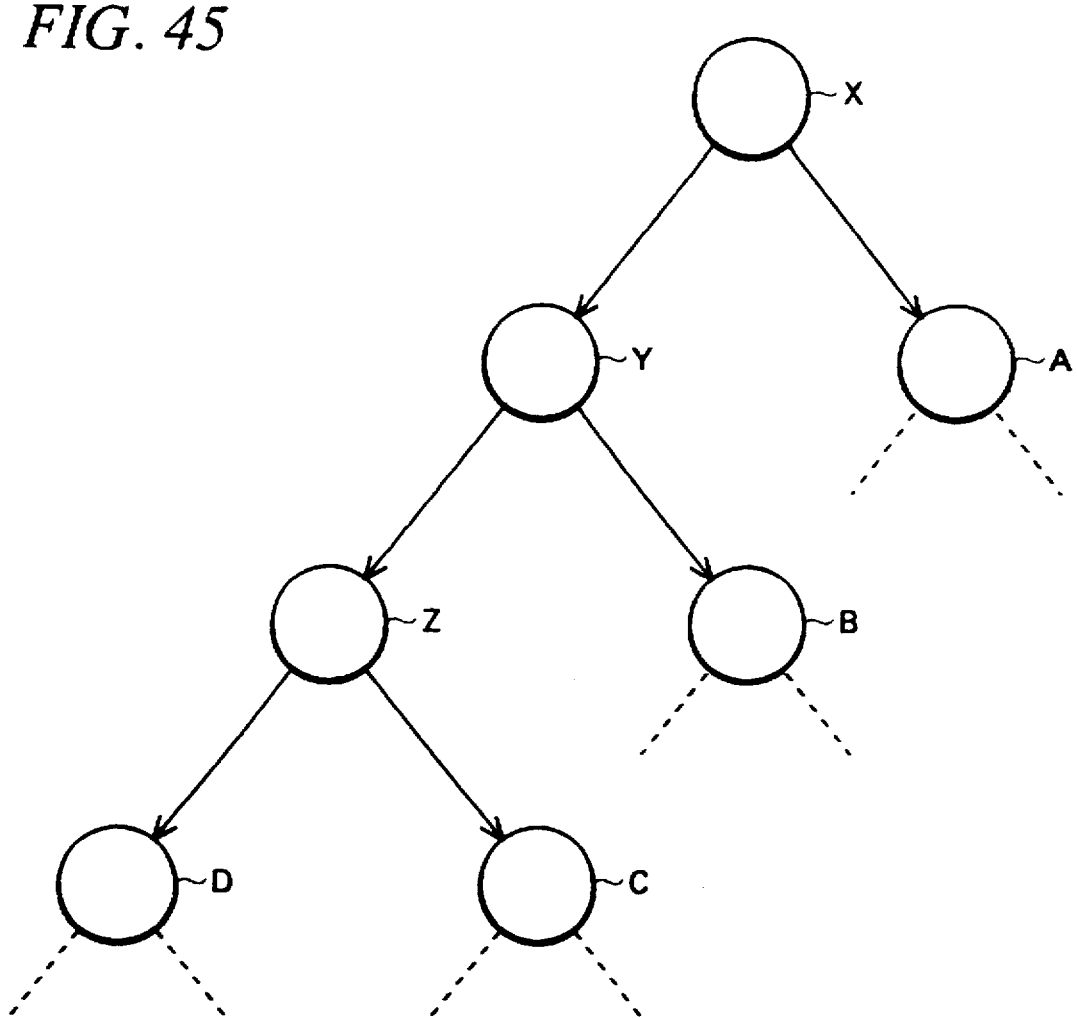
FIG. 45 shows an example of a binary tree in the sixth embodiment of this invention (adjust structure)
Figure 46:
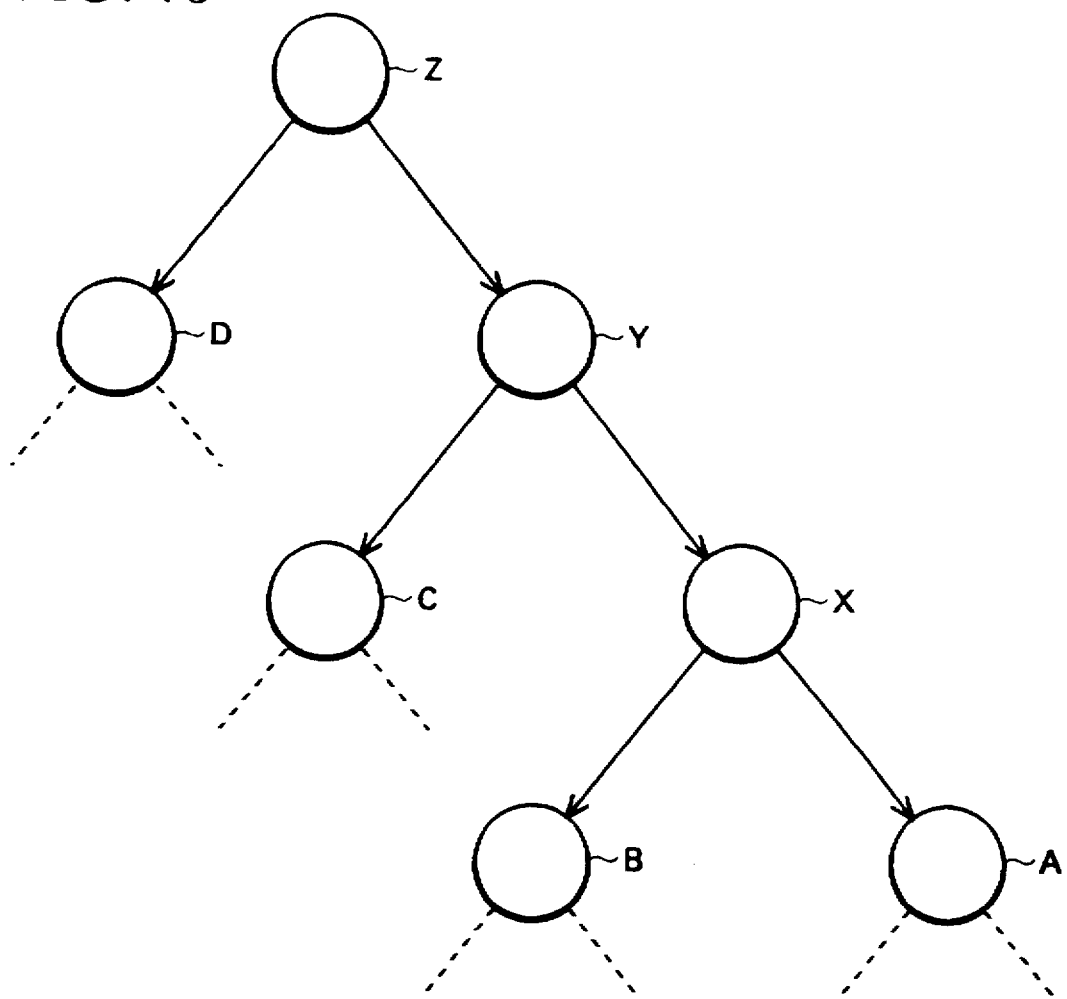
FIG. 46 shows an example of a binary tree in the sixth embodiment of this invention (adjust structure)
Figure 47:
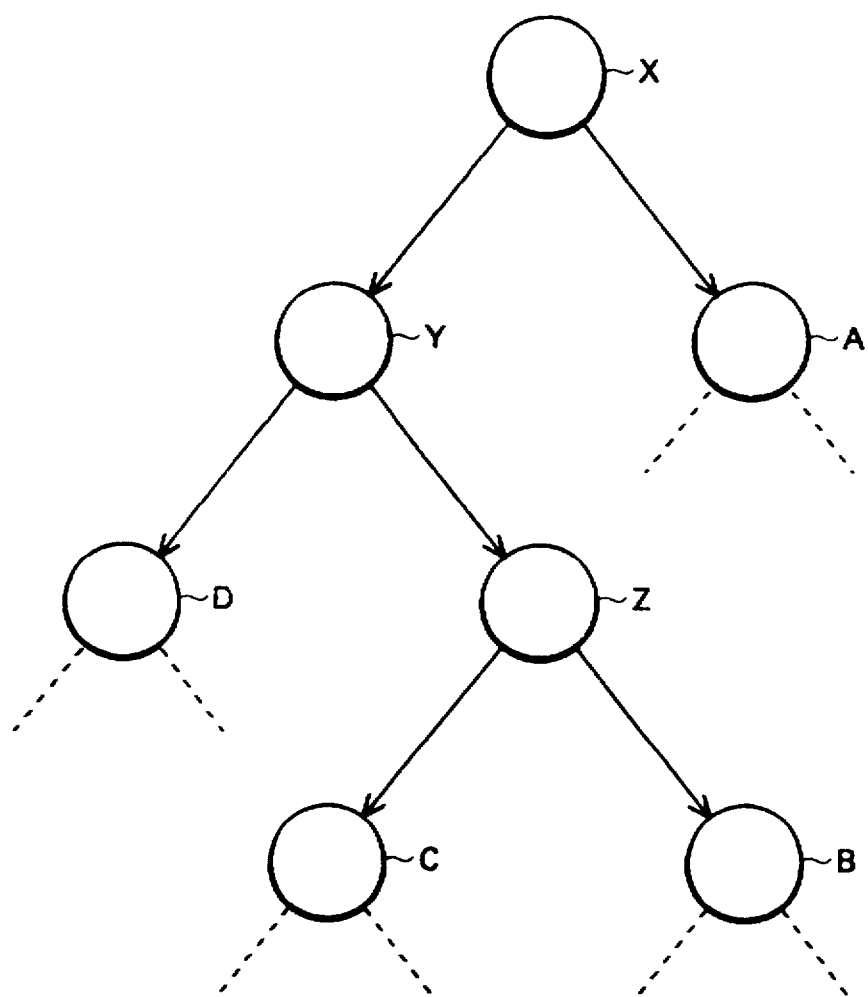
FIG. 47 shows an example of a binary tree in the sixth embodiment of this invention (adjust structure)
Figure 48:
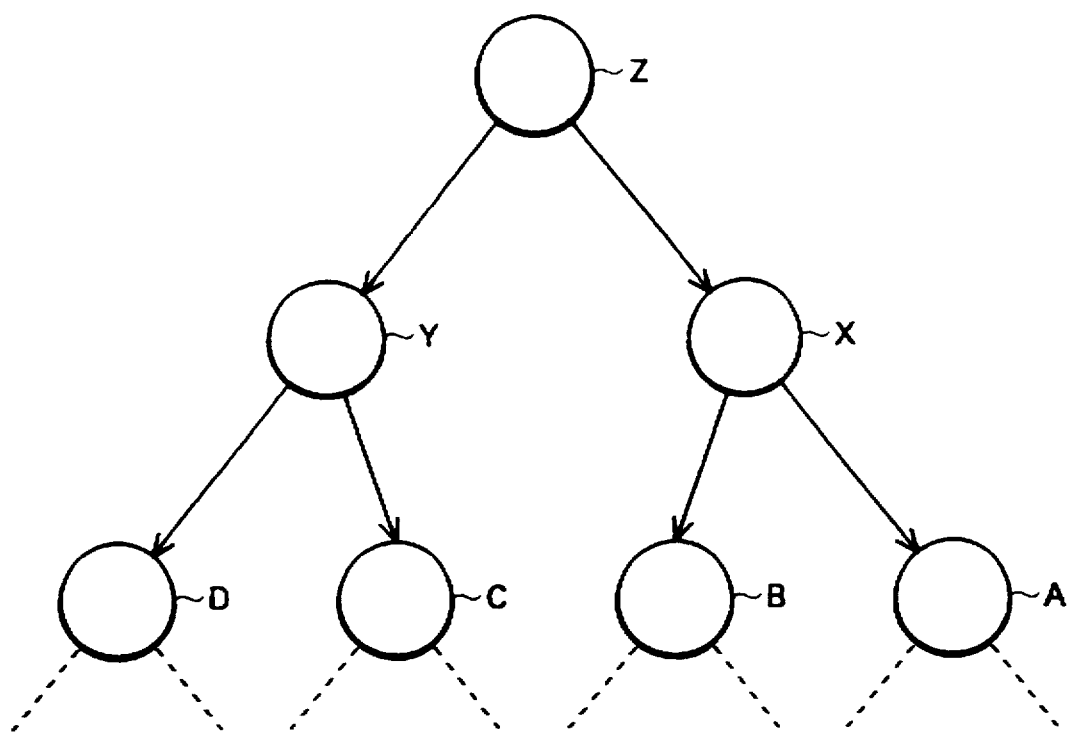
FIG. 48 shows an example of a binary tree in the sixth embodiment of this invention (adjust structure)

The following shows an example in which a conventional structure adjustment procedure unit is applied to the whole or an part of a path from the root to a node. Performing rotation on the binary tree 31 in FIG. 43 results in the binary tree 31 shown in FIG. 44. Performing double rotation (zig-zig) on the binary tree 31 in FIG. 45 results in the binary tree 31 shown in FIG. 46. Performing double rotation (zig-zag) on the binary tree 31 in FIG. 47 results in the binary tree 31 shown in FIG. 48.

Suppose that, for each node n, the partial interval length before change is $S(n)$ and the partial interval length after change is $SS(n)$. $SS(n)$ to be set in each node after execution of an operation unit is calculated as follows, based on the partial interval length $S(n)$ before the operation unit is executed. Note that the nodes except X, Y, and Z need not be changed. Calculation for rotation is performed as follows.

$$SS(X)=S(X)-S(Y)+S(B) \quad SS(Y)=S(X) \qquad \text{[Formula 15]}$$

Calculation for double rotation (zig-zig) is performed as follows.

$$SS(X)=S(X)-S(Y)+S(B) \quad SS(Y)=S(X)-S(Z)+S(C)$$
$$SS(Z)=S(X) \qquad \text{[Formula 16]}$$

Calculation for double rotation (zig-zag) is performed as follows.

$$SS(X)=S(X)-S(Y)+S(B) \quad SS(Y)=S(Y)-S(Z)+S(C)$$
$$SS(Z)=S(X) \qquad \text{[Formula 17]}$$

The partial interval length may also be calculated after the net interval length of X, Y, and Z are calculated.

The net interval length $T(n)$ for node n is calculated as follows.

For rotation:

$$T(X)=S(X)-S(Y)-S(A)$$

$$T(Y)=S(Y)-S(B)-S(C)$$

$$SS(X)=T(X)+S(A)+S(B)$$

$$SS(Y)=T(Y)+SS(X)+S(C) \qquad \text{[Formula 18]}$$

For zig-zig:

$$T(X)=S(X)-S(Y)-S(A)$$

$$T(Y)=S(Y)-S(Z)-S(B)$$

$$T(Z)=S(Z)-S(D)-S(C)$$

$$SS(X)=T(X)+S(A)+S(B)$$

$$SS(Y)=T(Y)+SS(X)+S(C)$$

$$SS(Z)=T(Z)+SS(Y)+S(D) \qquad \text{[Formula 19]}$$

For zig-zag:

$$T(X)=S(X)-S(Y)-S(A)$$

$$T(Y)=S(Y)-S(Z)-S(D)$$

$$T(Z)=S(Z)-S(C)-S(B)$$

$$SS(X)=T(X)+S(A)+S(B)$$

$$SS(Y)=T(Y)+S(C)+S(D)$$

$$SS(Z)=T(Z)+SS(X)+SS(Y) \qquad \text{[Formula 20]}$$

In the sixth embodiment, the structure adjustment is performed according to the status of the binary tree 31, because a plurality of processing types are combined to change the structure of a specified range of the binary tree 31.

More specifically, there are two structure adjustment methods. One method prevents a binary tree from growing vertically to keep the time of one operation within a specified time (e.g., red-black tree). The other method reduces the total time of the operation (that is, reduces the average time for one operation) although it does not keep the time of one operation within a specified time (e.g., splay tree). In either case, a change in the structure may be processed by a combination of the above processing types (operation units).

[6-2-4-5. Example of Structure Adjustment]

The following shows splay tree (splaying) as an example of structure adjustment (claim 34), and explains how splaying changes the structure of a binary tree and how the partial interval length of each node is changed during this change.

Splaying changes the structure of a binary tree so that any particular node (target node) becomes the root (Reference: Robert Endre Tarjan. "4.3 Self-Adjusting binary trees (pp. 53–56)" in Data Structures and Network Algorithms). Splaying is usually applied to nodes retrieved, added, or deleted; more specifically, it is applied to a node where a key match condition occurred during retrieval (or a node last accessed when no key match condition occurred), a node added during node addition, or the parent node of a node deleted during node deletion.

During splaying, one of rotation, double rotation (zig-zig), and double rotation (zig-zag) which satisfies the condition is applied repeatedly, with the target node as the node farthest from the root, until the target node becomes the root.

Figure 49:
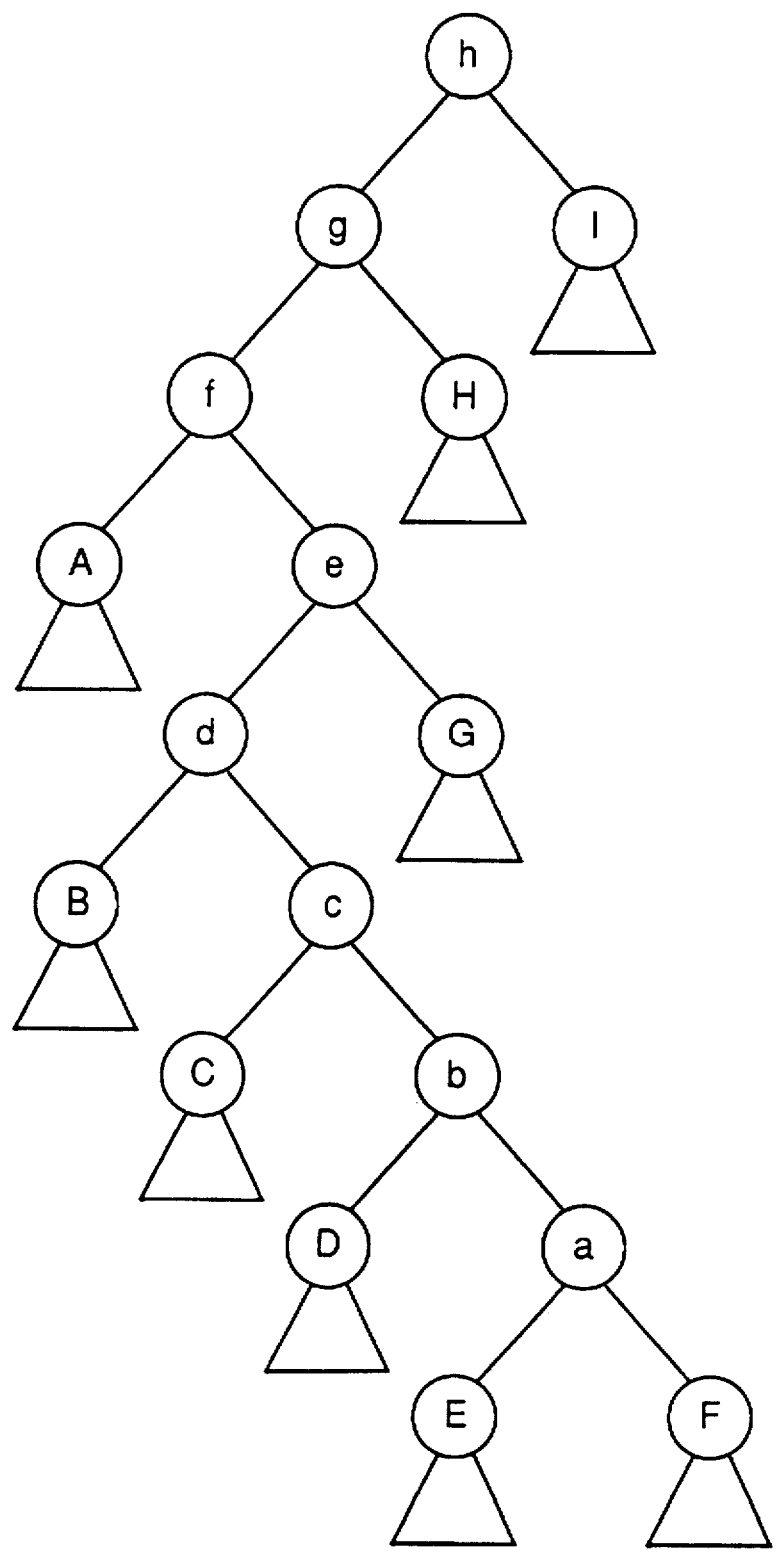
FIG. 49 is a diagram showing an example of binary tree in the sixth embodiment of this invention.

FIG. 49 shows an example of a binary tree. In this figure, a circle indicates a node, and a triangle indicates a sub-tree whose root is indicated by a circle. Binary tree data like this is structured in a list format by connecting the data items in the nodes via pointers. FIG. 50 is a conceptual diagram showing the format of data contained each n ode. As this figure shows, data contained in each node consists of a pointer to the right child, a pointer to the left child, a pointer to the higher-level node (parent), and the partial interval length of the node.

Figure 51:
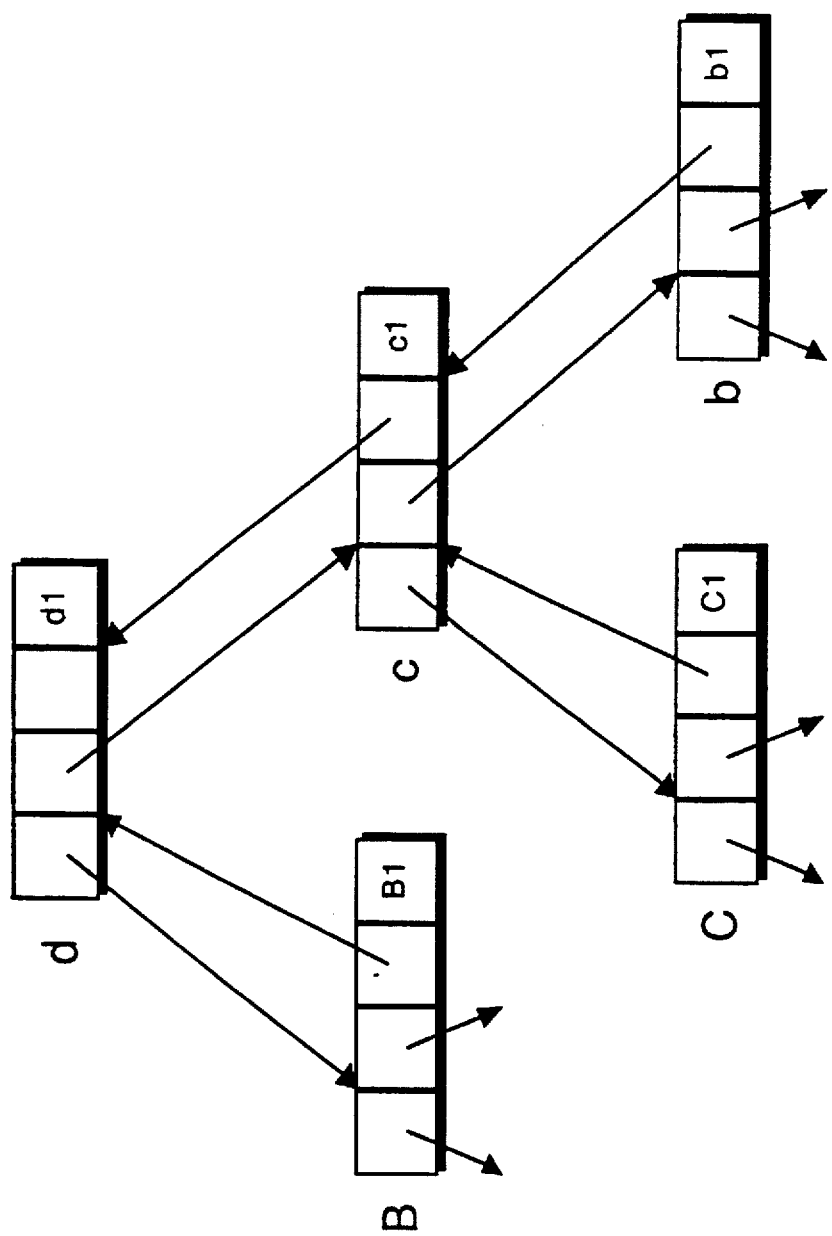
FIG. 51 is a conceptual diagram showing how the nodes in a part of the binary tree in FIG. 49 are connected by pointers in the sixth embodiment of this invention.

FIG. 51 is a conceptual diagram showing how data items in the nodes, which are part of the binary tree shown in FIG. 49, are connected via pointers.

As this figure shows, the partial interval length of each node (a, b, c, A, B, C) is represented by a symbol immediately followed by a number, such as a1, b1, c1, A1, B1, and C1. When the partial interval length a1 is updated, a new subscript follows the symbol a, such as a2 or a3.

The following shows an example of execution of splaying for node a, shown in FIG. 49. The net interval length of node a before splaying is calculated by subtracting the partial interval length (F1) of node F, which is the right child of node a, and the partial interval length (E1) of node E, which is the left child of node a, from the partial interval length of node a (a1), as shown below.

$$a1-F1-E1 \qquad \text{[Formula 21]}$$

Figure 52:
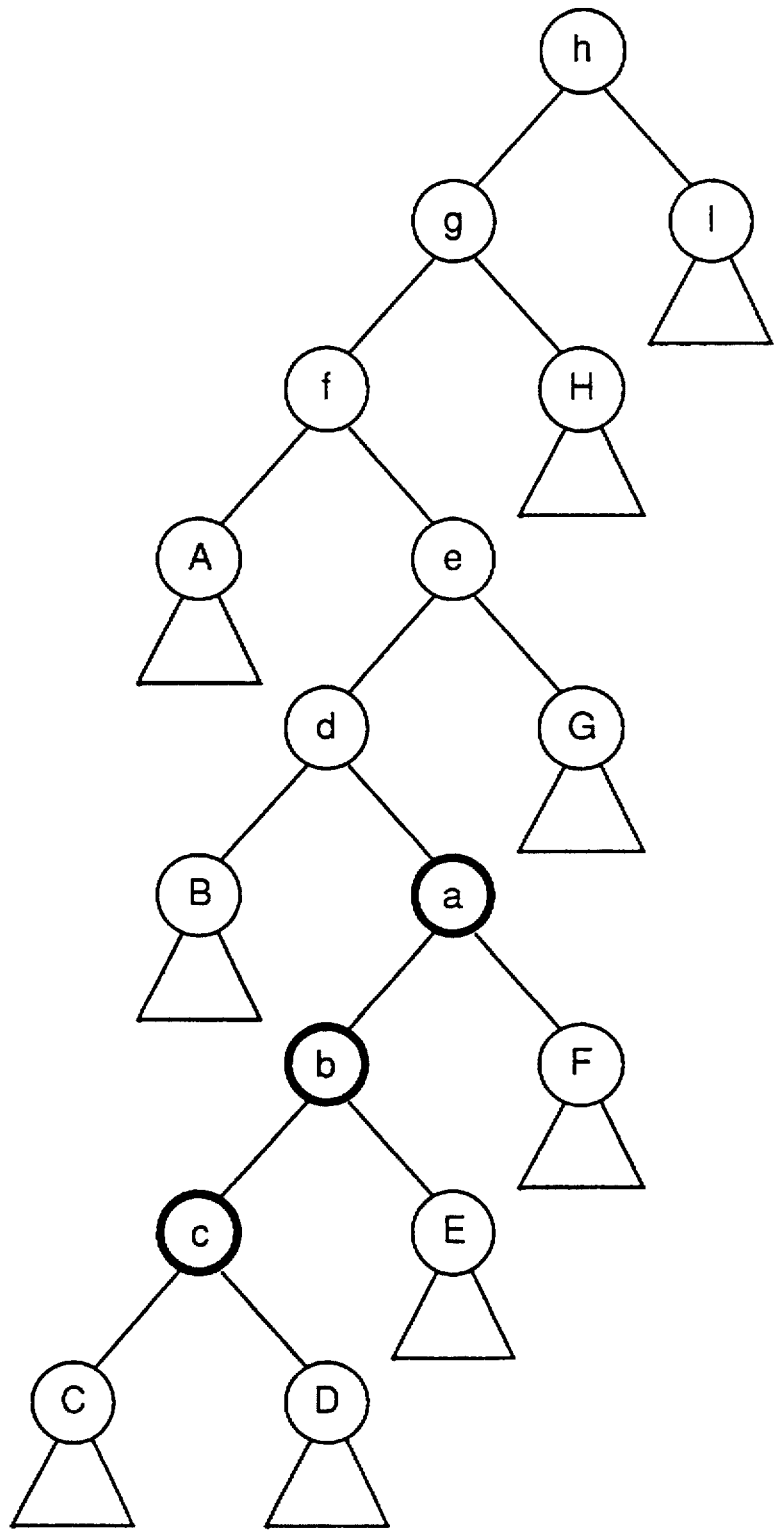
FIG. 52 is a diagram showing the binary tree in FIG. 49 to which double rotation (zig-zig) has been applied in the sixth embodiment of this invention.

During execution of splaying, double rotation (zig-zig) is first applied to nodes a, b, c, E, and D. This operation replaces node a with node c, and moves node a to the right child position of node d. FIG. 52 shows how the binary tree looks like after double rotation (zig-zig) has been applied.

This operation changes the partial interval lengths of nodes c, b, and a, indicated by bold circles, as follows:

$$c2=c1-b1+D1 \quad b2=c1-a1+E1 \quad a2=c1 \qquad \text{[Formula 22]}$$

Figure 53:
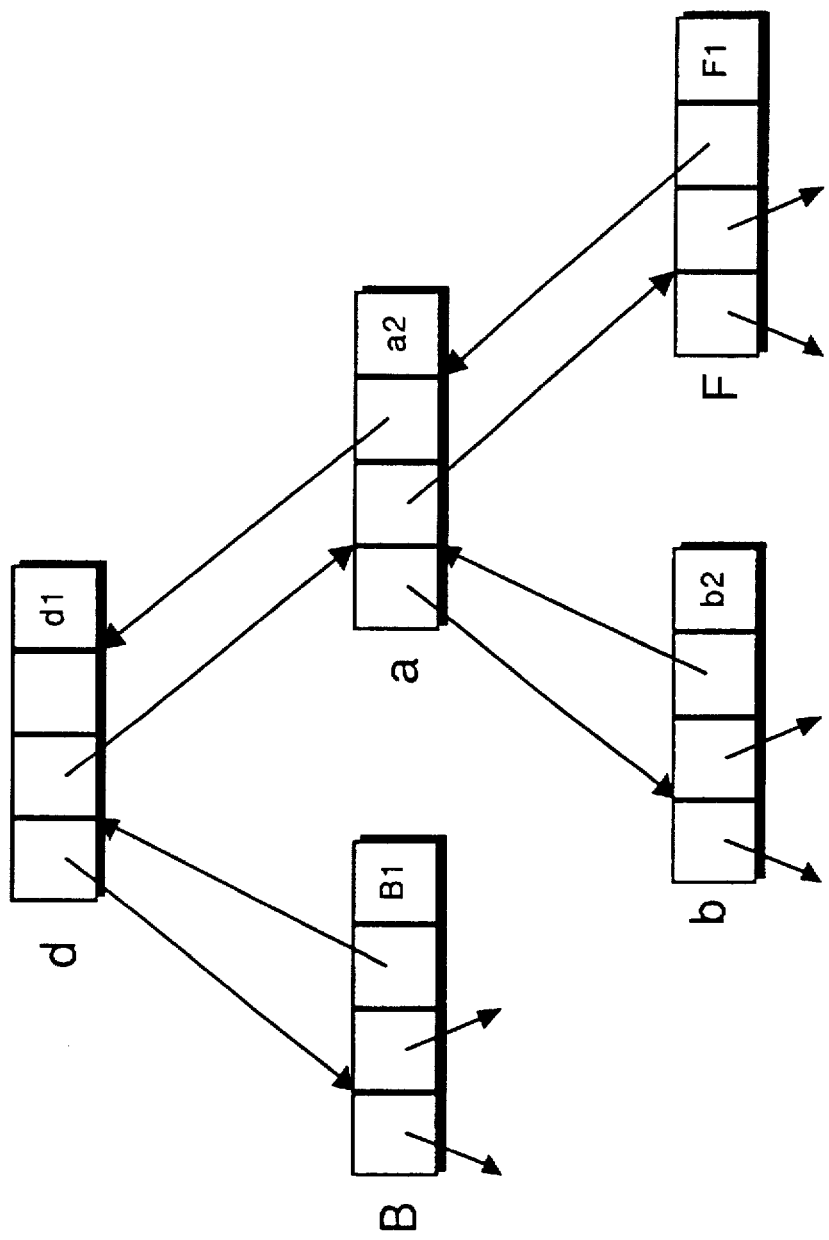
FIG. 53 is a diagram showing the data and pointers of node d and its subordinate nodes in FIG. 51 in the sixth embodiment of this invention.

When splaying is executed, the binary tree is restructured by changing the pointers that link the data items contained in the nodes. FIG. 53 shows how the pointers in the data items at node d and lower-level nodes in FIG. 51, which have been restructured as shown in FIG. 52, are linked. In this figure, while node B, which is the left child of node d, is not changed, node a, which is the right child of node d, and the lower-level nodes have been changed.

Figure 54:
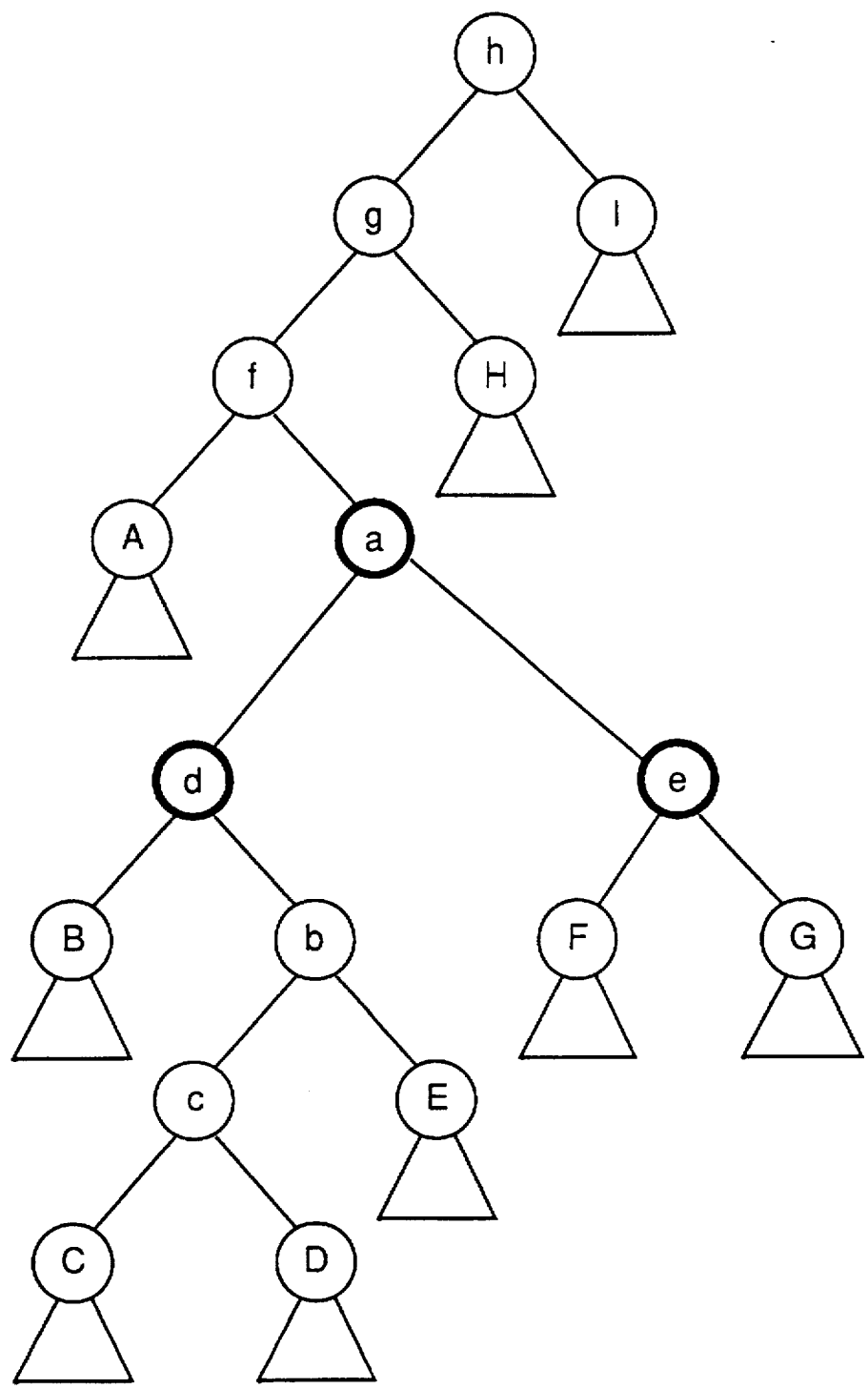
FIG. 54 is a diagram showing the binary tree in FIG. 52 to which double rotation (zig-zag) has been applied in the sixth embodiment of this invention.

Then, double rotation (zig-zag) is applied to nodes a, d, e, F, and b. This operation replaces node a with node e, and moves node a to the right child position of node f. FIG. 54 shows how the binary tree looks like after double rotation (zig-zag) has been applied to the binary tree shown in FIG. 52.

This operation changes the partial interval lengths of nodes e, d, and a, indicated by bold circles, as follows:

$$e3=e1-d1+F1 \quad d3=d1-a2+b2 \quad a3=e1 \qquad \text{[Formula 23]}$$

Then, double rotation (zig-zag) is applied to nodes a, f, g, and e. This operation replaces node a with node g, and moves node a to the left child position of node h.

Figure 55:
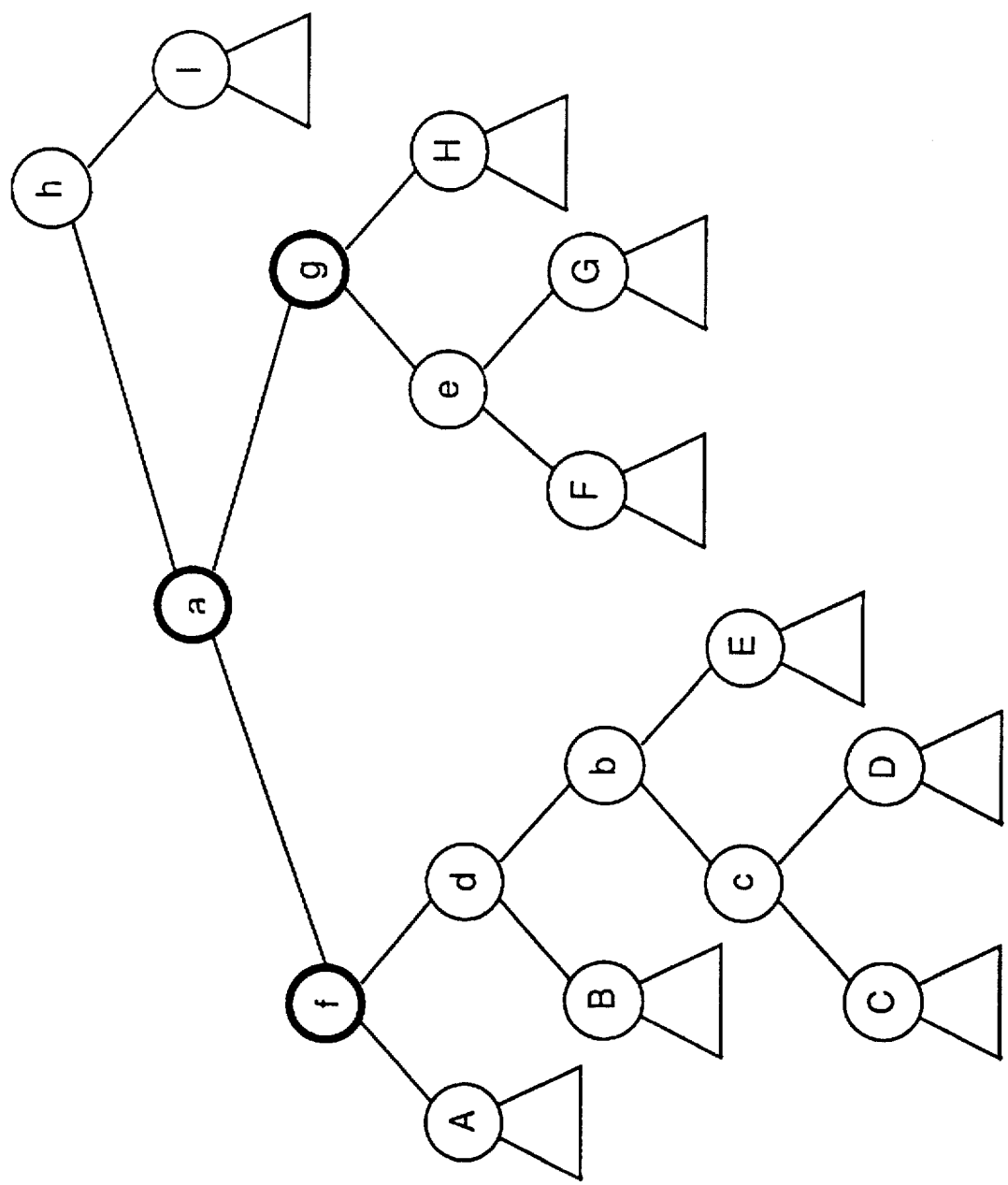
FIG. 55 is a diagram showing the binary tree in FIG. 54 to which double rotation (zig-zag) has been applied in the sixth embodiment of this invention.

FIG. 55 shows how the binary tree looks like after double rotation (zig-zag) has been applied to the binary tree shown in FIG. 54.

This operation changes the partial interval lengths of nodes g, f, and a, indicated by bold circles, as follows:

$$g4=g1-f1+e3 \quad f4=f1-a3+d3 \quad a4=g1 \qquad \text{[Formula 24]}$$

Figure 56:
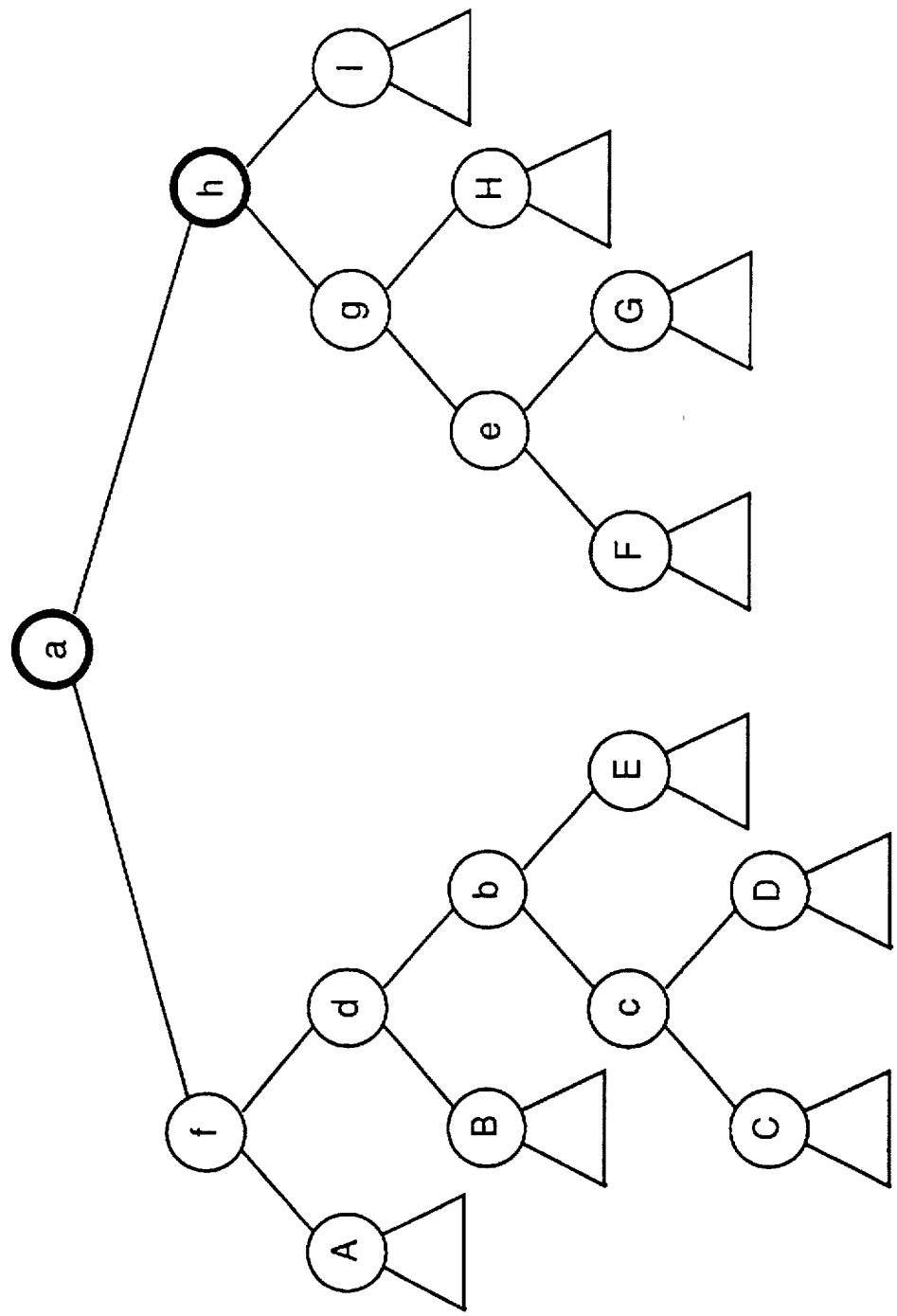
FIG. 56 is a diagram showing the binary tree in FIG. 55 to which rotation has been applied in the sixth embodiment of this invention.

Finally, rotation is applied to nodes a, h, and g. This operation replaces node a with node h, and moves node a to the root position. FIG. 56 shows how the binary tree looks like after rotation has been applied to the binary tree shown in FIG. 55.

This operation changes the partial interval lengths of nodes h and a, indicated by bold circles, as follows:

$$h5=h1-a4+g4 \quad a5=h1 \qquad \text{[Formula 25]}$$

In this example, the execution of splaying moves target node a to the root and, at the same time, reduces the length of a path from node b, c, d, e, f, or g, which was an a path from target node a to the old root node h, to the root, thereby enabling various types of operation on this binary tree to be performed speedily (claim 34). Comparing the binary tree before splaying (FIG. 49) with the binary tree after splaying (FIG. 56) indicates that the length of a path from each node to the root has been changed as shown below.

TABLE 2

| Node | Before splaying | After splaying |
|------|-----------------|----------------|
| b | 6 | 3 |
| c | 5 | 4 |
| d | 4 | 2 |
| e | 3 | 3 |
| f | 2 | 1 |
| g | 1 | 2 |

During execution of this splaying, the partial interval length of each node is calculated as described below, based on the partial interval length of each node before splaying shown in FIG. 49. For node b:

$$b2=c1-a1+E1 \qquad \text{[Formula 26]}$$

For node c:

$$c2=c1-b1+D1 \qquad \text{[Formula 27]}$$

For node d:

$$d3=d1-a2+b2 \qquad \text{[Formula 28]}$$

This formula is expanded as follows:

$$d1-(c1)+(c1-a1+E1) \qquad \text{[Formula 29]}$$

Terms are eliminated as follows:

$$d1-a1+E1 \qquad \text{[Formula 30]}$$

For node e:

$$e3=e1-d1+F1 \qquad \text{[Formula 31]}$$

For node f:

$$f4=f1-a3+d3 \qquad \text{[Formula 32]}$$

This formula is expanded as follows:

$$f4=f1-(e1)+(d1\ a1+E1) \qquad \text{[Formula 33]}$$

The formula is changed as follows:

$$f4=f1-e1+d1-a1+E1 \qquad \text{[Formula 34]}$$

Similarly, for node g:

$$g4=g1-f1+e3 \qquad \text{[Formula 35]}$$

$$g4=g1-f1+e1-d1+F1 \qquad \text{[Formula 36]}$$

Therefore, for node h:

$$h5=h1-a4+g4 \qquad \text{[Formula 37]}$$

This formula is expanded as follows:

$$h5=h1-(g1)+(g1-f1+e1-d1+F1) \qquad \text{[Formula 38]}$$

Terms are eliminated as follows:

$$h5=h1-f1+e1-d1+F1 \qquad \text{[Formula 39]}$$

The net interval length of node a after splaying is calculated by subtracting the partial interval length (h5) of node h, which is the right child of node a, and the partial interval length (f4) of node f, which is the left child of node a, from the partial interval length (a5) of node a.

$$a5-h5-f4 \qquad \text{[Formula 40]}$$

This formula is expanded as follows:

$$h1-(h1-f1+e1-d1+F1)-(f1-e1+d1-a1+E1) \qquad \text{[Formula 41]}$$

Terms are eliminated as follows:

$$a1-F1-E1 \qquad \text{[Formula 42]}$$

Note that this formula is equivalent to formula 21 that gives the net interval length before splaying.

Conversely, in FIG. 49 where the binary tree before splaying is shown, the sum of the lengths of the intervals to the left of node a is as follows:

$$E1+(b1-a1)+(c1-b1)+(d1-c1)+(f1-e1) \qquad \text{[Formula 43]}$$

Terms are eliminated as follows:

$$E1-a1+d1-e1+f1 \qquad \text{[Formula 44]}$$

This is equal to the partial interval length (f4) of node f after splaying, indicating that the relative position of the interval of node a is not affected by splaying.

[6-2-4-6. Application of Splaying]

Splaying described above allows the following procedure to be used for various types of processing already described. First, when identifying an interval corresponding to the specified node, execution of splaying on the binary tree moves the specified node to the root (claim 21).

This makes it easy to identify the specified node which is now the root, because the beginning position and the ending position are identified as follows. When the left-end position of the whole interval is 0, the beginning position is the position immediately following the partial interval length of the left child of the specified node, and the ending position is the position corresponding to the value obtained by subtracting the partial interval length of the right child of the specified node from the partial interval length of the specified node.

When changing an interval length, splaying is applied to the node whose interval length is to be changed to make the node the root node. Then, the partial interval length of the root node is increased or decreased (claim 25). This procedure eliminates the need to change the partial interval length of a non-root node, making the processing simpler.

When adding a node and adjusting the associated partial interval lengths, splaying is applied to the nodes immediately before and after the node to be added to make them the root node one at a time. Then, the node immediately before the node to be added is the left child, and the node immediately following the node to be added is the right child. The partial interval length of the node to be added is calculated by adding the length of the new interval to the partial interval lengths of the right and left children (claim 28).

Figure 57:
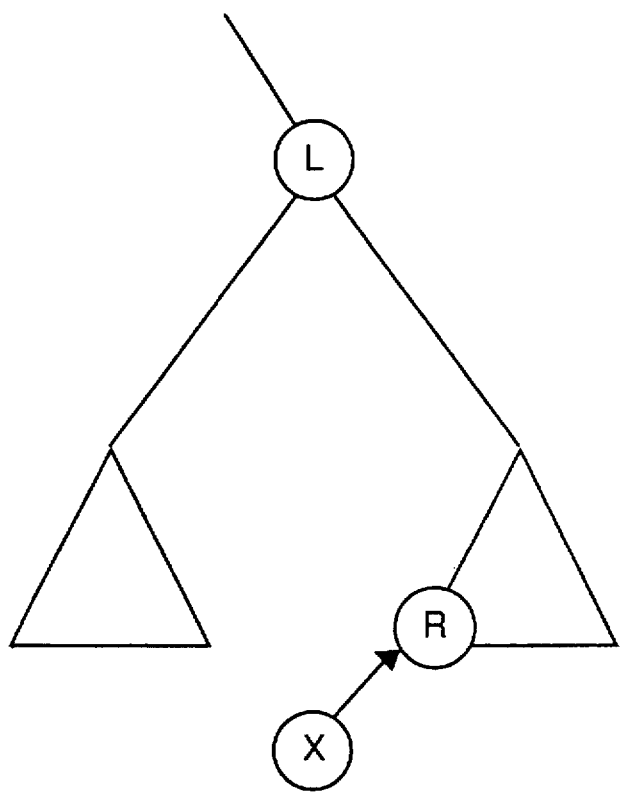
FIG. 57 is a diagram showing a part of the binary tree before an interval is added through splaying in the sixth embodiment of this invention.

For example, FIG. 57 shows a part of the binary tree before an interval is added through splaying. Assume that this part of the binary tree is located at a non-root position within a larger binary tree. As shown in this figure, an interval indicated by node X is added immediately after the interval corresponding to node L. In this case, node X should be added to the leftmost position in the subtree whose root is the right child of node L, as the left child of the left most node of the subtree indicated by R. Conceptually, this is equivalent to adding node X between node L and node R.

Figure 58:
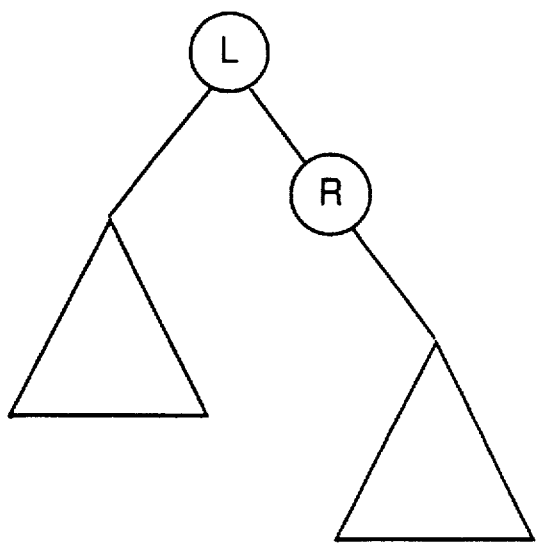
FIG. 58 is a diagram showing the binary tree in FIG. 57 to which splaying has been applied in the sixth embodiment of this invention.
Figure 59:
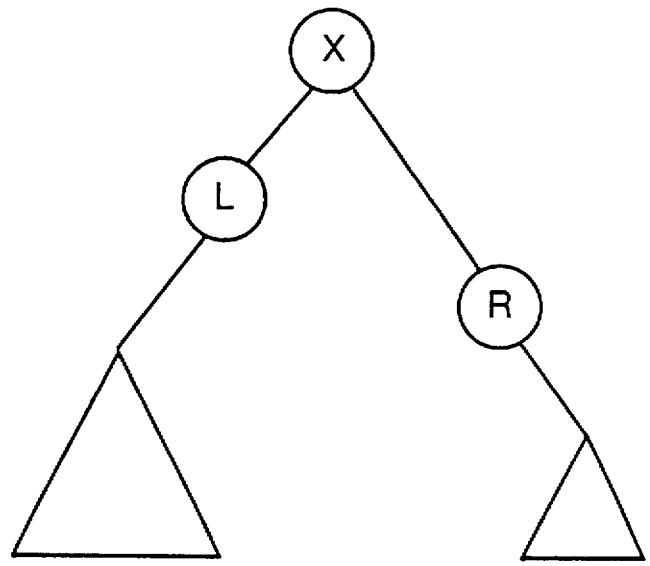
FIG. 59 is a diagram showing the binary tree to which an interval has been added through splaying in the sixth embodiment of this invention.

First splaying is executed to make node R the root node; node R is the node which will come immediately after node X. Then splaying is executed to make node L the root node; node L is the node which will come immediately before node X. FIG. 58 shows how the binary tree looks like after splaying have been executed twice for the binary tree shown in FIG. 57. Then, node X is added with node L being the left child and immediately-following node R being the right child. FIG. 59 shows how the binary tree looks like after the interval has been added through splaying.

The partial interval length of node X in FIG. 59 is calculated by adding the length of the new interval to the partial interval length of node L (the root node) in FIG. 58 where the binary tree after splaying is shown. The partial interval length of node L in FIG. 59 is calculated by subtracting the partial interval length of node R from the partial interval length of node L in FIG. 58.

Figure 60:
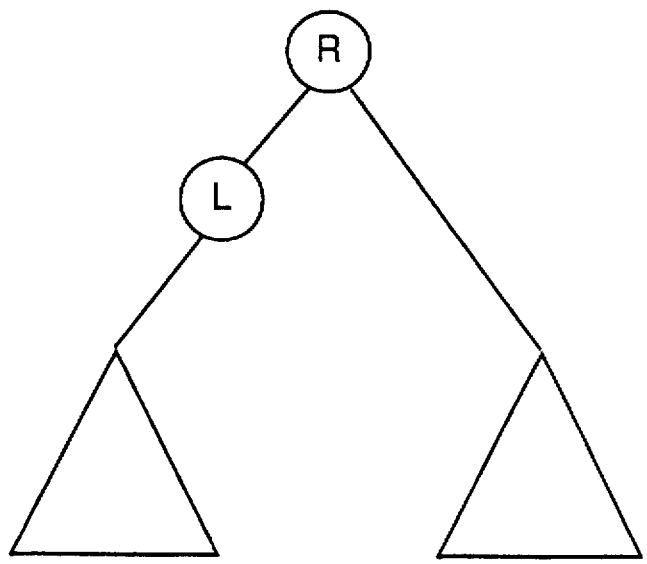
FIG. 60 is a diagram showing the binary tree to which, in the binary tree shown in FIG. 58, splaying has been applied to node R which is the node immediately following the addition point in the sixth embodiment of this invention.
Figure 61:
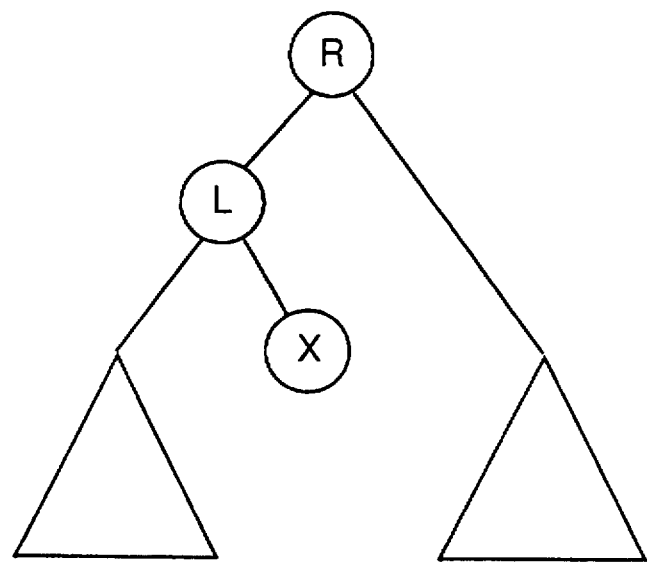
FIG. 61 is a diagram showing the binary tree to which node X has been added as the right child of node L in the sixth embodiment of this invention.

In FIG. 57, splaying may be executed on node L first, followed by the splaying with node R, to make the binary tree as shown in FIG. 60, and then node X may be added as the right child of node L. FIG. 61 shows the binary tree to which node X has been added as the right child of node L. In this state, the nodes on the path from the parent of node X to the root are node L and node R. This means that, when the partial interval lengths are changed (increased), those of only these two nodes need be changed, making the procedure simpler (claim 28).

This operation can be symmetrically applied in FIG. 60, where node X may be added as the right child of node L.

Figure 62:
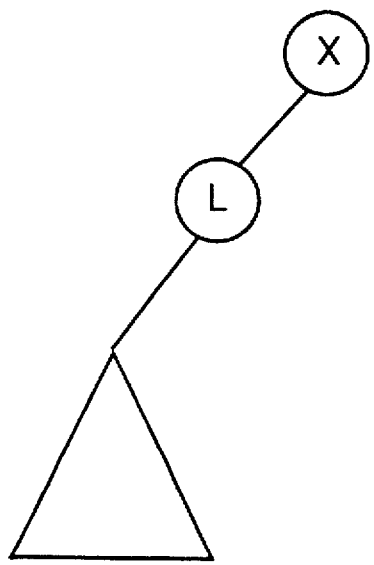
FIG. 62 is a diagram showing the binary tree, shown in FIG. 60, where node L has no right child and node L is the left child of node X, in the sixth embodiment of this invention.
Figure 63:
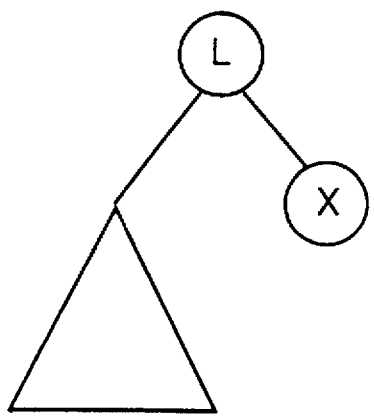
FIG. 63 is a diagram showing the binary tree, shown in FIG. 60, where node L has no right child and node X is the right child of node L, in the sixth embodiment of this invention.

If node L in FIG. 60 has has no right child (that is, there is no right-side sub-tree whose root is node R), node X may be used as the right child of node L as shown in FIG. 63, as well as node L may be used as the left child of node X as shown in FIG. 62.

In addition, when node addition and associated partial interval length adjustment are involved, processing may be performed as follows. First, a node corresponding to the new interval is added using some method, with the net interval length of the node being 0. The partial interval length of the added node is the sum of the partial interval lengths of the right and left children. Then, splaying is executed to move the added node to the root of the binary tree, and the partial interval length of the node moved to the root is increased by the net interval length of the added interval (claim 29). This means that the partial interval length of the node need be increased only once during execution of a desired addition algorithm, increasing the processing speed.

Figure 64:
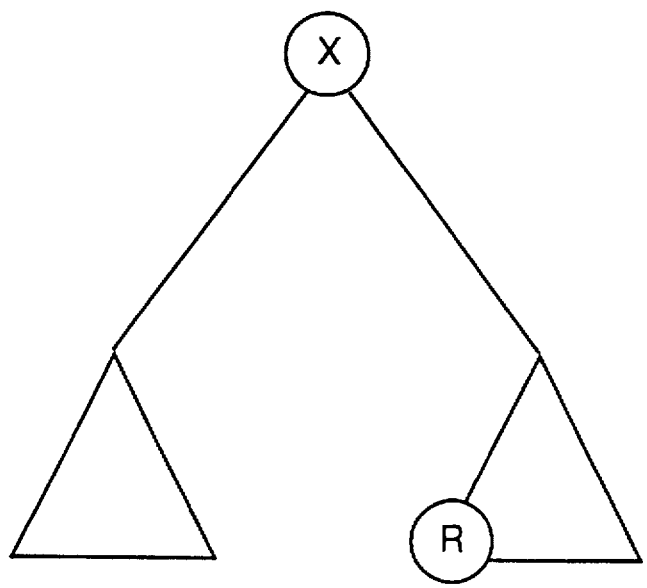
FIG. 64 is a diagram showing the binary tree in which node X to be deleted has been moved to the root by means of splaying in the sixth embodiment of this invention.

Splaying may also be used to delete a node (interval). To do so, the node to be deleted is first moved to the root through execution of splaying. FIG. 64 shows how the binary tree looks like after node X, which is to be deleted, has been moved to the root through execution of splaying. In this figure, node X to be deleted corresponds to the interval immediately before node R.

Then, node R immediately after node X, which is to be deleted, is moved to the root through execution of splaying.

Figure 65:
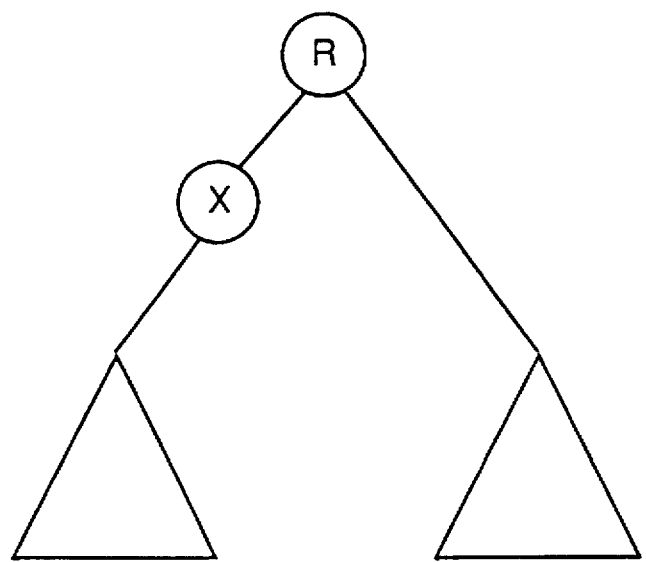
FIG. 65 is a diagram showing the binary tree in which node R immediately following node X to be deleted has been moved to the root by means of splaying in the sixth embodiment of this invention.
Figure 66:
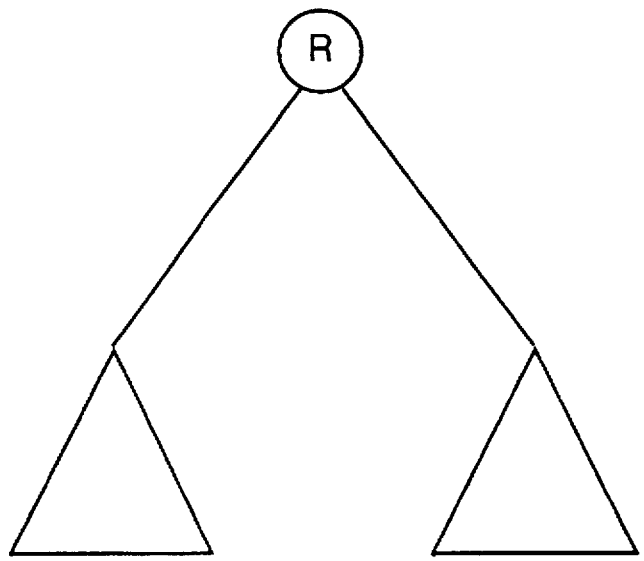
FIG. 66 is a diagram showing the binary tree from which node X has been deleted in the sixth embodiment of this invention.

FIG. 65 shows how the binary tree looks like after node R, which immediately follows node X to be deleted, has been moved to the root through execution of splaying. And, the partial interval length of node R, which is now the root, is decreased by the net interval length of node X and, finally, node X is deleted (claim 31). FIG. 66 shows how the binary tree looks like after node X has been deleted. This means that only the partial interval length of the root node need be adjusted during deletion, increasing the processing speed.

[6-2-4-7. Balanced Binary Tree]

The following explains, more specifically, how the partial interval length of each node is changed during binary tree structure adjustment (rebalancing) when a balanced binary tree, one of balanced search trees, is used as a binary tree representing intervals. (Reference: Robert Endre Tarjan. "4.2 Balanced binary trees (pp. 48–53)" in Data Structures and Network Algorithms).

Operations for rebalancing after node insertion or deletion are:

(a) Promote, demote (b) Single rotation (c) Double rotation including two single rotations Rebalancing is performed by sequentially applying a combination of these operations.

These operations change partial interval lengths as follows : (a) Promote and demote, which do not change the structure of a binary tree, do not change the partial interval length. (b) Single rotation is equivalent to rotation in this invention. So, formula 15 given above is used to change the partial interval length. (c) Double rotation is equivalent to double rotation (zig-zag) in this invention. So, formula 17 given above is used to change the partial interval length.

Balancing after inserting one node requires a series of promote operations ended by up to two single rotations (pp. 50 in the reference given above), while balancing after deleting one node requires a series of demote operations ended by up to three single rotations (pp. 51 in the reference given above).

Figure 67:
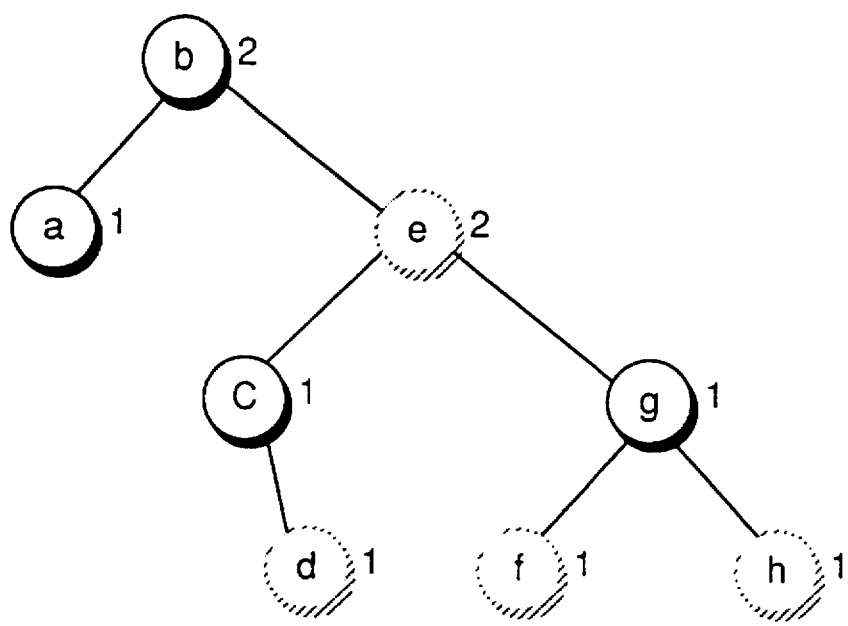
FIG. 67 is a diagram showing a sample balanced binary tree in the sixth embodiment of this invention.

The following explains an example of rebalancing after insertion. The tree in FIG. 67 is used as an example of a balanced binary tree. In this tree, each node has an integer rank such as 1 or 2, as shown in FIG. 67. The rank of node x is represented by rank (x), the parent of node x is represented by p (x), and the grandparent of node x is represented by p2 (x). Then, the following must be satisfied:

(1) When node x has the parent:
Condition 1:

$$\text{rank}(x) \leq \text{rank}(p(x)) \leq \text{rank}(x)+1 \qquad \text{[Formula 45]}$$

(2) When node x has the grandparent:
Condition 2:

$$\text{rank}(x) < \text{rank}(p2(x)) \qquad \text{[Formula 46]}$$

(3) When node x is an external node:
Condition 3:

$$\text{rank}(x)=0 \qquad \text{[Formula 47]}$$

and when node x has the parent:

$$\text{rank}(p2(x))=1$$

A node whose parent has a rank that is larger than that of the node by 1 or that is undefined is called a black node, while a node whose parent has a rank equal to that of the node is called a red node. In FIG. 67, a black node is represented by a solid line, whereas a red node is represented by a dashed line.

Figure 68:
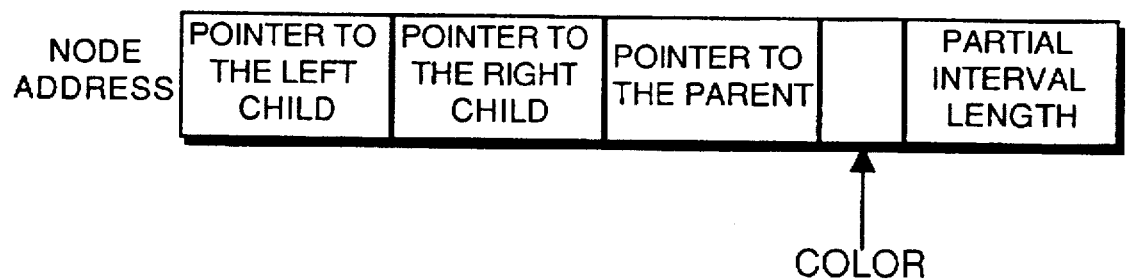
FIG. 68 is a diagram showing information contained in a node in a sample balanced binary tree in the sixth embodiment of this invention.

Information on a node in this tree contains a one-bit field where the color for the node is stored. FIG. 68 shows the format of information on a node in the balanced binary tree example. The nodes in this tree are linked by pointers, as in FIG. 53. In the following discussion, the partial interval length of each node (a, b, c) is represented by the same symbol immediately followed by a numerical subscript (a1, b1, c1). When the partial interval length a1 is updated, a new numerical subscript immediately follows the symbol, such as a2 and a3.

Figure 69:
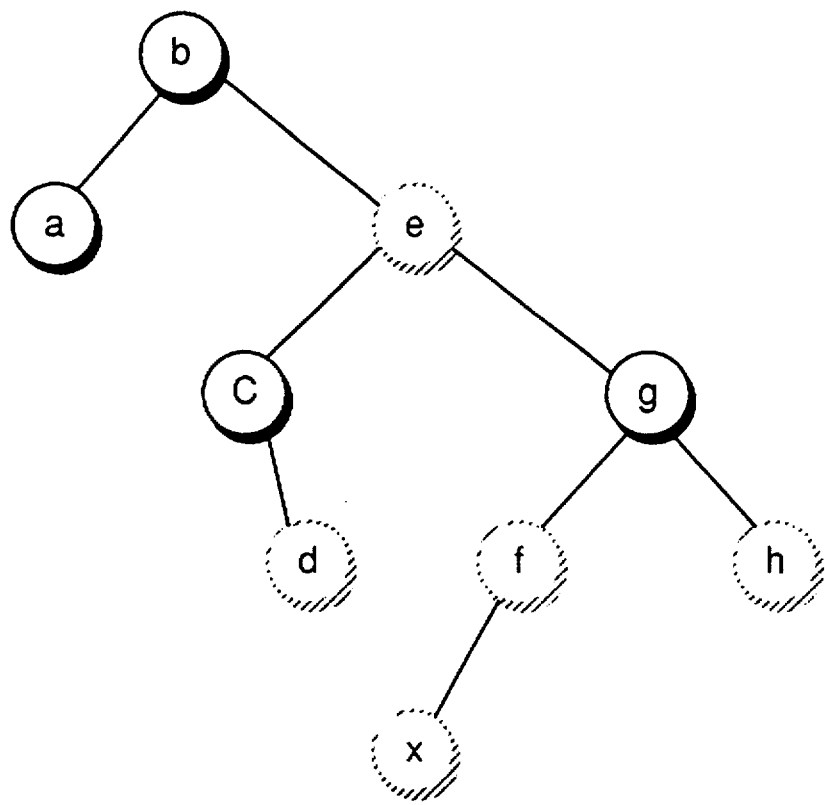
FIG. 69 is a diagram showing the tree, shown in FIG. 67, where (a node representing) a new interval x has been inserted to the left of the interval representing node f in the sixth embodiment of this invention.

For example, when (a node representing) a new interval x is inserted to the left of the interval represented by node f of the tree in FIG. 67, the tree is first changed to the one shown in FIG. 69.

In this case, the partial interval length of each node is changed as follows, as explained in "6-2-4-2. Interval Addition Step":

$$f2=f1+x1 \quad g2=g1+x1 \quad e2=e1+x1 \quad b2=b1+x1 \qquad \text{[Formula 48]}$$

Because added node x and its parent are both red nodes, the ranks are as follows:

$$\text{rank}(x)=\text{rank}(f) \text{ rank}(g) \qquad \text{[Formula 49]}$$

This contradicts condition 2 (formula 46), meaning that structure adjustment is required.

Figure 70:
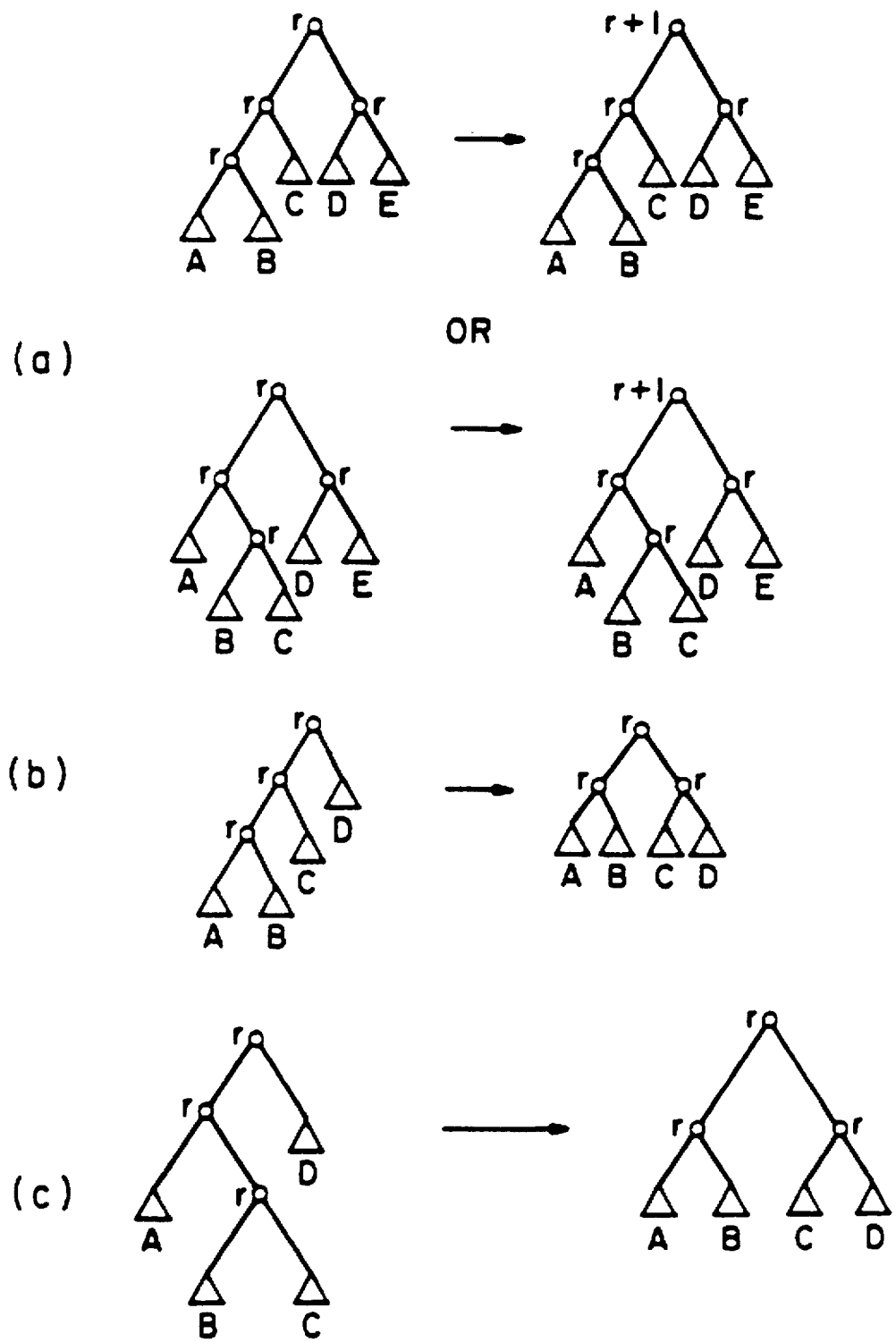
FIG. 70 (a) is a diagram showing one type of rebalancing (promotion) when condition 2 is not satisfied in the sixth embodiment of this invention.
Figure 71:
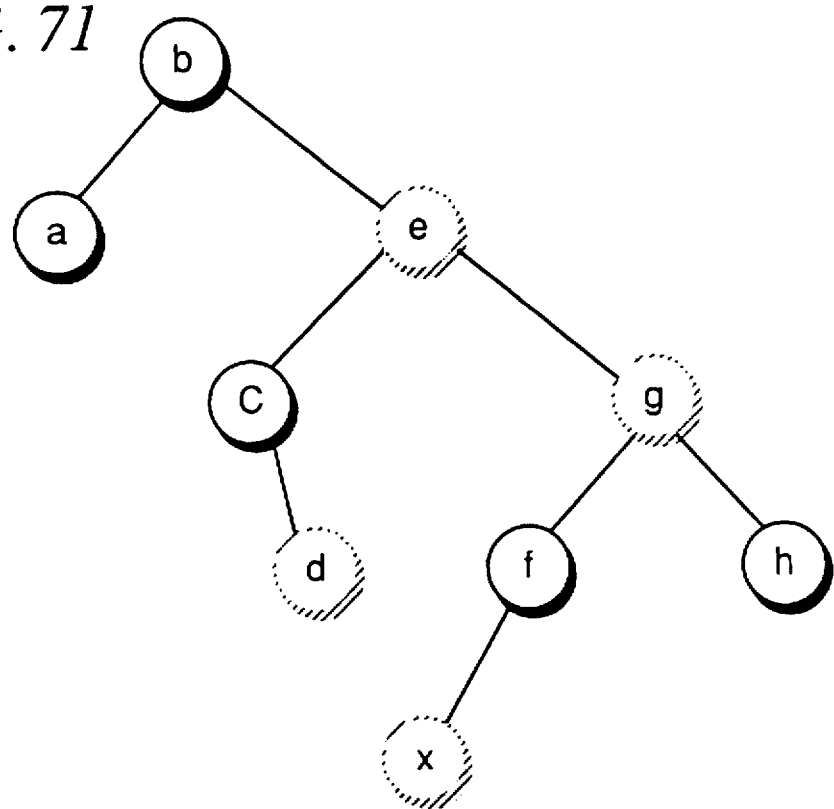
FIG. 71 is a diagram showing the binary tree in which node colors have been changed in the sixth embodiment of this invention.

FIG. 70 shows rebalancing that is performed when condition 2 is not satisfied. That is, nodes x, f, g, and h in FIG. 69 correspond to (a) in FIG. 70. Therefore, the color of node g is changed to red, and the colors of child nodes f and h are changed from red to black so that rank (g) is one level higher than other nodes. FIG. 71 shows how the binary tree looks like after the node colors have been changed.

Figure 72:
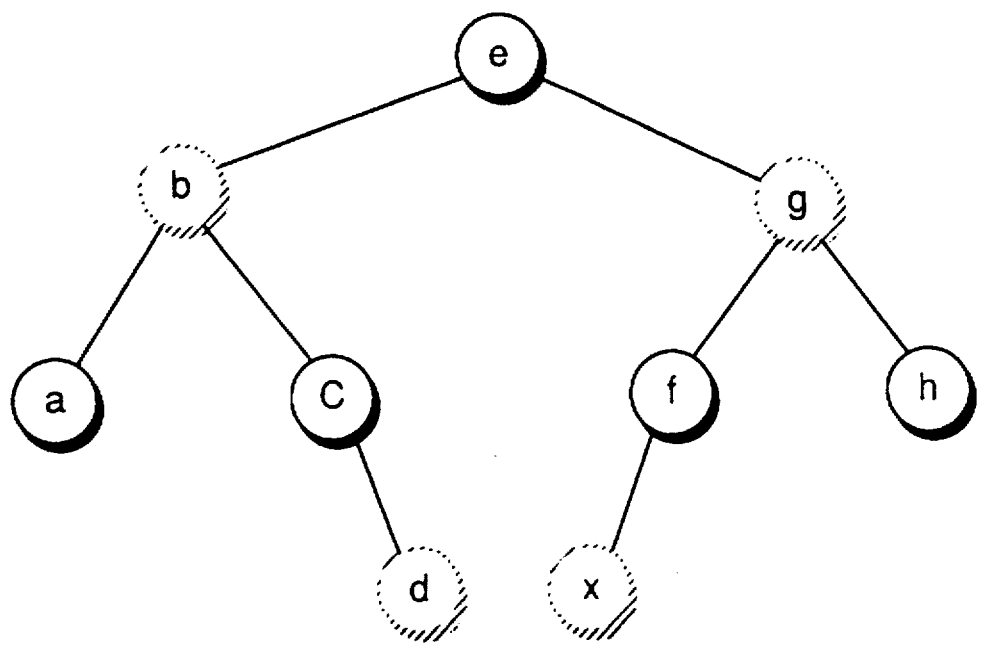
FIG. 72 is a diagram showing the binary tree in which single rotation has been performed and node colors have been changed in the sixth embodiment of this invention.

In this state, both node g and its parent node e become red, requiring further adjustment. That is, because node a is black, nodes g, e, b, and a correspond to (b) in FIG. 70 (symmetric). So, single rotation is performed once to change node b to red, and node e to black. FIG. 72 shows how the binary tree looks like after single rotation has been performed and node colors have been changed.

This is rotation on nodes e and b, and the partial interval lengths are changed as shown below.

$$b3=b2-e2+c1 \quad e3=b2 \qquad \text{[Formula 50]}$$

In FIG. 72, contradictions to conditions 1, 2, and 3 are resolved, and structure adjustment (re-balancing) is completed.

In the above structure adjustment, the net interval lengths of nodes e and b are as follows in FIG. 67 where the binary tree before node insertion is shown.

| [Formula 51] |
| --- |
| e: |
| e1 − c1 − g1 |
| b: |
| b1 − a1 − e1 |

Note that, in FIG. 72 where the binary tree after node insertion and structure adjustment is shown, the net interval lengths of nodes e and b remain the same as before, as described below.

| [Formula 52] |
| --- |
| e: |
| e3 − b3 − g2 |
| = b2 − (b2 − e2 + c1) − (g1 + x1) |
| = e2 − c1 − g1 − x1 |
| = (e1 + x1) − c1 − g1 − x1 |
| = e1 − c1 − g1 |
| b: |
| b3 − a1 − c1 |
| = (b2 − e2 + c1) − a1 − c1 |
| = (b1 + x1) − (e1 + x1) − a1 |
| = b1 − a1 − e1 |

[6-2-4-8. Comparison with Prior Arts]

A prior art is known which allows the sequence of a node to be obtained from the node in the binary tree (U.S. Pat.

5,384,568). This prior art (hereafter called a "prior system") is common to the present invention in that sequenced nodes are processed. However, the prior system processes only the sequence of nodes, not intervals; in the prior system, each node contains the number of nodes of a sub-tree whose root is the node itself. The present invention is superior to the prior system in that intervals are processed.

In addition, the prior system follows a path from a specified node to the root to calculate the sequence number of the specified node from its address; however, it cannot retrieve a node when a value within an interval is given. The present invention is superior to the prior system in that it can retrieve a node when a value within an interval is given. To execute this retrieval, the present invention uses a method different from that used in the prior system; that is, it follows a path from the root to the specified node.

The prior system adds a node only to the beginning (leftmost position), deletes a node only from the end (rightmost position), and moves any node to the beginning (leftmost position) during update operation; however, it does not add or delete a node to or from other positions. The present invention is superior to the prior system in that it can add or delete a node (interval) to or from any position.

7. SEVENTH EMBODIMENT

A binary tree representing text may be configured in the data processing system in which text consisting of a plurality of lines is held. That is, the first binary tree represents the sequence of lines. This binary tree contains a plurality of nodes, each corresponding to a line, with the interval length of each node being 1. A second binary tree represents a code string of each line. Each secondary binary tree is associated with the corresponding node in the first binary tree through a pointer.

Figure 73:
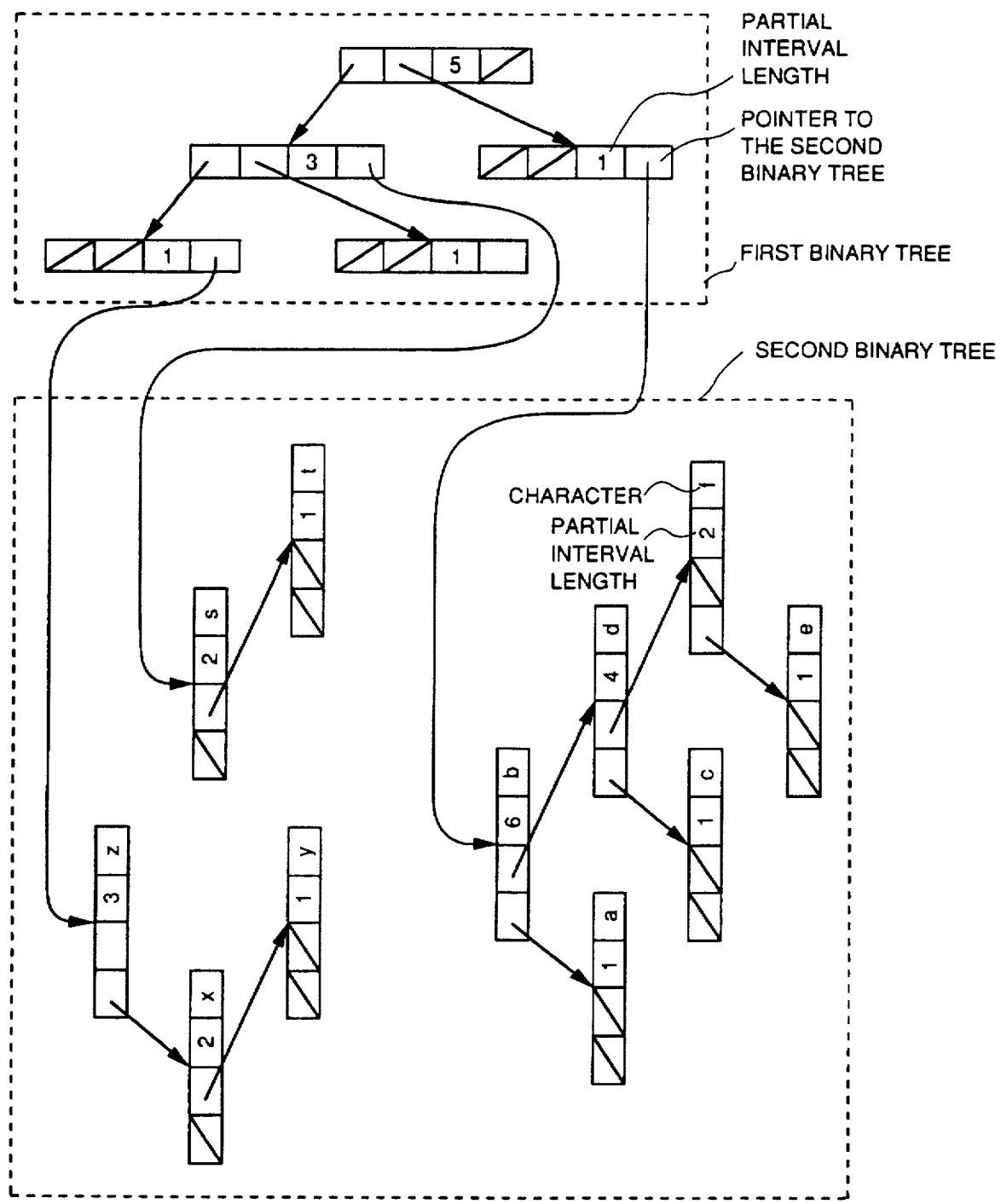
FIG. 73 shows a binary tree in the seventh embodiment of this invention.

FIG. 73 shows a binary tree representing the following lines.

xyz
st
(blank line)
(blank line)
abcdef

In the seventh embodiment, the first binary tree representing the sequence of lines and each of the second binary trees representing the contents of each line are created separately. Therefore, when either the sequence of lines or the content of each line is changed, there is no need for changing the other type of binary tree. This ensures efficient code string processing.

When the user edits code strings with a text editor or some other program, it is necessary to specify the number of a line (interval) relative to one of the ends (start of end) of a code string and to specify the number of a code relative to one of the ends of the line before accessing the code determined by them. It is also necessary to change a particular code and to insert or remove one or a plurality of characters before or after the corresponding character. In addition, lines must be able to be added or removed. The data processing system in the seventh embodiment is suitable for this type of processing.

Representing a consecutive area of the same code with a single node with the interval length of 2 or larger further increase memory and processing efficiency.

8. EIGHTH EMBODIMENT

It is possible to represent a code string, such as text consisting of a plurality of lines, with a single binary tree. In this case, the maximum number of characters of a line is fixed to a large number, n, and blanks are padded in the positions containing no character. A binary tree is composed of a sequence of code strings beginning at the start (or the end). Then, the j-th code from the beginning of line i begins at a position in the whole text represented by the following formula.

$$(i-1) \times n + j \qquad \text{[Formula 53]}$$

Figure 74:
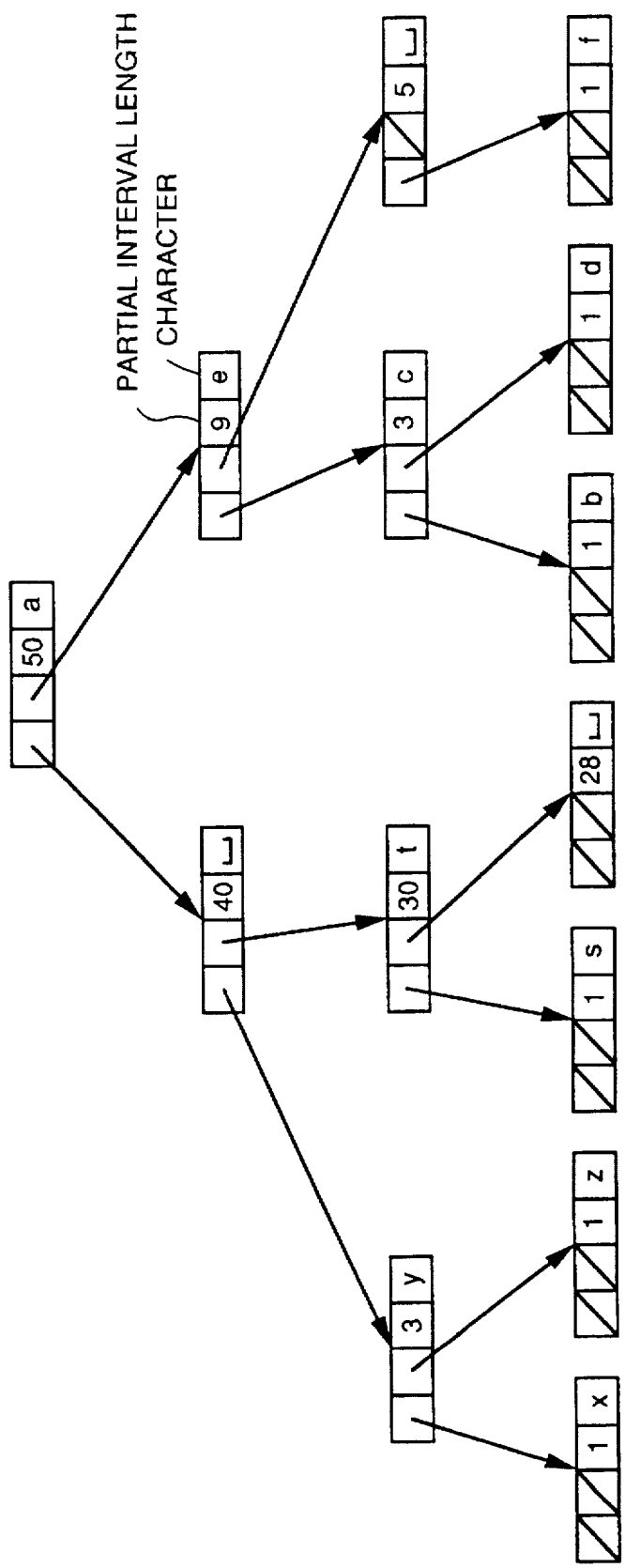
FIG. 74 shows a binary tree in the eighth embodiment of this invention.
Figure 76:
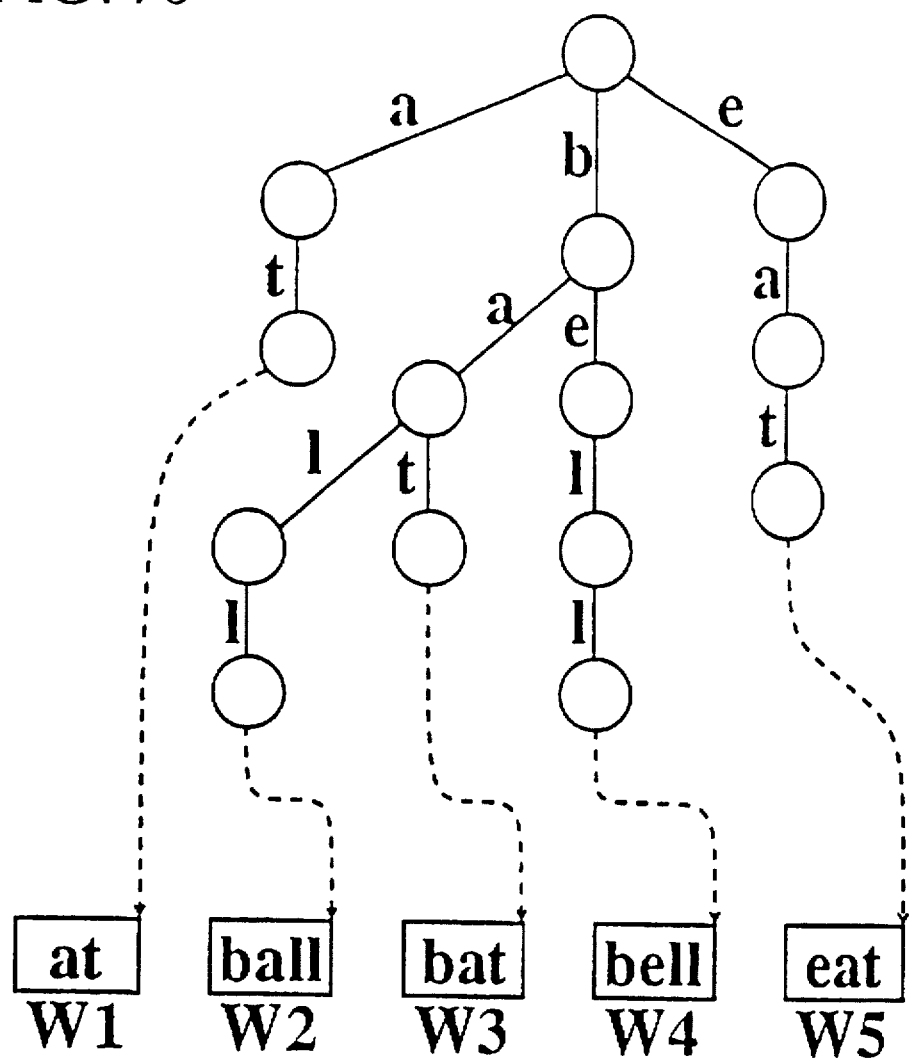
FIG. 76 shows an example of a conventional Trie.
Figures 77, 78:
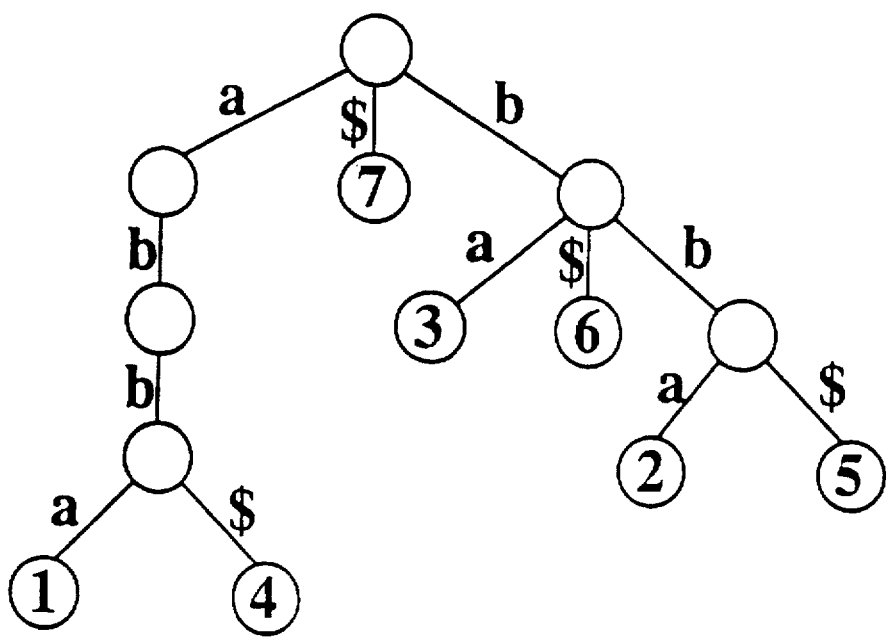
FIG. 77 is a table showing the correspondence between code strings and positions in a conventional code string retrieval method.
FIG. 78 shows an example of a conventional position tree.
Figure 79:
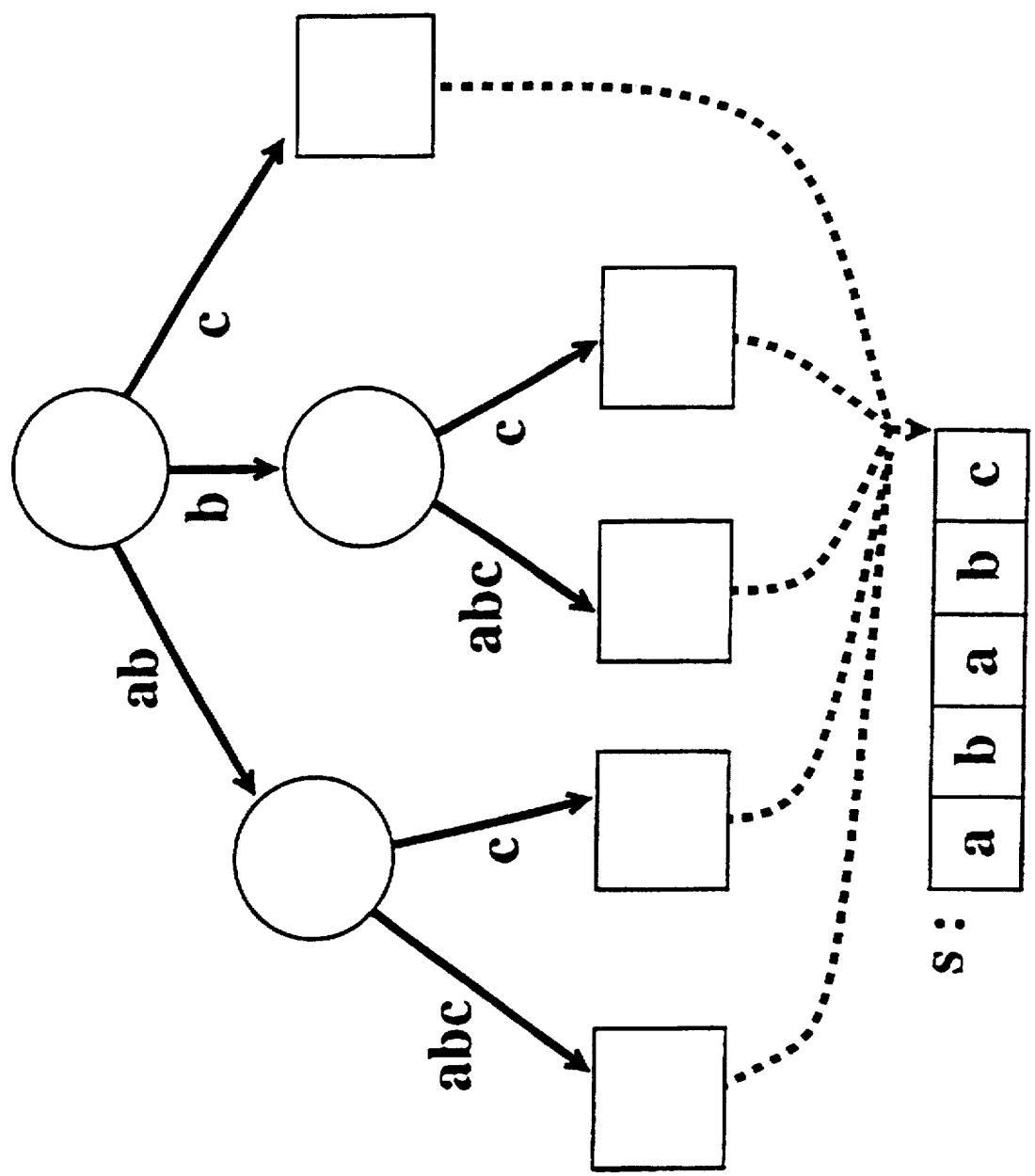
FIG. 79 shows an example of conventional suffix tree.
Figure 80:
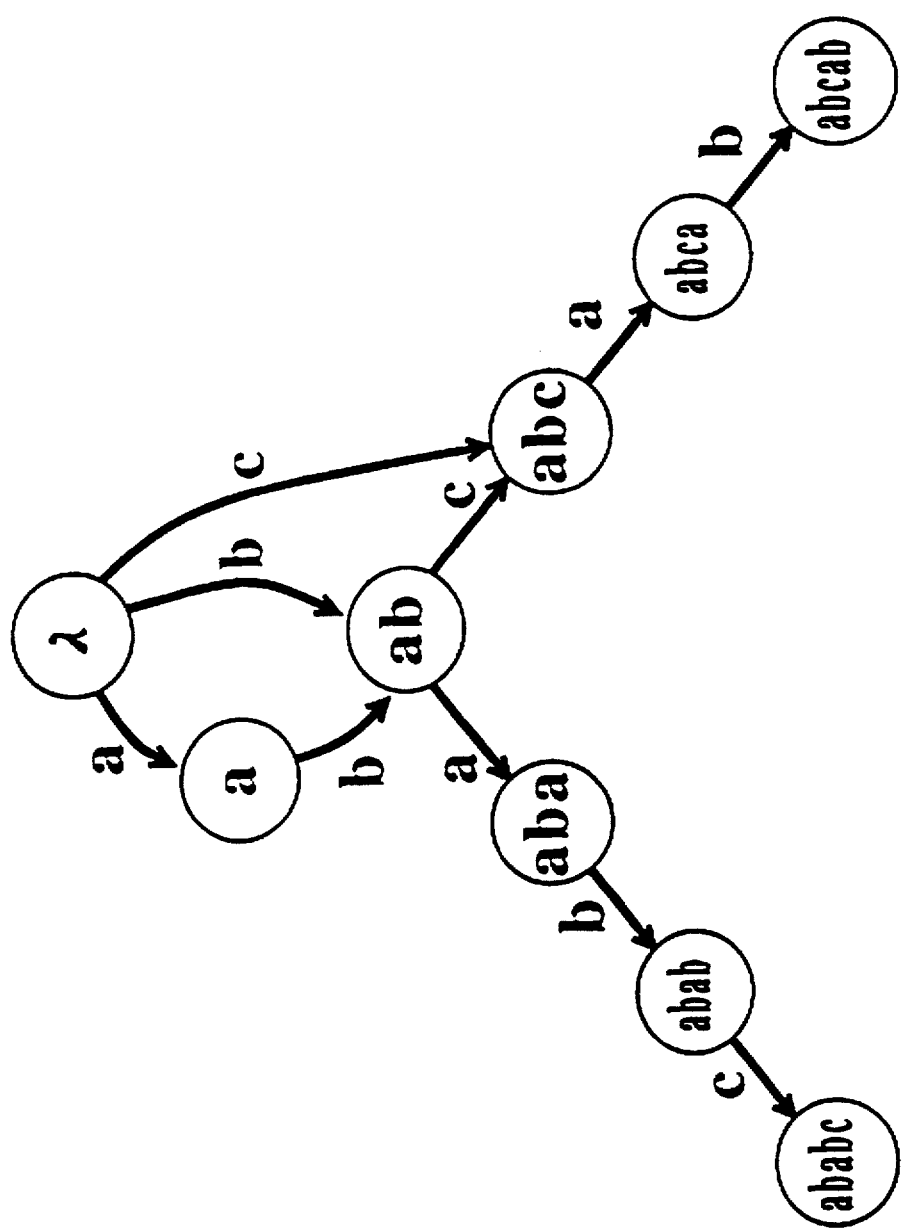
FIG. 80 shows an example of a conventional directed acyclic word graph.
Figures 83, 84:
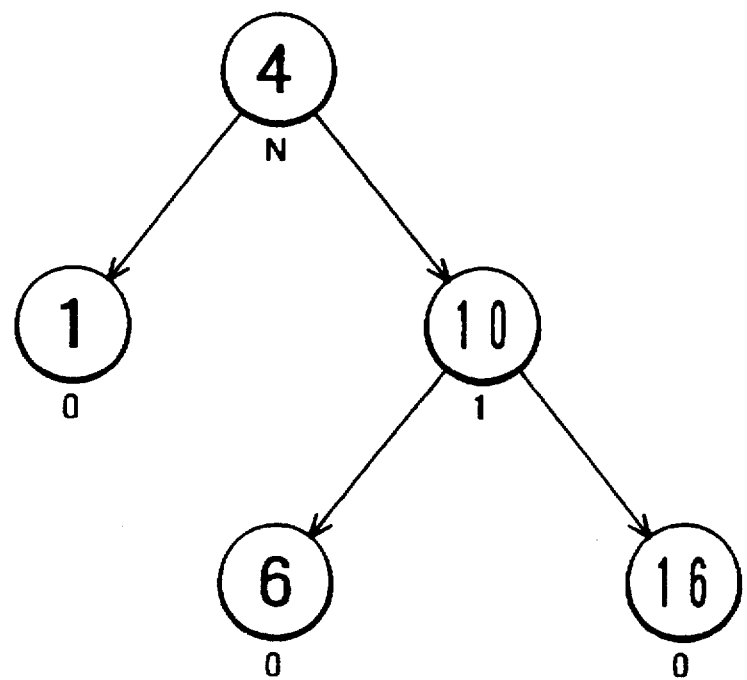
FIG. 83 shows an example of data used in a conventional second method.
FIG. 84 shows an example of a conventional binary tree.
Figures 85, 86:
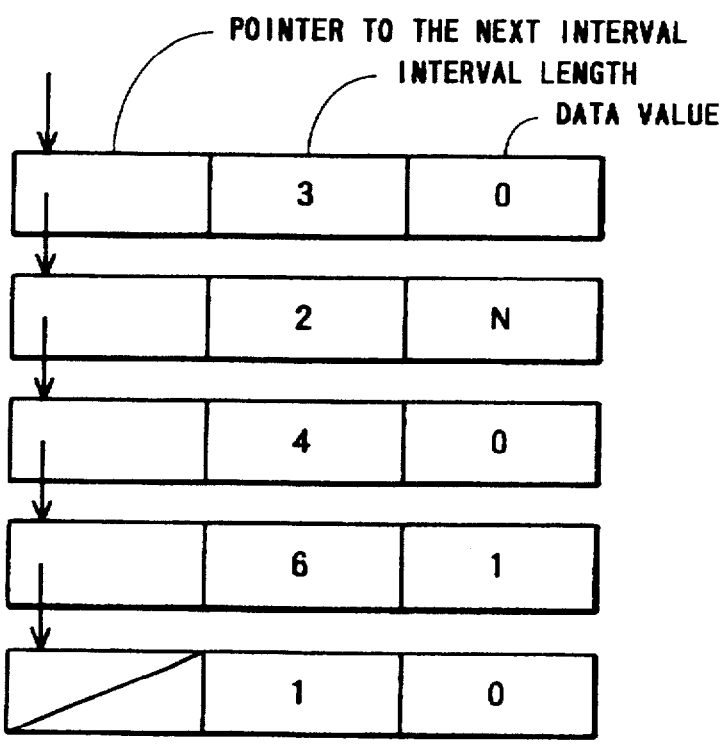
FIG. 85 shows an example of data used in a conventional third method.
FIG. 86 shows an example of data used in a conventional fourth method.

FIG. 74 is an example of a binary tree representing the above text with n being 10. In this way, data may be represented by a single simply-structured binary tree. In addition, because a sequence of a plurality of the same character or a sequence of blanks are represented by a single node with the character as the label and with the interval length represented by the number of consecutive characters, processing and memory efficiency are increased. For example, in FIG. 74, consecutive eight blanks and two blank lines are represented as 28 blanks by a single node. The data processing system in the eighth embodiment is particularly suitable when data containing many sequences of the same code.

In addition, compressing bit-string data, such as a facsimile image, with the use of a binary tree in the eighth embodiment allows any bit in the bit string to be identified as 1 or 0. This is different from a conventional technique.

That is, a bit string usually consists of a plurality of 0s and 1s that appear alternately. In a conventional method, bit data is compressed by sequentially recording the numbers of consecutive 0s and 1s (run-length-encoding). In this run-length-encoding method, it is necessary to restore all the preceding bits or to accumulate the lengths of the intervals in order to determine the value of a bit (0 or 1) or to restore a portion of data that appears in the middle of data. A s contrasted with this method, a binary tree in the eighth embodiment requires only as m any nodes as the number of intervals and, in addition, makes it possible to restore, or determine the value of, a bit that is in the middle of data.

9. OTHER EMBODIMENTS

This invention is not restricted to t he preferred embodiments described herein, but may be embodied in other specific forms, such as those described below, without departing from the spirit or essential characteristics thereof.

For example, although only alphabetically-sequenced dictionary data or trees consisting of alphabetic characters are used in the above embodiments, any type of characters, such as Japanese characters or Hankul alphabet characters, may be used in a code string. Also, a code string in this invention is not restricted to a character string. It may be any type of code, such as a voice pattern code or DNA base layout code. In addition, a substring in a code string may be processed indirectly, for example, by marking a boundary through a pointer. This method eliminates the need to process a part of code string data, for example, by transferring i t to another storage area.

The label attached to an edge or a node in a tree or binary tree need not be one-character code. In addition, dictionary data in the data retrieval system need not be in a tree form, but may be in the form of a correspondence table containing pairs of trailing strings and positions. This type of table is sorted into lexicographical order or into ascending order of position numbers for use in search for key strings in the binary search tree method.

Although data is retrieved in the first to fifth embodiments through a match in the leading string based on the trailing string in the substring, data may also be retrieved through a match in the trailing string based on the leading string. In that case, "trailing string" and "leading string" should be exchanged in this specification. During processing, characters are obtained from the end of a key string. The leading (preceding) node and the trailing (following) node in the sixth embodiment should also be exchanged.

Thus, this invention provides a data retrieval system which reduces the update time of data for retrieval. This invention also provides a data processing system which processes data efficiently.

While embodiments of the present invention have been described above, it is to be understood that modifications and variations will occur to those skilled in the art without departing from the spirit of the invention as clarified by the appended claims.

What is claimed is:

1. A data processing system comprising:

a binary tree generating means for generating a binary tree representing a range of each interval based on the intervals in a code string including at least one interval, said binary tree having nodes each of which corresponds to an interval, the end side of each node being connected to a preceding node corresponding to an interval preceding the interval of the node or to a following node corresponding to an interval following the interval of the node, each node being assigned a partial interval length which is a sum of the interval length of the node itself and the interval length of at least one node in the end side of the node; and an interval retrieving means for identifying an interval where a specified position indicating a position within said code string is included, wherein said interval retrieving means sequentially moves a current node, pointed to by a specified pointer, from said root to said end side, calculates the range of the current node based on the partial interval length of at least one of the current node and said preceding node and said following node directly connected to the end side of the current node, compares the calculated interval with said specified position, moves the current node to the preceding node when the specified position precedes the calculated interval; moves the current node to the following node when the specified position follows the calculated interval, and identifies that the specified position is included in the current node when the specified position is included in the calculated interval.

2. A data processing system as claimed in claim 1, further comprising an identifying means for identifying an interval corresponding to a specified node which is any given node in said binary tree, wherein the identifying means moves the current node, pointed to by a pointer, from said specified node toward the parent node, which is a higher-level node, of said current node, one node level at a time, until said root is reached, adds up the interval length of the node and the partial interval length of the preceding node or the following node of the node each time the current node is moved, depending upon whether a child node which is said current node before movement is said preceding node or said following node, and identifies an interval corresponding to said specified node by calculating one or both of a left interval length, which is the sum of interval lengths of the nodes preceding said specified node in L-C-R order or a right interval length, which is the total interval length of the nodes following said specified node in L-C-R order.

3. A data processing system as claimed in claim 1, further comprising identifying means for identifying an interval corresponding to a specified node which is any given node in said binary tree, wherein the identifying means moves said specified node to said root by means of splaying.

4. A data processing system as claimed in claim 1, or 2, further comprising a binary tree updating means for updating said binary tree, when said interval is changed, according to the contents of the change.

5. A data processing system as claimed in claim 4, wherein said binary tree updating means comprising:

an interval length changing means for changing said interval length;

a deleting means for deleting said node corresponding to a deleted interval from said binary tree when said interval is deleted; and an adding means for adding a node corresponding to an added interval when an interval is added.

6. A data processing system as claimed in claim 5, wherein said interval length changing means changes said partial interval length of each node sequentially from said node of said interval, whose length is to be changed, to said root by a changed length.

7. A data processing system as claimed in claim 5, wherein said interval length changing means moves said node of said interval, whose length is to be changed, to said root by means of splaying, and increases or decreases said partial interval length of the node, which is the root, by a changed length.

8. A data processing system as claimed in claim 5, wherein said adding means adds said node corresponding to said interval, which is to be added, to said binary tree, adjusts the connection sequence of said nodes, and adjusts said partial interval length of each node.

9. A data processing system as claimed in claim 8, wherein said adding means uses the sum of said interval length of said added node and the partial interval length of said lower-level node of the node as said partial interval length of said added node and, for the nodes on the path from the parent node to which the added node is connected directly as a lower-level node to said root, adds the interval length of the added node to the partial interval length of each of the nodes.

10. A data processing system as claimed in claim 5, wherein said adding means moves the nodes immediately preceding and following the position, at which a node is to be added, to said root by means of splaying one at a time, adds said node corresponding to an interval, which is to be added, at the position immediately following said immediately-preceding node or at the position immediately before said immediately-following node, and adds the interval length of the added node to the partial interval length of said immediately-preceding or immediately-following node or said added node, as necessary.

11. A data processing system as claimed in claim 5, wherein said adding means adds said node corresponding to said interval, which is to be added, to said binary tree with the interval length of the node being 0, moves the added node to the root of said binary tree by means of splaying, and increases the partial interval length of the node, moved to the root, by the interval length of the added interval.

12. A data processing system as claimed in claim 5, wherein said deleting means deletes from said binary tree
   said node of said interval to be deleted,
   adjusts the connection among the nodes, and
   adjusts said partial interval length of each node.

13. A data processing system as claimed in claim 5, wherein said deleting means
   moves said node corresponding to said interval, which is to be deleted, to the root by means of splaying,
   moves the node immediately preceding or following the node, which is to be deleted, to the root by means of splaying,
   decreases the partial interval length of said immediately-preceding or immediately-following node, which is the root, by the interval length of said node to be deleted, and
   deletes said node to be deleted.

14. A data processing system as claimed in claim 4, further comprising a structure adjusting means for adjusting the structure of said binary tree by changing the connection sequence of said nodes.

15. A data processing system as claimed in claim 14, wherein rotation, double rotation (zig-zig) and double rotation (zig-zag) are used as a structure adjustment procedure for changing the structure while maintaining the sequence of said nodes of said binary tree.

16. A data processing system as claimed in claim 14, wherein said structure adjusting means adjusts said binary tree by means of splaying through which a target node, which is any of said nodes, is moved to said root.

17. A data processing system as claimed in claim 1, wherein said code string is text containing a plurality of lines,
   said interval is a line included in the text, and
   said binary tree generating means generates a first binary tree representing the sequence of lines with nodes corresponding to one or more lines in the text and a second binary tree representing the sequence of codes in each line with nodes each corresponding to one or more characters on the line.

18. A data processing system as claimed in claim 1, wherein said code string is text containing a plurality of lines of a fixed length, and
   said binary tree generating means sets a blank character in a position where no character is present and generates said binary tree by representing each substring of the text as a single node with a character or a blank character occurring consecutively as a label and with the number of consecutive characters as the interval length.

19. A data processing method comprising:
   a binary tree generating process for generating a binary tree representing a range of each interval based on the intervals in a code string including at least one interval,
   said binary tree having nodes of which corresponds to an interval,
   the end side of each node being connected to a preceding node corresponding to an interval preceding the interval of the node or to a following node corresponding to an interval following the interval of the node,
   each node being assigned a partial interval length which is the sum of the interval length of the node itself and the interval length of at least one node on the end side of the node, and an interval retrieving process for identifying an interval where a specified position indicating a position within said code string is included, wherein said interval retrieving process sequentially moves a current node, pointed to by a specified pointer, from said root to said end side, calculates the range of the current node based on the partial interval length of at least one of the current node and said preceding node and said following node directly connected to the end side of the current node, compares the calculated interval with said specified position, moves the current node to the preceding node when the specified position precedes the calculated interval, moves the current node to the following node when the specified position follows the calculated interval, and identifies that the specified position is included in the current node when the specified position is included in the calculated interval.

20. A data processing method as claimed in claim 19, further comprising an identifying process for identifying an interval corresponding to a specified node which is any given node in said binary tree, wherein the identifying process
   moves the current node, pointed to by a pointer, from said specified node toward the parent node, which is a higher-level node, of said current node, one node level at a time, until said root is reached,
   adds up the interval length of the node and the partial interval length of the preceding node or the following node of the node each time the current node is moved, depending upon whether a child node which is said current node before movement is said preceding node or said following node,
   and identifies an interval corresponding to said specified node by calculating one or both of a left interval length, which is the sum of interval lengths of the nodes preceding said specified node in L-C-R order or a right interval length, which is the total interval length of the nodes following said specified node in L-C-R order.

21. A data processing method as claimed in claim 19, or 20, further comprising a binary tree updating process for updating said binary tree, when said interval is changed, according to the contents of the change.

22. A data processing method as claimed in claim 21, wherein said binary tree updating process comprises:
   an interval length changing process for changing said interval length;
   a deleting process for deleting said node corresponding to a deleted interval from said binary tree when said interval is deleted; and
   an adding process for adding a node corresponding to an added interval when an interval is added.

23. A data processing method as claimed in claim 21, further comprising a structure adjusting process for adjusting the structure of said binary tree by changing the connection sequence of said nodes.

24. A data processing system comprising:
   a binary tree generating means for generating a binary tree representing a range of each interval based on the intervals in a code string including at least one interval, said binary tree having nodes each of which corresponds to an interval, each node being assigned a partial interval length which is the sum of the interval lengths of all the nodes included in the subtree whose root is the node including the node itself, and
   an interval retrieving means for identifying an interval where a specified position indicating a position within said code string is included, wherein said interval retrieving means sequentially moves a current node, pointed to by a specified pointer, from said root to said end side, calculates the range of the current node based on the partial interval length of at least one of the current node and said preceding node and said following node directly connected to the end side of the current node, compares the calculated interval with said specified position, moves the current node to the preceding node when the specified position precedes the calculated interval, moves the current node to the following node when the specified position follows the calculated interval, and identifies that the specified position is included in the current node when the specified position is included in the calculated interval.

25. A data processing method comprising:

a binary tree generating process for generating a binary tree representing a range of each interval based on the intervals in a code string including at least one interval, said binary tree having nodes each of which corresponds to an interval, each node being assigned a partial interval length which is the sum of the interval lengths of all the nodes included in the subtree whose root is the node including the node itself, and an interval retrieving process for identifying an interval where a specified position indicating a position within said code string is included, wherein said interval retrieval process sequentially moves a current node, pointed to by a specified pointer, from said root to said end side, calculates the range of the current node based on the partial interval length of at least one of the current node and said preceding node and said following node directly connected to the end side of the current node, compares the calculated interval with said specified position, moves the current node to the preceding node when the specified position precedes the calculated interval, moves the current node to the following node when the specified position follows the calculated interval, and identifies that the specified position is included in the current node when the specified position is included in the calculated interval.

* * * * *